(12) United States Patent
Friesen et al.

(10) Patent No.: US 11,266,944 B2
(45) Date of Patent: *Mar. 8, 2022

(54) SYSTEMS AND METHODS FOR WATER EXTRACTION CONTROL

(71) Applicant: Source Global, PBC, Scottsdale, AZ (US)

(72) Inventors: Cody Alden Friesen, Fort McDowell, AZ (US); Grant Harrison Friesen, Scottsdale, AZ (US); Heath Lorzel, Mesa, AZ (US); Jonathan Edward Goldberg, Phoenix, AZ (US)

(73) Assignee: SOURCE GLOBAL, PBC, Scottsdale, AZ (US)

( * ) Notice: Subject to any disclaimer, the term of this patent is extended or adjusted under 35 U.S.C. 154(b) by 149 days.

This patent is subject to a terminal disclaimer.

(21) Appl. No.: 16/820,587

(22) Filed: Mar. 16, 2020

(65) Prior Publication Data

US 2020/0269184 A1    Aug. 27, 2020

Related U.S. Application Data

(63) Continuation of application No. 16/517,435, filed on Jul. 19, 2019, now Pat. No. 10,632,416, which is a
(Continued)

(51) Int. Cl.
*B01D 53/02* (2006.01)
*B01D 53/06* (2006.01)
(Continued)

(52) U.S. Cl.
CPC .............. *B01D 53/06* (2013.01); *B01D 53/04* (2013.01); *B01D 53/14* (2013.01); *B01D 53/26* (2013.01);
(Continued)

(58) Field of Classification Search
CPC ...... B01D 2257/80; B01D 2259/40009; B01D 2259/40083; B01D 53/04; B01D 53/06;
(Continued)

(56) References Cited

U.S. PATENT DOCUMENTS 1,816,592 A    7/1931   Knapen
2,138,689 A    11/1938  Altenkirch
(Continued)

FOREIGN PATENT DOCUMENTS

CN    1774401    5/2006
CN    1325854    7/2007
(Continued)

OTHER PUBLICATIONS

Final Office Action dated Apr. 13, 2021 in U.S. Appl. No. 16/167,295.
(Continued)

*Primary Examiner* — Christopher P Jones
(74) *Attorney, Agent, or Firm* — Snell & Wilmer L.L.P.

(57) ABSTRACT

A controller can be configured to control a system for extracting liquid water from air comprising a thermal unit, a primary desiccant wheel, and a regeneration fluid path. The controller can comprise a sensor, a motor, and a microcontroller coupled to the sensor and the motor. The microcontroller can be configured to determine a water extraction efficiency based on at least one signal received from the sensor, and also can be configured to maximize the water extraction efficiency by adjusting a speed of the motor in response to the determined water extraction efficiency.

30 Claims, 32 Drawing Sheets

Related U.S. Application Data continuation of application No. 15/600,046, filed on May 19, 2017, now Pat. No. 10,357,739.

(60) Provisional application No. 62/339,649, filed on May 20, 2016.

(51) Int. Cl.
  *B01D 53/04* (2006.01)
  *B01D 53/14* (2006.01)
  *B01D 53/26* (2006.01)
  *B01D 53/30* (2006.01)
  *E03B 3/28* (2006.01)

(52) U.S. Cl.
  CPC ......... *B01D 53/261* (2013.01); *B01D 53/265* (2013.01); *B01D 53/30* (2013.01); *B01D 2257/80* (2013.01); *B01D 2259/40009* (2013.01); *B01D 2259/40083* (2013.01); *E03B 3/28* (2013.01); *Y02A 20/00* (2018.01)

(58) Field of Classification Search
  CPC ...... B01D 53/14; B01D 53/26; B01D 53/261; B01D 53/265; B01D 53/30; E03B 3/28
  See application file for complete search history.

(56) References Cited

U.S. PATENT DOCUMENTS

| | | | |
|---|---|---|---|
| 2,462,952 A | 3/1949 | Dunkak |
| 2,700,537 A | 1/1955 | Pennington |
| 2,761,292 A | 9/1956 | Coanda et al. |
| 3,102,532 A | 9/1963 | Shoemaker |
| 3,400,515 A | 9/1968 | Ackerman |
| 3,676,321 A | 7/1972 | Cummings et al. |
| 3,740,959 A | 6/1973 | Foss |
| 3,889,532 A | 6/1975 | Pilie et al. |
| 4,054,124 A | 10/1977 | Knoos |
| 4,080,186 A | 3/1978 | Ockert |
| 4,117,831 A | 10/1978 | Bansal et al. |
| 4,134,743 A | 1/1979 | Macriss et al. |
| 4,136,672 A | 1/1979 | Hallanger |
| 4,146,372 A | 3/1979 | Groth et al. |
| 4,169,459 A | 10/1979 | Ehrlich |
| 4,185,969 A | 1/1980 | Bulang |
| 4,201,195 A | 5/1980 | Sakhuja |
| 4,219,341 A | 8/1980 | Hussmann |
| 4,222,244 A | 9/1980 | Meckler |
| 4,234,037 A | 11/1980 | Rogers et al. |
| 4,242,112 A | 12/1980 | Jebens |
| 4,285,702 A | 8/1981 | Michel et al. |
| 4,304,577 A | 12/1981 | Ito et al. |
| 4,315,599 A | 2/1982 | Biancardi |
| 4,334,524 A | 6/1982 | McCullough |
| 4,342,569 A | 8/1982 | Hussmann |
| 4,345,917 A | 8/1982 | Hussmann |
| 4,351,651 A | 9/1982 | Courneya |
| 4,374,655 A | 2/1983 | Grodzka et al. |
| 4,377,398 A | 3/1983 | Bennett |
| 4,398,927 A | 8/1983 | Asher et al. |
| 4,405,343 A | 9/1983 | Othmer |
| 4,433,552 A | 2/1984 | Smith |
| 4,478,210 A | 10/1984 | Sieradski |
| 4,722,192 A | 2/1988 | Koblitz et al. |
| 4,726,817 A | 2/1988 | Roger |
| 4,926,618 A | 5/1990 | Ratliff |
| 5,058,388 A | 10/1991 | Shaw et al. |
| 5,275,643 A | 1/1994 | Usui |
| 5,470,484 A | 11/1995 | McNeel |
| 5,579,647 A | 12/1996 | Calton et al. |
| 5,701,749 A | 12/1997 | Zakryk |
| 5,729,981 A | 3/1998 | Markus et al. |
| 5,758,511 A | 6/1998 | Yoho et al. |
| 5,846,296 A | 12/1998 | Krumsvik |
| 5,873,256 A | 2/1999 | Denniston |
| 5,989,313 A | 11/1999 | Mize |
| 6,029,467 A | 2/2000 | Moratalla |
| 6,156,102 A | 12/2000 | Contad et al. |
| 6,199,388 B1 | 3/2001 | Fischer, Jr. |
| 6,336,957 B1 | 1/2002 | Tsymerman |
| 6,447,583 B1 | 9/2002 | Thelen et al. |
| 6,490,879 B1 | 12/2002 | Lloyd et al. |
| 6,511,525 B2 | 1/2003 | Spletzer et al. |
| 6,513,339 B1 | 2/2003 | Kopko |
| 6,557,365 B2 | 5/2003 | Dinnage et al. |
| 6,574,979 B2 | 6/2003 | Faqih |
| 6,644,060 B1 | 11/2003 | Dagan |
| 6,828,499 B2 | 12/2004 | Max |
| 6,869,464 B2 | 3/2005 | Klemic |
| 6,945,063 B2 | 9/2005 | Max |
| 6,957,543 B1 | 10/2005 | Reznik |
| 7,017,356 B2 | 3/2006 | Moffitt |
| 7,043,934 B2 | 5/2006 | Radermacher et al. |
| 7,178,355 B2 | 2/2007 | Moffitt |
| 7,251,945 B2 | 8/2007 | Tongue |
| 7,305,849 B2 | 12/2007 | Loffler et al. |
| 7,306,654 B2 | 12/2007 | King et al. |
| 7,478,535 B2 | 1/2009 | Turner, Jr. et al. |
| 7,740,765 B2 | 6/2010 | Mitchell |
| 7,866,176 B2 | 1/2011 | Vetrovec et al. |
| 7,905,097 B1 | 3/2011 | Fort |
| 7,926,481 B2 | 4/2011 | Edwards et al. |
| 8,075,652 B2 | 12/2011 | Melikyan |
| 8,118,912 B2 | 2/2012 | Rodriguez et al. |
| 8,187,368 B2 | 5/2012 | Shih |
| 8,196,422 B2 | 6/2012 | Ritchey |
| 8,328,904 B2 | 12/2012 | Griffiths et al. |
| 8,425,660 B2 | 4/2013 | Ike et al. |
| 8,506,675 B2 | 8/2013 | Ellsworth |
| 8,844,299 B2 | 9/2014 | Ferreira et al. |
| 9,289,718 B2 | 3/2016 | Dahlback |
| 10,357,739 B2 | 7/2019 | Friesen et al. |
| 10,469,028 B2 | 11/2019 | Friesen et al. |
| 10,632,416 B2 | 4/2020 | Friesen et al. |
| 10,835,861 B2 | 11/2020 | Friesen et al. |
| 11,159,123 B2 | 10/2021 | Friesen et al. |
| 11,160,223 B2 | 11/2021 | Friesen et al. |
| 2002/0130091 A1 | 9/2002 | Ekberg et al. |
| 2003/0091881 A1 | 5/2003 | Eisler |
| 2003/0101161 A1 | 5/2003 | Ferguson et al. |
| 2004/0000165 A1 | 1/2004 | Max |
| 2004/0055309 A1 | 3/2004 | Bellows et al. |
| 2005/0044862 A1 | 3/2005 | Vetrovec et al. |
| 2005/0084415 A1 | 4/2005 | McVey et al. |
| 2005/0204914 A1 | 9/2005 | Boutall |
| 2005/0249631 A1 | 11/2005 | Schulz et al. |
| 2005/0284167 A1 | 12/2005 | Morgan |
| 2006/0017740 A1 | 1/2006 | Coleman |
| 2006/0032493 A1 | 2/2006 | Ritchey |
| 2006/0060475 A1 | 3/2006 | Applegate et al. |
| 2006/0112709 A1 | 6/2006 | Boyle |
| 2006/0130654 A1 | 6/2006 | King et al. |
| 2006/0288709 A1 | 12/2006 | Reidy |
| 2007/0028769 A1 | 2/2007 | Eplee et al. |
| 2007/0101862 A1 | 5/2007 | Tongue |
| 2007/0150424 A1 | 6/2007 | Igelnik |
| 2007/0274858 A1 | 11/2007 | Childers et al. |
| 2007/0295021 A1 | 12/2007 | Tyls et al. |
| 2008/0135495 A1 | 6/2008 | Sher |
| 2008/0168789 A1 | 7/2008 | Jones |
| 2008/0202944 A1 | 8/2008 | Santoli et al. |
| 2008/0224652 A1 | 9/2008 | Zhu et al. |
| 2008/0289352 A1 | 11/2008 | Parent |
| 2009/0025711 A1 | 1/2009 | Edwards et al. |
| 2009/0093916 A1 | 4/2009 | Parsonnet et al. |
| 2009/0211276 A1 | 8/2009 | Forkosh |
| 2009/0223514 A1 | 9/2009 | Smith et al. |
| 2010/0083673 A1 | 4/2010 | Meritt |
| 2010/0170499 A1 | 7/2010 | Bar |
| 2010/0192605 A1 | 8/2010 | Fang et al. |
| 2010/0212348 A1 | 8/2010 | Oh |
| 2010/0275629 A1 | 11/2010 | Erickson |
| 2010/0275775 A1 | 11/2010 | Griffiths et al. |
| 2010/0294672 A1 | 11/2010 | Gahr et al. |

(56) References Cited

U.S. PATENT DOCUMENTS

| | | |
|---|---|---|
| 2011/0048039 A1 | 3/2011 | Kohavi et al. |
| 2011/0056220 A1 | 3/2011 | Caggiano |
| 2011/0083458 A1 | 4/2011 | Takakura et al. |
| 2011/0132027 A1 | 6/2011 | Gommed et al. |
| 2011/0232485 A1 | 9/2011 | Ellsworth |
| 2011/0247353 A1 | 10/2011 | Metz |
| 2011/0296858 A1 | 12/2011 | Caggiano |
| 2012/0006193 A1 | 1/2012 | Roychoudhury |
| 2012/0125020 A1 | 5/2012 | Vandermeulen et al. |
| 2012/0227582 A1 | 9/2012 | Wamstad et al. |
| 2013/0227879 A1 | 9/2013 | Lehky |
| 2013/0269522 A1 | 10/2013 | DeValve |
| 2013/0312451 A1 | 11/2013 | Max |
| 2013/0318790 A1 | 12/2013 | Becze et al. |
| 2013/0319022 A1 | 12/2013 | Becze et al. |
| 2014/0034475 A1 | 2/2014 | Kamen et al. |
| 2014/0110273 A1 | 4/2014 | Bar-or et al. |
| 2014/0138236 A1 | 5/2014 | White |
| 2014/0157985 A1 | 6/2014 | Scovazzo et al. |
| 2014/0173769 A1 | 6/2014 | Leyns et al. |
| 2014/0317029 A1 | 10/2014 | Matsuoka et al. |
| 2015/0033774 A1 | 2/2015 | Ferreira et al. |
| 2015/0194926 A1 | 7/2015 | Bushong, Jr. |
| 2016/0073589 A1 | 3/2016 | McNamara |
| 2016/0131401 A1 | 5/2016 | Otanicar et al. |
| 2016/0162456 A1 | 6/2016 | Munro et al. |
| 2016/0187287 A1 | 6/2016 | Tajiri et al. |
| 2016/0197364 A1 | 7/2016 | Rama |
| 2016/0244951 A1 | 8/2016 | Yui |
| 2016/0333553 A1 | 11/2016 | Dorfman |
| 2017/0013810 A1 | 1/2017 | Grabell |
| 2017/0024641 A1 | 1/2017 | Wierzynski |
| 2017/0203974 A1 | 7/2017 | Riedl et al. |
| 2017/0323221 A1 | 11/2017 | Chaudhuri et al. |
| 2017/0354920 A1 | 12/2017 | Friesen et al. |
| 2017/0371544 A1 | 12/2017 | Choi et al. |
| 2018/0043295 A1 | 2/2018 | Friesen et al. |
| 2019/0025273 A1 | 1/2019 | Brondum |
| 2019/0102695 A1 | 4/2019 | Biswas et al. |
| 2019/0171967 A1 | 6/2019 | Friesen et al. |
| 2019/0254243 A1 | 8/2019 | Friesen et al. |
| 2019/0336907 A1 | 11/2019 | Friesen et al. |
| 2019/0344214 A1 | 11/2019 | Friesen et al. |
| 2019/0372520 A1 | 12/2019 | Friesen et al. |
| 2020/0122083 A1 | 4/2020 | Friesen et al. |
| 2020/0124566 A1 | 4/2020 | Johnson et al. |
| 2020/0140299 A1 | 5/2020 | Friesen et al. |
| 2020/0209190 A1 | 7/2020 | Johnson et al. |
| 2020/0283997 A1 | 9/2020 | Salloum et al. |
| 2020/0300128 A1 | 9/2020 | Friesen et al. |
| 2021/0062478 A1 | 3/2021 | Friesen et al. |
| 2021/0305935 A1 | 9/2021 | Friesen et al. |

FOREIGN PATENT DOCUMENTS

| | | |
|---|---|---|
| CN | 101589282 | 11/2009 |
| CN | 102042645 | 5/2011 |
| CN | 102297503 | 12/2011 |
| CN | 102422089 | 4/2012 |
| CN | 102441320 | 5/2012 |
| CN | 102733451 | 10/2012 |
| CN | 202850099 | 4/2013 |
| CN | 103889892 | 6/2014 |
| CN | 203777907 | 8/2014 |
| CN | 104813107 | 7/2015 |
| CN | 204510348 U | 7/2015 |
| CN | 105531547 | 4/2016 |
| DE | 4215839 | 11/1993 |
| EP | 1139554 | 10/2001 |
| EP | 2305362 | 4/2011 |
| EP | 2326890 | 6/2011 |
| FR | 2813087 | 2/2002 |
| JP | H06142434 | 5/1994 |
| JP | 2012101169 | 5/2012 |
| WO | 1999007951 | 2/1999 |
| WO | 2006129200 | 12/2006 |
| WO | 2007041804 | 4/2007 |
| WO | 2007051886 | 5/2007 |
| WO | 2008018071 | 2/2008 |
| WO | 2009043413 | 4/2009 |
| WO | 2012009024 | 1/2012 |
| WO | 2012128619 | 9/2012 |
| WO | 2012162760 | 12/2012 |
| WO | 2013026126 | 2/2013 |
| WO | 2013182911 | 12/2013 |
| WO | 2014085860 | 6/2014 |
| WO | 2015054435 | 4/2015 |
| WO | 2016053162 | 4/2016 |
| WO | 2016081863 | 5/2016 |
| WO | 2016138075 | 9/2016 |
| WO | 2016187709 | 12/2016 |
| WO | 2017177143 | 10/2017 |
| WO | 2017201405 | 11/2017 |
| WO | 2019014599 | 1/2019 |
| WO | 2019050861 | 3/2019 |
| WO | 2019050866 | 3/2019 |
| WO | 2019071202 | 4/2019 |
| WO | 2019113354 | 6/2019 |
| WO | 2019161339 | 8/2019 |
| WO | 2020082038 | 4/2020 |
| WO | 2020086621 | 4/2020 |
| WO | 2021154739 | 8/2021 |

OTHER PUBLICATIONS

Non-Final Office Action dated Apr. 30, 2021 in U.S. Appl. No. 16/278,608.
International Search Report and Written Opinion dated Apr. 6, 2021 in Application No. PCT/US2021/015106.
Office Action dated Apr. 6, 2021 in Chinese Application No. 201780033378.3.
Office Action dated Apr. 28, 2021 in India Patent Application No. 20181704169.
Office Action dated May 18, 2021 in Philippines Application No. 1/2020/500092.
Non-Final Office Action dated Jul. 20, 2021 in U.S. Appl. No. 16/211,896.
Non-Final Office Action dated Jul. 26, 2021 in U.S. Appl. No. 16/630,824.
Non-Final Office Action dated Aug. 24, 2021 in U.S. Appl. No. 16/657,935.
Office Action dated Jul. 15, 2021 in Japanese Patent Application No. 2019-503636.
Office Action dated Aug. 4, 2021 in Chinese Application No. 201780033378.3.
PV Performance Modeling Collaborative. Irradiance & Insolation. Accessed Aug. 18, 2021 at https://pvpmc.sandia.gov/ modeling-steps/1-weather-design-inputs/irradiance-and-insolation-2/ (2014).
ACS. A Single-Layer Atmosphere Model. Accessed on Aug. 17, 2021 at https://www.acs.org/content/acs/en/ climatescience/ atmosphericwarming/singlelayermodel.html (2012).
Materials Technology. UV Exposure Across Surface of Earth. Accessed Aug. 17, 2021 at http://www.drb-mattech.co.uk/uv %20map.html (2010).
USPTO, Notice of Allowance dated Jun. 19, 2020 in U.S. Appl. No. 15/528,366.
International Search Report and Written Opinion dated Jun. 15, 2020 in Application No. PCT/US2020/029401.
Non-Final Office Action dated Jan. 17, 2020 in U.S. Appl. No. 15/528,366.
Final Office Action dated Apr. 27, 2020 in U.S. Appl. No. 15/528,366.
Notice of Allowance dated Jun. 3, 2019 in U.S. Appl. No. 15/600,046.
Non-Final Office Action dated Feb. 5, 2019 in U.S. Appl. No. 15/482,104.
Notice of Allowance dated Jun. 27, 2019 in U.S. Appl. No. 15/482,104.
Non-Final Office Action dated Aug. 9, 2019 in U.S. Appl. No. 16/517,435.

(56) References Cited

OTHER PUBLICATIONS

Notice of Allowance dated Jan. 31, 2020 in U.S. Appl. No. 16/517,435.
Non-Final Office Action dated Jun. 1, 2020 in U.S. Appl. No. 16/167,295.
Non-Final Office Action dated May 15, 2020 in U.S. Appl. No. 16/791,895.
International Search Report and Written Opinion dated Apr. 29, 2016 in Application No. PCT/US2015/061921.
International Search Report and Written Opinion dated Aug. 16, 2017 in Application No. PCT/US2017/033540.
International Search Report and Written Opinion dated Jun. 19, 2017 in Application No. PCT/US2017/026609.
International Search Report and Written Opinion dated Dec. 3, 2018 in Application No. PCT/US2018/049411.
International Search Report and Written Opinion dated Dec. 3, 2018. Application No. PCT/US2018/049398.
International Search Report and Written Opinion dated Jan. 15, 2019 in Application No. PCT/US2018/054715.
International Search Report and Written Opinion dated Mar. 6, 2019 in Application No. PCT/US2018/042098.
International Search Report and Written Opinion dated Mar. 29, 2019 in Application No. PCT/US2018/064308.
International Search Report and Written Opinion dated Jun. 6, 2019 in Application No. PCT/US2019/018431.
International Search Report and Written Opinion dated Jul. 29, 2019 in Application No. PCT/US2019/32066.
International Search Report and Written Opinion dated Jan. 28, 2020 in Application No. PCT/US2019/057492.
International Search Report and Written Opinion dated Mar. 19, 2020 in Application No. PCT/US2019/057081.
European Search Report dated Jun. 7, 2019 in European Application No. 15825979.
European Search Report dated Jan. 28, 2020 in European Application No. 15825979.
Office Action dated Oct. 31, 2019 in Chinese Application No. 201780033378.3.
Office Action dated Feb. 4, 2020 in Brazilian Application No. 112017021842.9.
Ali et al., "Desiccant Enhanced Nocturnal Radiative Cooling-Solar Collector System for Air Comfort Application in Hot Arid Areas," Int. J. of Thermal & Environmental Engineering, vol. 5, No. 1, pp. 71-82 (2013).
Anand et al., "Solar Cooling Systems for Climate Change Mitigation: A Review," Renewable and Sustainable Energy Reviews, vol. 41, pp. 143-161 (2015).
De Antonellis et al., "Simulation, Performance Analysis and Optimization of Desiccant Wheels," Energy and Buildings, vol. 42, No. 9, pp. 1386-1393 (2010).
Eriksson et al., "Diurnal Variations of Humidity and Ice Water Content in the Tropical Upper Troposphere," Atmos. Chem. Phys., vol. 10, pp. 11519-11533 (2010).
European Solar Thermal Industry Federation (ESTIF), "Key Issues for Renewable Heat in Europe (K4RES-H)," Solar Assisted Cooling—WP3, Task 3.5, Contract EIE/04/204/S07.38607, pp. 1-21 (2006).
Ge et al., "A Mathematical Model for Predicting the Performance of a Compound Desiccant Wheel (A Model of a Compound Desiccant Wheel)," Applied Thermal Engineering, vol. 30, No. 8, pp. 1005-1015 (2010).
Kassem et al., "Solar Powered Dehumidification Systems Using Desert Evaporative Coolers: Review," International Journal of Engineering and Advanced Technology {IJEAT), ISSN: 2249-8958, vol. 3, Issue 1 (2013).
Kolewar et al., "Feasability of Solar Desiccant Evaporative Cooling: A Review," International Journal of Scientific & Engineering Research, ISSN: 2229-5518, vol. 5, Issue 10 (2014).
La et al., "Technical Development of Rotary Desiccant Dehumidification and Air Conditioning: A Review," Renewable and Sustainable Energy Reviews, vol. 14, pp. 130-147 (2010).
Nia et al., "Modeling and Simulation of Desiccant Wheel for Air Conditioning," Energy and Buildings, vol. 38, No. 10, pp. 1230-1239 (2006).
Kozubal et al.,"Desiccant Enhanced Evaporative Air-Conditioning {DEVap): Evaluation of a New Concept in Ultra Efficient Air Conditioning," National Renewal Energy Laboratory {NREL), Technical Report, NREL/TP-5500-49722 (2011).
Critoph et al., "Solar Energy for Cooling and Refrigeration," Engineering Department, University of Warwick, Coventry CV4 7AL, United Kingdom (1997).
Wahlgren, "Atmospheric Water Vapour Processor Designs for Potable Water Production: A Review," Wat. Res., vol. 35, No. 1, pp. 1-22 (2001).
Gad et al., "Application of a Solar Desiccant/Collector System for Water Recovery From Atmospheric Air," Renewal Energy, vol. 22, No. 4, pp. 541-556 (2001).
William et al., "Desiccant System for Water Production From Humid Air Using Solar Energy," Energy, vol. 90, pp. 1707-1720 (2015).
Final Office Action dated Oct. 15, 2020 in U.S. Appl. No. 16/791,895.
Notice of Allowance dated Oct. 20, 2021 in U.S. Appl. No. 16/820,587.
Notice of Allowance dated Nov. 10, 2021 in U.S. Appl. No. 16/211,896.
Final Office Action dated Dec. 20, 2021 in U.S. Appl. No. 16/791,895.
Office Action dated Nov. 1, 2021 in Chinese Application No. 201780033378.3.
Office Action dated Oct. 20, 2021 in Chinese Patent Application No. 201780044144.9.

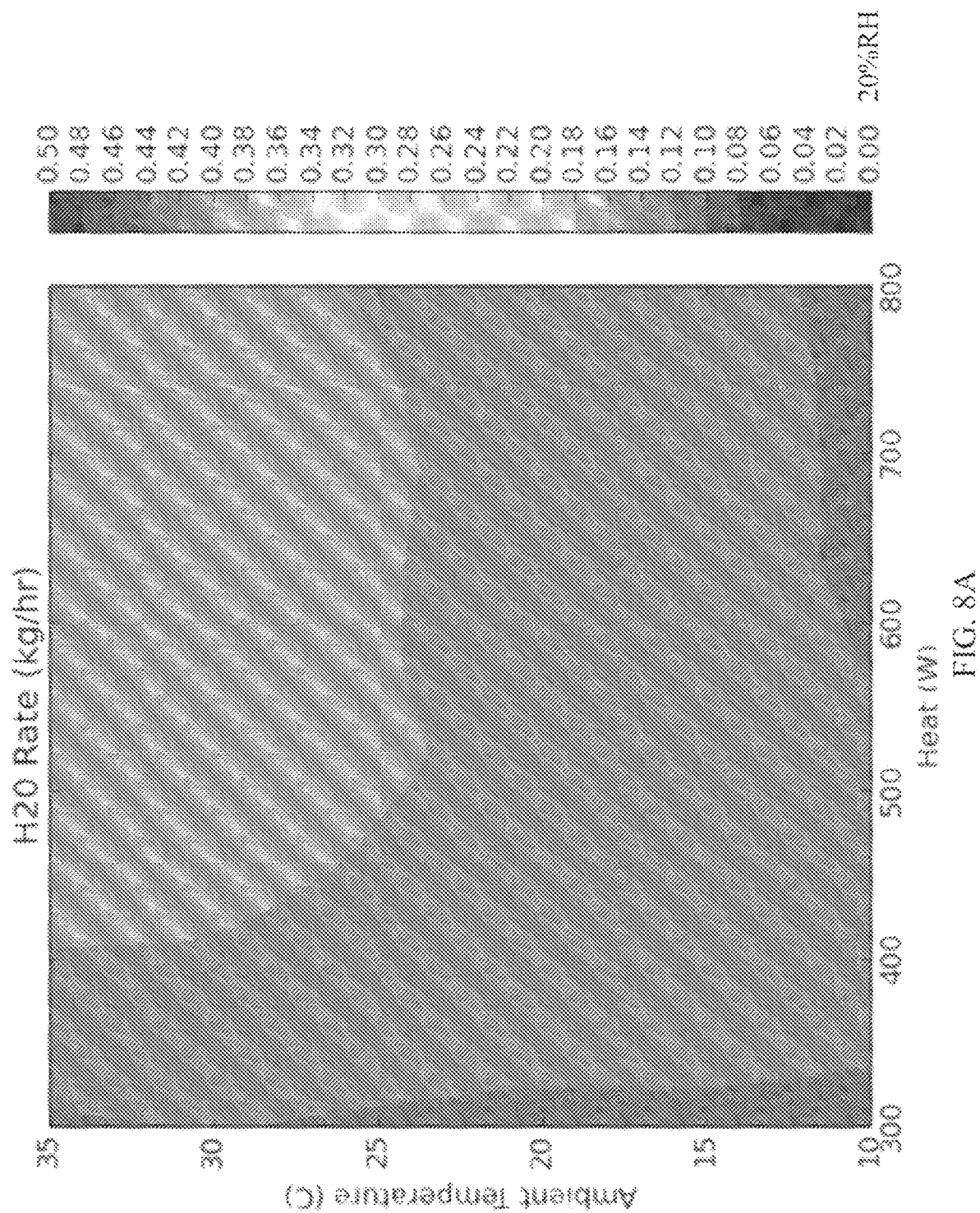

SYSTEMS AND METHODS FOR WATER EXTRACTION CONTROL

CROSS-REFERENCE TO RELATED APPLICATIONS

This application is a continuation of U.S. patent application Ser. No. 15/600,046, entitled "Systems and Methods for Water Extraction Control" and filed May 19, 2017, which claims priority to U.S. Provisional Application No. 62/339,649, entitled "Systems and Methods for Water Extraction Control" and filed May 20, 2016, by reference in its entirety.

This application incorporates U.S. patent application Ser. No. 15/600,046, U.S. Provisional Application No. 62/339,649, and U.S. Provisional Application No. 62/145,995, entitled "Systems and Methods for Generating Liquid Water From Air" and filed Apr. 10, 2015, by reference in their entirety.

BRIEF DESCRIPTION OF THE DRAWINGS

FIGS. 8A-8F show a series of water production rate graphs according to an embodiment of the invention.

DETAILED DESCRIPTION OF SEVERAL EMBODIMENTS

The systems and methods described herein are generally related to control systems for the extraction of liquid water from atmospheric air. In many embodiments, a controller, i.e., a control system, can be configured to control a system for extracting liquid water from air. In several embodiments, the system can comprise a thermal unit, a primary desiccant wheel, and a regeneration fluid path. In a number of embodiments, the controller can comprise a sensor, a motor, and a microcontroller coupled to the sensor and the motor. In some embodiments, the microcontroller can be configured to determine a water extraction efficiency based on at least one signal received from the sensor, and also can be configured to maximize the water extraction efficiency by adjusting a speed of the motor in response to the determined water extraction efficiency.

First, a general description of water extraction by a water extraction system is provided. Then, specific control system embodiments are presented in the context of specific water generation system examples.

Water Extraction

Figure 1:
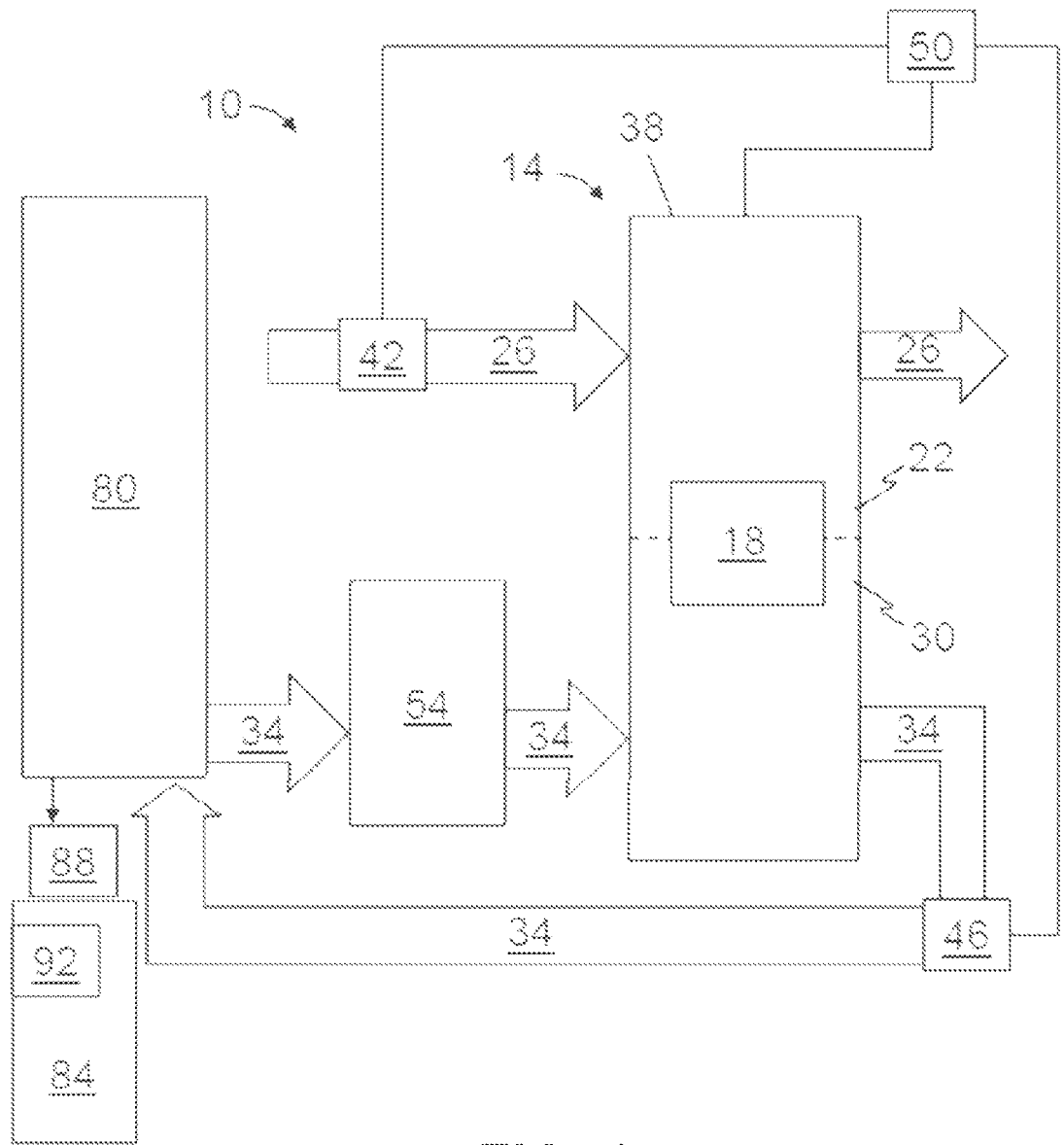
FIG. 1 is a diagram of a system for generating liquid water from air according to an embodiment of the invention.

Referring now to the drawings, and more particularly to FIG. 1, shown therein and designated by the reference numeral 10 is an example system for generating liquid water from air. System 10 may be configured to function responsive to diurnal variations. For example, as described in more detail below, system 10 may be configured to control one or more operational parameters (e.g., control and/or controlled variables) based on one or more diurnal variations (e.g., variations in ambient air temperature, ambient air relative humidity, solar insolation, and/or the like).

System 10 may comprise a desiccant unit 14. Desiccant unit 14 may comprise a desiccant (e.g., sorption medium) 18, where the desiccant 18 (e.g., or a portion thereof) may be selectively (e.g., and/or alternatively) movable between an adsorption zone 22, in which the desiccant is in fluid communication with a process air pathway (e.g., a process airflow path) 26 and a desorption zone 30, in which the desiccant is in fluid communication with a (e.g., closed-loop) regeneration fluid pathway (e.g., a regeneration fluid path) 34. In some embodiments, the adsorption and desorption zones may be defined by a housing (e.g., 38) of the desiccant unit.

Desiccant unit 14 may operate in a continuous, or non-batch, fashion, such that desiccant unit 14 is configured to absorb water and desorb water substantially simultaneously or simultaneously. For example, system 10 may be configured such that a first portion of desiccant 18 can be disposed within adsorption zone 22 (e.g., such that the first portion can capture water from process air in process air pathway 26), with a second portion of the desiccant simultaneously disposed within the desorption zone (e.g., such that the second portion can desorb water into regeneration fluid in regeneration fluid pathway 34). Regeneration fluids suitable for use in some embodiments of the present systems may include, but are not limited to, air (e.g., including any suitable amount of water vapor), super-saturated or high relative humidity gas (e.g., 90-100% relative humidity), glycols, ionic liquids, and/or the like.

Desiccant unit 14 may comprise a hygroscopic material (e.g., desiccant or sorption medium 18) configured to continuously alternate between a process air pathway 26 and a regeneration fluid pathway 34. In some embodiments, that the desiccant or sorption medium may be capable of quickly desorbing water back into low relative humidity air (e.g., to regenerate the desiccant) Therefore, in some embodiments, the performance of the desiccant or sorption medium may be driven by an ability to quickly cycle through an absorption state and a desorption state.

Desiccants 18 may comprise any suitable medium in any suitable configuration (e.g., such that the desiccant or sorption medium is capable of adsorption and desorption of water). In some embodiments, the desiccant or sorption medium may be capable of sorption at a first temperature and/or pressure and desorption at a second temperature and/or pressure. Suitable desiccants or sorption mediums may comprise liquids, solids, and/or combinations thereof. In some embodiments, desiccants or sorption mediums may comprise any suitable porous solid impregnated with hygroscopic materials. For example, desiccant 18 may comprise silica, silica gel, alumina, alumina gel, montmorillonite clay, zeolites, molecular sieves, activated carbon, metal oxides, lithium salts, calcium salts, potassium salts, sodium salts, magnesium salts, phosphoric salts, organic salts, metal salts, glycerin, glycols, hydrophilic polymers, polyols, polypropylene fibers, cellulosic fibers, derivatives thereof, and combinations of thereof. In some embodiments, the desiccant or sorption medium may be selected and/or configured to avoid sorption of certain molecules (e.g., molecules that may be poisonous when consumed by a human).

In some embodiments, desiccant particles may be packed in a shallow bed to maximize a surface area for interaction with air or fluid within adsorption zone 22 and desorption zone 30. In some embodiments, the desiccant particles may be agglomerated via a binder. In some embodiments, the desiccant particles may be dyed black (e.g., to improve absorption of thermal radiation). In some embodiments, the desiccant particles may be mixed and/or combined with thermal radiation absorbing materials.

System 10 may include one or more blowers 42 and/or one or more circulators 46. For example, in this embodiment, blower 42 is disposed in process air pathway 26 and is configured to adjust a flow rate of air through the process air pathway. Circulator 46, in this embodiment, is disposed in regeneration fluid pathway 34 and is configured to adjust a flow rate of fluid through the regeneration fluid pathway. In some embodiments, blower 42 and/or circulator 46 may be controlled by controller 50 (e.g., controlling a speed of blower 42 and/or circulator 46 to optimize liquid water production). In some embodiments, blower 42 and/or circulator 46 may be configured to substantially maintain a pre-determined flow rate through process air pathway 26 and/or regeneration fluid pathway 34, respectively.

System 10 may comprise a thermal unit 54 configured to provide thermal energy to fluid in regeneration fluid pathway 34 (e.g., such that desiccant 18 may be regenerated). In some embodiments, thermal unit 54 may be a solar thermal unit (e.g., is configured to convert solar insolation to thermal energy). While the present systems may comprise any suitable thermal unit, whether solar or otherwise, the following description of thermal unit 54 is provided by way of example.

Thermal unit 54 may comprise a transparent layer 62 configured to allow sunlight to enter casing 58 of the thermal unit (e.g., a sheet of transparent material, a lens, and/or the like, which may comprise glass, polymers, polycrystalline materials, derivatives thereof, combinations thereof, and/or the like). In embodiments comprising a glass transparent layer 62, the glass may be configured to maximize transmissivity (e.g., low-iron and/or no-iron materials, and/or other compositions, uncoated materials, and/or the like). Transparent layers may comprise multiple layers (e.g., multi-pane layers, such as, for example, double-paned glass).

Thermal unit 54 may comprise an absorber 68 configured to absorb thermal energy from the sunlight and provide at least a portion of the absorbed thermal energy to fluid in the regeneration fluid pathway (e.g., absorber 68 may comprise a thermally permeable material). Absorbers may comprise any suitable material, such as, for example, metals (e.g. aluminum, copper, steel), thermally stable polymers, or other material, and/or the like. Absorbers may be substantially flat, roughened, channeled, or corrugated, for example. In some embodiments, a matte black coating or selective film may be applied to the surface of the absorber material. Absorber 68 may be configured to transfer thermal energy to fluid in the regeneration fluid pathway without an intervening heat transfer fluid in some embodiments. In other embodiments, a fluid (e.g., liquid, gas, and/or the like) may be thermally disposed between the absorber and fluid in the regeneration fluid pathway (e.g., to function as a medium to transfer heat between the absorber and fluid in the regeneration fluid pathway).

Thermal unit 54 may comprise an insulator 72 configured to insulate at least a portion of casing 58. In this way, solar insolation may enter the casing of thermal unit 54 (e.g., through transparent layer 62), and insulator 72 may insulate a portion of the casing to, for example, minimize thermal energy losses to an environment outside of the thermal unit. Insulator(s) may comprise any suitable material (e.g., a material capable of resisting the flow of thermal energy), such as, for example, a solid foam comprising trapped pockets of gas and/or liquid. In some embodiments, insulators may be selected and/or configured for stability at high temperatures (e.g., temperatures exceeding 200° C.).

One or more channels 76 may be disposed in thermal communication with absorber 68 such that the absorber may transfer absorbed thermal energy to fluid (e.g., regeneration fluid, a flowable heat carrier medium, and/or the like) within the one or more channels. The one or more channels 76 may form part of regeneration fluid pathway 34 (e.g., one or more channels 76 are configured to convey regeneration fluid). The one or more channels 76 may comprise any suitable structure, such as, for example, tubular hollow bodies or a plurality of flat plates adapted for fluid flow therebetween, and/or the like.

System 10 may comprise a condenser 80 configured to receive fluid from the desorption zone via the regeneration fluid pathway and produce liquid water from the received fluid (e.g., by condensing water vapor in fluid in the regeneration fluid pathway). Condensers may comprise any suitable material and may be of any suitable configuration (e.g., to condense water vapor in regeneration fluid into liquid water). For example, suitable condensers may comprise polymers, metals, and/or the like. Condensers may be arranged to include coils, fins, plates, tortuous passages, mad/or the like. Condenser 80 may be configured to transfer thermal energy from fluid in regeneration fluid pathway 34 downstream of desiccant 18 to air in process air pathway 26 upstream of desiccant 18 (e.g., such that air in process air pathway 26 may facilitate cooling of condenser 80). In some embodiments, condenser 80 may be cooled by ambient air.

System 10 may comprise a water collection unit 84 configured to receive liquid water produced by condenser 80. Liquid water produced by the condenser may be provided to water collection unit 84 by way of gravity; however, in other embodiments, flow of liquid water from the condenser to the water collection unit may be assisted (e.g., by one or more pumps, any other suitable delivery mechanism, and/or the like).

System 10 may comprise a filter 88 (e.g., a filtration membrane), which may be positioned between condenser 80 and water collection unit 84 (e.g., to reduce an amount of impurities, such as, for example, sand, bacteria, fibrous, carbonaceous species, and/or the like, which may be present in liquid water produced by condenser 80).

Water collection unit 84 (e.g., or filter 88 thereof) may comprise an ultraviolet (UV) light source (e.g., for disinfection of water produced by condenser 80). In some embodiments, suitable light sources may comprise light emitting diodes (LEDs) having, for example: wavelengths below 400 nanometers (nm) (e.g., 385 nm, 365 nm, and/or the like), wavelengths below 300 nm (e.g., 265 nm), and/or the like.

Water collection unit 84 may comprise one or more water level sensors (e.g., 122*e*). Such water level sensors may comprise conductance sensors (e.g., open and/or closed circuit resistance-type conductance sensors), which may operate via conductivity measurement of water in the range of 0.1 msiemens per cm.

Water collection unit 84 may comprise a receptacle 92 configured to receive one or more additives for introduction to the produced liquid water. Such additives may be configured to dissolve slowly into liquid water stored in the water collection unit. Additives may include, but are not limited to, minerals, salts, other compounds, and/or the like. In some embodiments, additives may impart flavor to the produced liquid water. For example, additives may include potassium salts, magnesium salts, calcium salts, fluoride salts, carbonate salts, iron salts, chloride salts, silica, limestone, and/or combinations thereof. System 10 may comprise indicators (e.g., lights, such as, for example, LEDs), which may be configured to provide information regarding system operation. For example, in some embodiments, indicator lights may be configured to provide information (e.g., visually, for example, to a user) that the system is running, that solar power (e.g., from power unit 118) is available, that an air filter (e.g., within process air pathway 26) may need to be changed, that a water collection unit (e.g., 84) is full (e.g., in some embodiments, that the water collection unit contains 20 L of liquid water), that an actuator (e.g., actuator 114, blower 42, circulator 46, and/or the like) has failed and/or is failing, that telematics errors (e.g., as indicated by transceiver 126 operation) have and/or are occurring, and/or the like. As described below, any suitable information (including the information described above with reference to indicators) may be transmitted over a communications network (e.g., alone and/or in addition to operation of any indicators).

A controller (e.g., processor) 50 may control exposure of desiccant 18 (or a portion thereof) to air in process air pathway 26 and regeneration fluid in regeneration fluid pathway 34 (e.g., to increase and/or optimize the liquid water ultimately produced by condenser 80), and such control may vary over a diurnal cycle (e.g., in response to diurnal variations). Such variations in environmental conditions (e.g., inputs into controller 50) may include, for example, ambient air temperature, ambient air relative humidity, and solar insolation. Other inputs to controller 50 may include, for example, an amount of thermal energy generated by thermal unit 54, a relative humidity of air in process air pathway 26, a relative humidity of fluid in regeneration fluid pathway 34, a temperature of fluid in the regeneration fluid pathway between desiccant 18 and thermal unit 54, a rate of water production, and/or the like. In embodiments that include a purge airflow path (e.g., 130), inputs to controller 50 may include a flow rate, temperature, relative humidity and/or the like of air in the purge airflow path. Controller 50 may be configured to optimize liquid water production by controlling a rate of desiccant 18 movement between the adsorption zone and the desorption zone, controlling a speed of blower 42 and/or circulator 46, and/or the like, based, on measurements of one or more of such inputs (e.g., such that controller 50 may optimize liquid water production based on current environmental and system conditions). As described in more detail below, inputs to controller 50 may be measured in that they are indicated in data captured by one or more sensors (e.g., 122).

Specific controller embodiments and functions are described in greater detail in the "Control Systems and Methods" section below. Controller 50 is discussed in the "Water Extraction" section to explain how a controller may be integrated into the system 10 in general. However, it will be apparent to those of ordinary skill in the art that additional and/or alternative functions (e.g., those described in the "Control Systems and Methods" section) may be performed by controller 50 and/or other control systems in various water extraction system embodiments.

Figure 2:
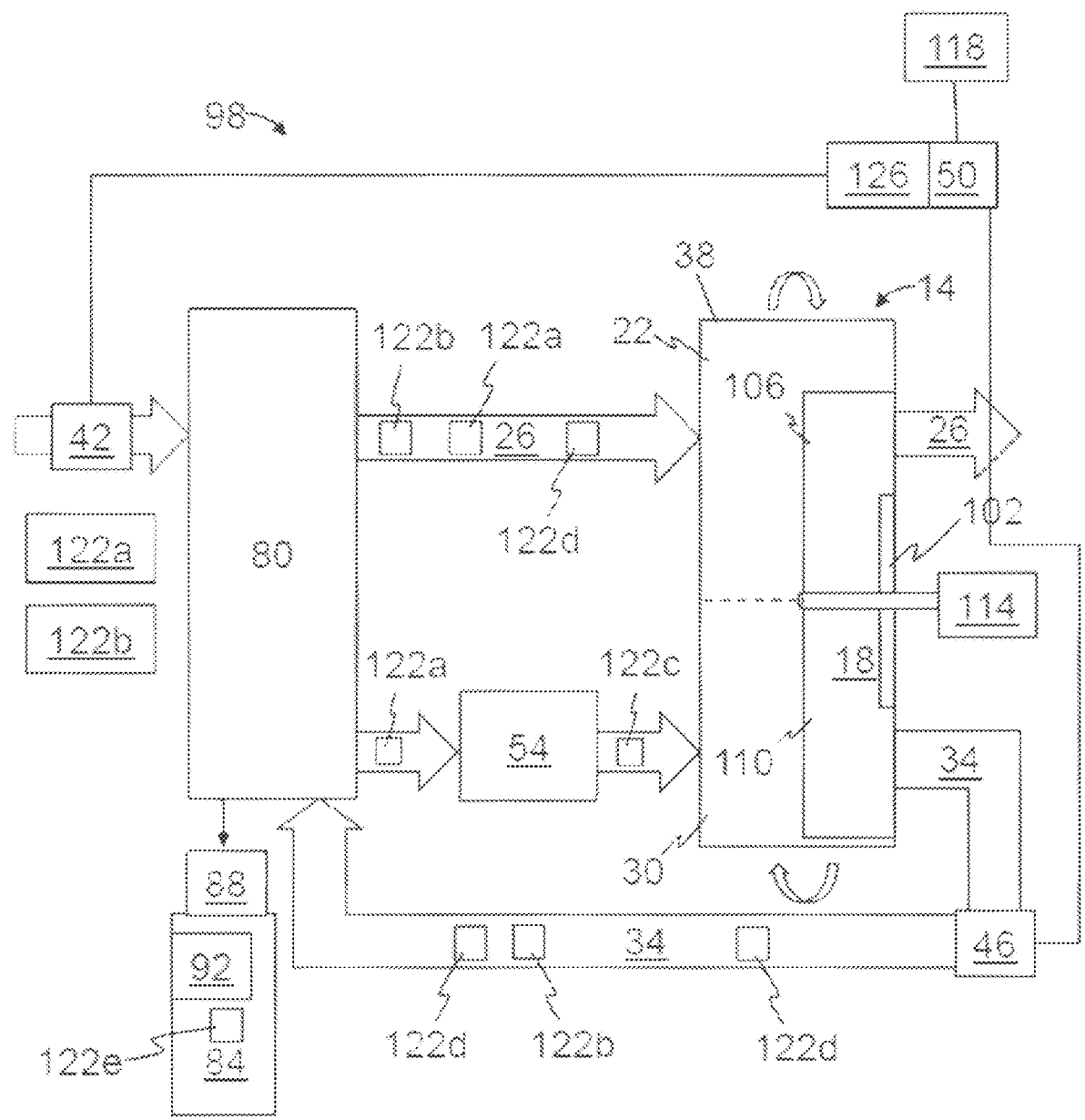
FIG. 2 is a diagram of a system for generating liquid water from air according to an embodiment of the invention.

FIG. 2 is a diagram of an embodiment 98 of a system for generating liquid water from air. System 98 may be substantially similar to system 10, with the primary differences and/or additions described below. Otherwise, system 98 may comprise any and/or all features described with respect to system 10.

In system 98, as with system 10, desiccant 18 (or a first portion thereof) may be in fluid communication with process air in process air pathway 26 while the desiccant 14 (or a second portion thereof) is simultaneously in fluid communication with regeneration fluid in regeneration fluid pathway 34, and, thus, desiccant unit 14 operates in a continuous and non-batch manner. In this embodiment, sections of desiccant 18 may be exposed to air in process air pathway 26 and fluid in regeneration fluid pathway 34 in an alternating manner.

System 98 may comprise a rotatable disk 102 (e.g., with desiccant 18 disposed thereon). Desiccant 18 (or sections thereof) may be configured to move between the adsorption zone and the desorption zone as disk 102 is rotated. For example, in the depicted orientation of disk 102, a portion 106 of the desiccant is in communication with process air pathway 26, and a portion 110 of the disk is in communication with regeneration fluid pathway 34. System 98 may comprise an actuator (e.g., electrical motor) 114 configured to cause rotation of disk 102. Controller 50 may be configured to optimize liquid water production at least by controlling movement (e.g., through control of actuator 114) of desiccant 18 (e.g., disk 102) between the adsorption zone and the desorption zone. In other embodiments, motor 114 may rotate disk 102 at a predetermined rotation rate.

System 98 may comprise a solar power unit 118 configured to provide power to at least a portion of system 98 (e.g., blower 42, circulator 46, actuator 114, and/or the like) Solar power unit 118 may be configured to convert solar insolation to electrical power (e.g., solar power unit 118 comprises a solar panel). For example, solar power unit 118 may be provided as a photovoltaic solar panel comprising semiconducting materials exhibiting a photovoltaic effect. In these and similar embodiments, controller 50 may be configured to control system 98 in response to diurnal variations in solar insolation (e.g., an amount of electrical power generated by solar power unit 118).

Systems for generating liquid water from air may be modular in nature. For example, systems may be configured such that each component (e.g. solar power unit 118, thermal unit 54, desiccant unit 14, condenser 80, water collection unit 84, and/or the like) may be separated from one another, transported, assembled and/or re-assembled with one another (e.g., in a same or a different configuration), and/or the like. For example, in some embodiments, the system may be configured such that no dimension of any singular component (e.g., water collection unit 84, desiccant unit 14, solar power unit 118, thermal unit 54, condenser 80, and/or the like) is larger than six to eight feet (e.g., to facilitate transport of the system or components thereof, for example, in a single cab truck bed, such as a bed of a Toyota Hilux pickup truck) (e.g., each component has a footprint that is less than or equal to 64 square feet ($ft^2$) and/or each component can be contained within a cubic volume less than or equal to 512 cubic feet ($ft^3$)).

Controller 50 may be configured to control one or more of blower 42, circulator 46, actuator 114, and/or the like (e.g., to optimize liquid water production, where such control may be in response to diurnal variations, for example, in ambient temperature, ambient air relative humidity, solar insolation, and/or the like). For example, controller 50 may be configured to increase a rate of liquid water production by controlling blower 42, circulator 46, actuator 114, and/or the like, taking into account, for example, diurnal variations. Such variations may change the amount of thermal energy generated by thermal unit 54, the level of electrical power provided by solar power unit 118, the level of humidity in process air entering the system, and/or the like. In some embodiments, ambient conditions may be measured in real-time or can be forecast based on, for example, historical averages and/or the like. In embodiments in which controller 50 receives real-time measurements, various sensors (described in more detail below) may provide data indicative of ambient conditions to controller 50 (e.g., continuously, periodically, when requested by controller 50, and/or the like).

Controller 50 may operate the system based on one or more of: a user selection, data received from one or more sensors, programmatic control, and/or by any other suitable bases. For example, controller 50 may be associated with peripheral devices (including sensors) for sensing data information, data collection components for storing data information, and/or communication components for communicating data information relating to the operation of the system.

System 98 may comprise one or more peripheral devices, such as sensors 122 (e.g., temperature sensors 122a, humidity sensors 122b, solar insolation sensor 122c, flow rate sensors 122d, water level sensors 122e, and/or the like). In some embodiments, one or more sensors (e.g., 122) may provide data indicative of ambient air temperature, ambient air relative humidity, solar insolation, process air temperature, regeneration fluid temperature, process air relative humidity, regeneration fluid relative humidity, process air flow rate, regeneration fluid flow rate, liquid water production rate, water usage rate, and/or the like.

One or more sensors 122 may be located remotely from other components of the system and may provide captured data to the other components of the system via a wired and/or wireless connection. For example, a town, village, city, and/or the like may include a plurality of the present systems, and one of the plurality of the present systems may provide data indicative of ambient environmental conditions (e.g., air temperature, air relative humidity, a solar insolation level, and/or the like) to another one of the plurality of the present systems. In this way, in some embodiments, a single sensor 122 may be shared by multiple systems. In some embodiments, data communicated to a controller (e.g., 50) by one or more peripheral devices (e.g., one or more sensors 122) may be stored in a data logging unit.

System 98 may comprise a telematics unit (e.g., a transmitter, receiver, transponder, transverter, repeater, transceiver, and/or the like, sometimes referred to herein as "transceiver 126"). For example, a transceiver 126 may be configured to communicate data to and/or from the system (e.g., controller 50) via a wired and/or wireless interface (e.g., which may conform to standardized communications protocols, such as, for example, GSM, SMS components operating at relatively low rates (e.g., operating every few minutes), protocols that may be geographically specified, and/or the like).

Transceiver 126 may be associated with a server and a communications network for communicating information between the server and the transceiver (e.g., and thus the system and/or a controller 50 thereof). Two-way communication may be facilitated by a cellular tower in cellular range of the system. In some embodiments, a database (e.g., which may be remote from the system) may be configured to store information received from the server over the communications network.

In embodiments with telematics capability, a network administrator or device owner may send a command to controller 50 to update or delete look-up table data (described below) and/or a control algorithm. In this way, data security may be maintained, for example, in the case that the system is stolen or otherwise lost.

Controller 50 may be configured to vary operation of system 98 at least based on real-time and/or forecast variations in ambient conditions. For example, controller 50 may control exposure of desiccant 18 (e.g., or sections thereof) to process air and regeneration fluid in response to changes in ambient conditions (e.g., by changing the rotational speed of disk 102, such that the time that a portion of desiccant 18 disposed thereon is exposed to process air in process air pathway 26 or regeneration fluid in regeneration fluid pathway 34 may be increased or decreased). In some embodiments, controller 50 may be configured to vary a size of an adsorption zone or a desorption zone (e.g., in response to diurnal variations).

Figure 3A:
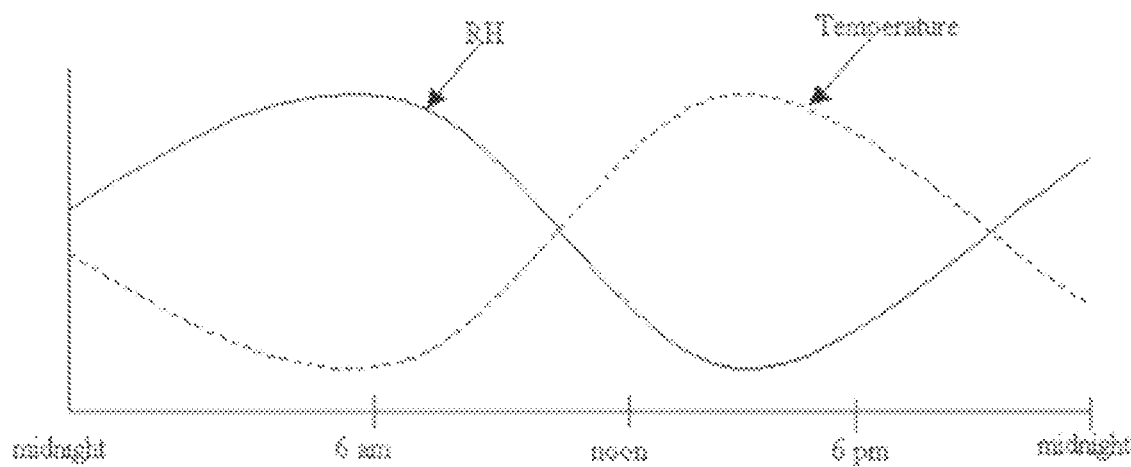
FIG. 3A is a graph of diurnal variations in environmental conditions over one day, including ambient air relative humidity ("RH") and temperature, according to an embodiment of the invention.
Figure 3B:
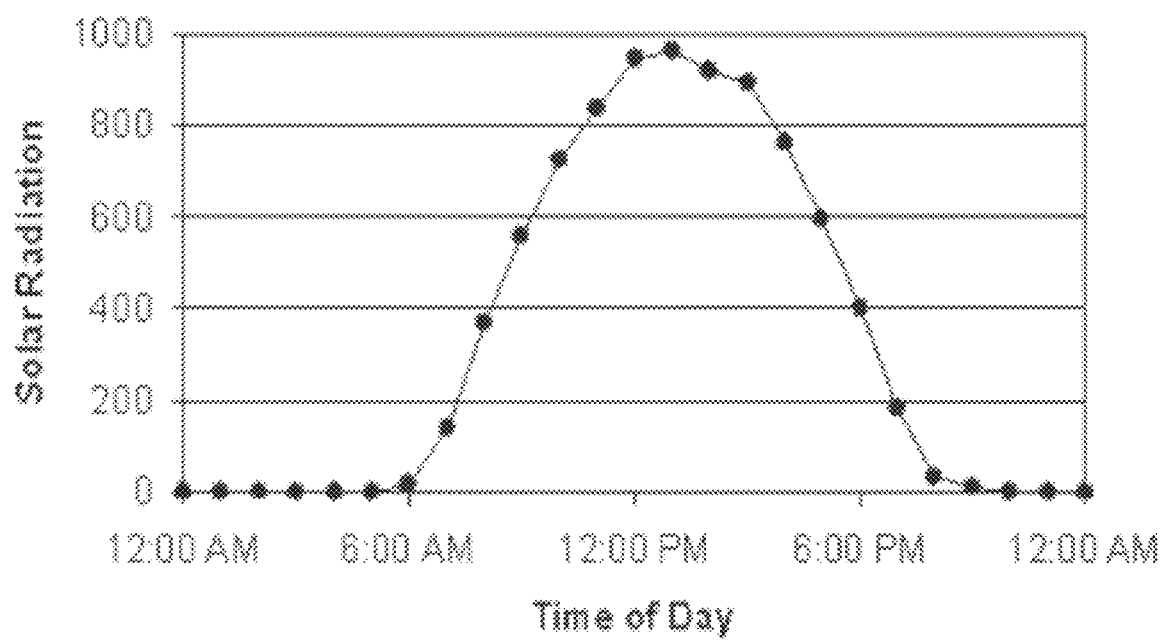
FIG. 3B is a graph of diurnal variations in environmental conditions over one day, including solar radiation (e.g., solar insulation), according to an embodiment of the invention.

FIG. 3A is a graph of diurnal variations in environmental conditions over one day, including ambient air relative humidity ("RH") and temperature. FIG. 3B is a graph of diurnal variations in environmental conditions over one day, including solar radiation (e.g., solar insolation). During nighttime hours, ambient air relative humidity may be relatively high, and ambient temperature may be relatively low. As the sun rises, solar insolation may increase (e.g., peaking around noon), which may result in a decrease in ambient air relative humidity and an increase in ambient temperature. At a certain point during the day, ambient air relative humidity may reach a minimum, and, at a certain point during the day, ambient temperature may increase to a maximum, and these points may generally coincide Finally, as the sun begins to set, ambient air relative humidity may tend to increase, and ambient temperature may tend to decrease (e.g., as solar insolation approaches its minimum during nighttime hours).

As shown, a particular set of environmental conditions may exist at each point in a diurnal cycle (e.g., ambient air relative humidity, ambient temperature, solar insolation, and/or the like). The system may be configured to vary operational parameters (e.g., control variables), taking into account variations in these environmental conditions, thus optimizing system performance (e.g., liquid water production) for each point of the diurnal cycle. By way of illustration, in the early part of a day, solar insolation may be relatively limited. Thus, in some embodiments, the system (e.g., or a controller 50 thereof) may adjust operational parameters to account for a relatively low amount of available solar thermal energy and/or a relatively low amount of electrical power available from solar power units, despite the relative high ambient air relative humidity. For example, in these circumstances, a controller may cause a desiccant to move more slowly between an adsorption zone and a desorption zone due to the relatively low amount of thermal energy and/or solar power available, despite the relatively high levels of ambient air relative humidity in available process air. On the other hand, later in the day, the controller may adjust operational parameters to account for a relatively low amount of ambient air relative humidity, despite a relatively high amount of available solar thermal energy and/or a relatively high amount of electrical power available from solar power units (e.g., due to a relatively high amount of solar insolation). Controllers may make such adjustments to operational parameters periodically and/or continuously.

Figure 4:
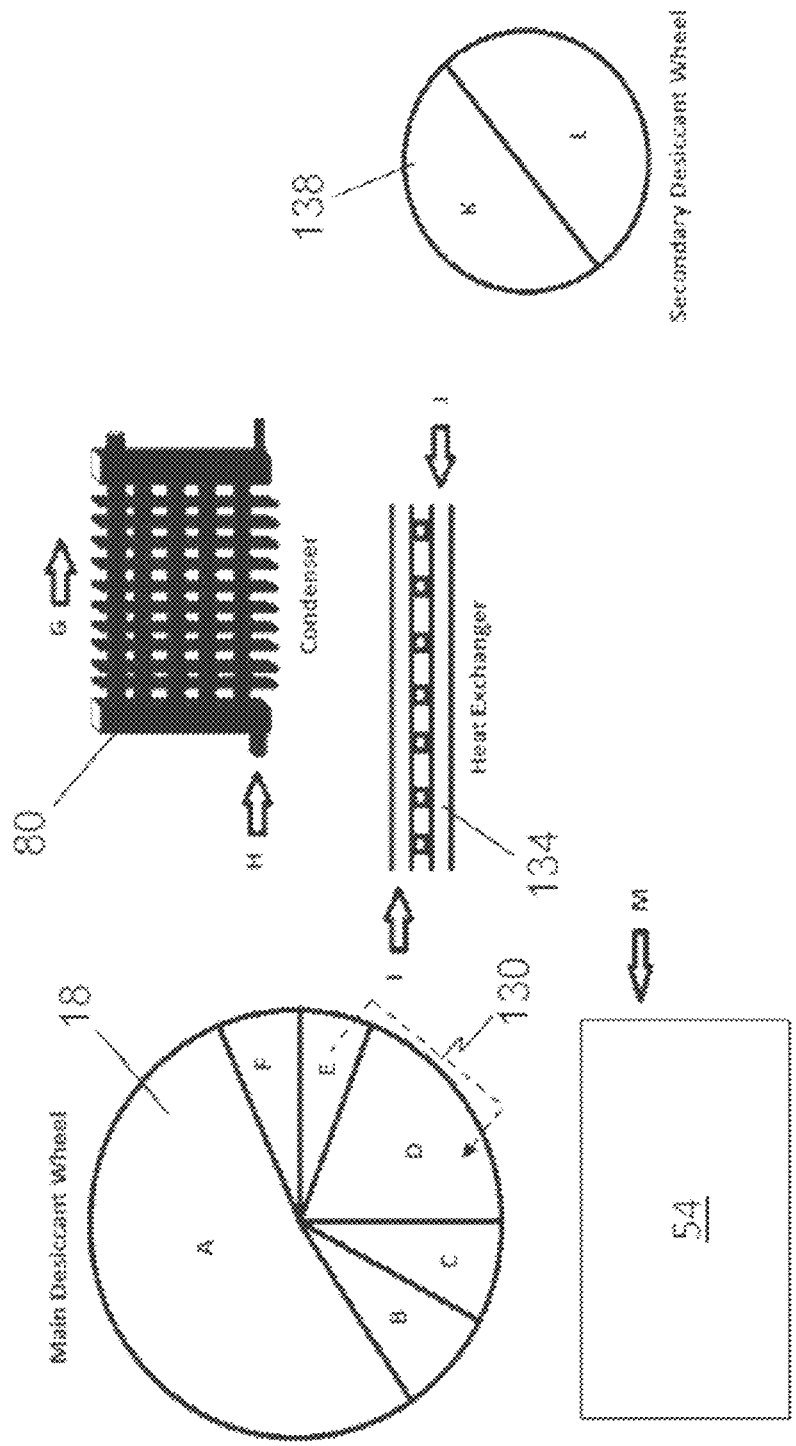
FIG. 4 is a diagram illustrating flow paths through systems for generating liquid water from air according to an embodiment of the invention.

FIG. 4 is a diagram illustrating example flow paths through some embodiments of the present systems for generating liquid water from air. Embodiments of the present systems for generating liquid water from air may comprise any suitable flow path (e.g., process air pathway and/or regeneration fluid pathway), including, for example, those described below (e.g., whether alone and/or in combination), which are provided merely by way of example.

In some embodiments, air within the process air pathway may enter the system from an outside environment, communicate with sections A, B, C, E. and F of a desiccant 18 (e.g., such that the desiccant or sections thereof may absorb water from the air in the process air pathway), pass through a condenser 80 (e.g., where air in the process air pathway may be heated by thermal energy from fluid in the regeneration fluid pathway), and be exhausted to the outside environment. In these and similar embodiments, regeneration fluid may pass through a condenser 80 (e.g., where fluid in the regeneration fluid pathway may transfer thermal energy to air in the process air pathway), pass through a thermal unit 54 (e.g., where fluid in the regeneration fluid pathway may be heated), communicate with section D of a desiccant 18 (e.g., such that the desiccant or sections thereof may release water to fluid in the regeneration fluid pathway), and flow back through the condenser (e.g., such that the condenser may produce liquid water from fluid in the regeneration fluid pathway).

In some embodiments, the present systems may include a purge airflow path 130 configured to transfer thermal energy from regeneration fluid in a regeneration fluid pathway downstream of a desiccant 18 to fluid in the regeneration fluid pathway upstream of the condenser. For example, in these and similar embodiments, process air may enter the system from an outside environment, communicate with sections A, B, and F of a desiccant 18, pass through a condenser 80, and be exhausted to the outside environment. In these and similar embodiments, regeneration fluid may pass through a condenser 80, pass through a thermal unit 54, communicate with section D of a desiccant 18, and flow back through the condenser. In these and similar embodiments, air in a purge airflow path 130 may communicate between section E of a desiccant 18 and section D of the desiccant (e.g., to transfer heat from section D of the desiccant, which may be provided to section D of the desiccant by regeneration fluid within the regeneration fluid pathway flowing from a thermal unit 54 to section E of the desiccant) (e.g., to perform a pre-heating operation before section E of the desiccant moves into a desorption zone).

Some embodiments may comprise a recovery heat exchanger 134 configured to transfer thermal energy from regeneration fluid in a regeneration fluid pathway downstream of a desiccant 18 to fluid in the regeneration fluid pathway upstream of the condenser. For example, in these and similar embodiments, process air may enter the system from an outside environment, communicate with sections A, B, C, E, and F of a desiccant 18, pass through a condenser 80, and be exhausted to the outside environment. In these and similar embodiments, regeneration fluid may pass through a condenser 80, pass through a heat exchanger (e.g., such that the heat exchanger may transfer thermal energy from fluid in the regeneration fluid pathway downstream of the desiccant to fluid in the regeneration fluid pathway upstream of the condenser), pass through a thermal unit 54, communicate with section D of the desiccant, flow back through the heat exchanger, and flow back through the condenser. In this way, thermal energy that may otherwise be lost to the environment through the condenser may be at least partially recovered to be used for desorption purposes.

Some embodiments may comprise a second desiccant 138 (e.g., which may be disposed on a disk, similarly to as described above for desiccant 18) configured to transfer water from fluid in the regeneration fluid pathway downstream of a condenser 80 to fluid in the regeneration fluid pathway upstream of the condenser. For example, in these and similar embodiments, process air may enter the system from an outside environment, communicate with sections A, B, C, E, and F of a desiccant 18, pass through a condenser 80, and be exhausted to the outside environment. In these and similar embodiments, regeneration fluid may pass through a condenser 80, communicate with section L of a second desiccant 138 (e.g., such that desiccant 138 may capture water in fluid in the regeneration fluid pathway before the fluid in the regeneration fluid pathway enters thermal unit 54), pass through a thermal unit 54, communicate with section D of the desiccant, communicate with section K of the second desiccant (e.g., such that desiccant 138 may release water to fluid in the regeneration fluid pathway before fluid in the regeneration fluid pathway enters condenser 80), and flow back through the condenser.

Some embodiments may achieve at least some of the functionality described above for a regeneration fluid pathway in communication with a second desiccant 138 without requiring a second desiccant. For example, in some embodiments, process air may enter the system from an outside environment, communicate with sections A, E, and F, of a desiccant 18, pass through a condenser 80, and be exhausted to the outside environment. n these and similar embodiments, regeneration fluid may pass through a condenser 80, communicate with section C of a desiccant 18, pass through a thermal unit 54, communicate with section D of the desiccant, communicate with section B of the desiccant, and flow back through the condenser.

In some embodiments, process air may enter the system from an outside environment, communicate with section A, E, and F of a desiccant 18, pass through a condenser 80, and be exhausted to an outside environment. In these and similar embodiments, regeneration fluid may pass through a condenser 80, communicate with section C of a desiccant 18, pass through a thermal unit 54, communicate with section D of the desiccant, and flow back through the condenser. Such embodiments may achieve at least some of the benefits of embodiments having a recovery heat exchanger 134 or a purge airflow path 130.

In some embodiments, process air may enter the system from an outside environment, communicate with sections A, B, E, and F of a desiccant 18, pass through a condenser 80, and be exhausted to an outside environment. In these and similar embodiments, regeneration fluid may pass through a condenser 80, flow through a recovery heat exchanger 134, communicate with section C of a desiccant 18, pass through a thermal unit 54, communicate with section D of the desiccant, flow back through the recovery heat exchanger, and flow back through the condenser.

In some embodiments of the present systems (e.g., 10, 98, and/or the like), production rate of liquid water ($H_2O_{rate}$) may be expressed, at least in part, as a function of environmental conditions (e.g., ambient air temperature ($T_{amb}$), ambient air relative humidity ($RH_{amb}$), and solar insolation ($Q_{solar}$)), as well as system operating parameters (e.g., control variables) (e.g., process air flow rate ($V_{process}$), regeneration fluid flow rate ($V_{regen}$), and exposure time of a desiccant to process air and regeneration fluid (e.g., which, for a desiccant disposed on a rotatable disk, may be a function of a rotation rate of the rotatable disk ($\omega_{disk}$))) (Eq 1).

$$H_2O_{rate} = f(T_{amb}, RH_{amb}, Q_{solar}, \omega_{disk}, V_{process}, V_{regen}) \quad (1)$$

Efficiency of some embodiments of the present systems may be expressed in a variety of ways. The following examples are provided only by way of illustration, and each of the following examples may be used alone or in combination with other expressions (whether or not explicitly disclosed below) to describe an efficiency of some embodiments of the present systems. For example, efficiency may be defined as:

$$\eta = \Delta H_{vap, H_2O} \frac{m_{liquid H_2O, produced}}{Q_{total}} \quad (2)$$

where $\eta$ represents efficiency, $\Delta H_{vap, H_2O}$ represents the heat of vaporization of water, $m_{liquid H_2O, produced}$ represents a mass of liquid water produced, and $Q_{total}$ represents the heat energy required by the system to produce the mass of liquid water. From Eq. 2, it can be seen that an efficiency of 100% equates to 2260 joules (J) of heat energy required to produce 1 gram (g) of liquid water.

In some embodiments, efficiency may be defined as regeneration efficiency, or, for example:

$$\eta = \frac{m_{liquid H_2O, produced}}{m_{H_2O, recirculating}} \quad (3)$$

where $m_{H_2O, recirculating}$ represents a total mass of water present in the regeneration fluid pathway. As seen in Eq. 3, efficiency may generally improve as exit temperature of regeneration fluid from the condenser decreases.

In some embodiments, efficiency may be defined in terms of an effectiveness parameter (e.g., determined from psychrometric charts). Such an effectiveness parameter may be defined, for example, as the ratio of an actual amount of water adsorbed and/or desorbed by a desiccant to an idea isenthalpic path in the psychrometric chart. To illustrate, an effectiveness parameter may tend towards a value of unity (one), with higher gel carrying capacities, decreased disk rotation rates, lower disk heat capacity, and/or the like.

In some embodiments, efficiency may be defined as dehumidification effectiveness, or, for example.

$$\eta = \frac{m_{H_2O, in} - m_{H_2O, out}}{m_{H_2O, in}} \quad (4)$$

where $m_{H_2O, In}$ represents a total mass of water present in air entering process air pathway 26, and $m_{H_2O, out}$ represents a total mass of water leaving process air pathway 26.

Figure 5A:
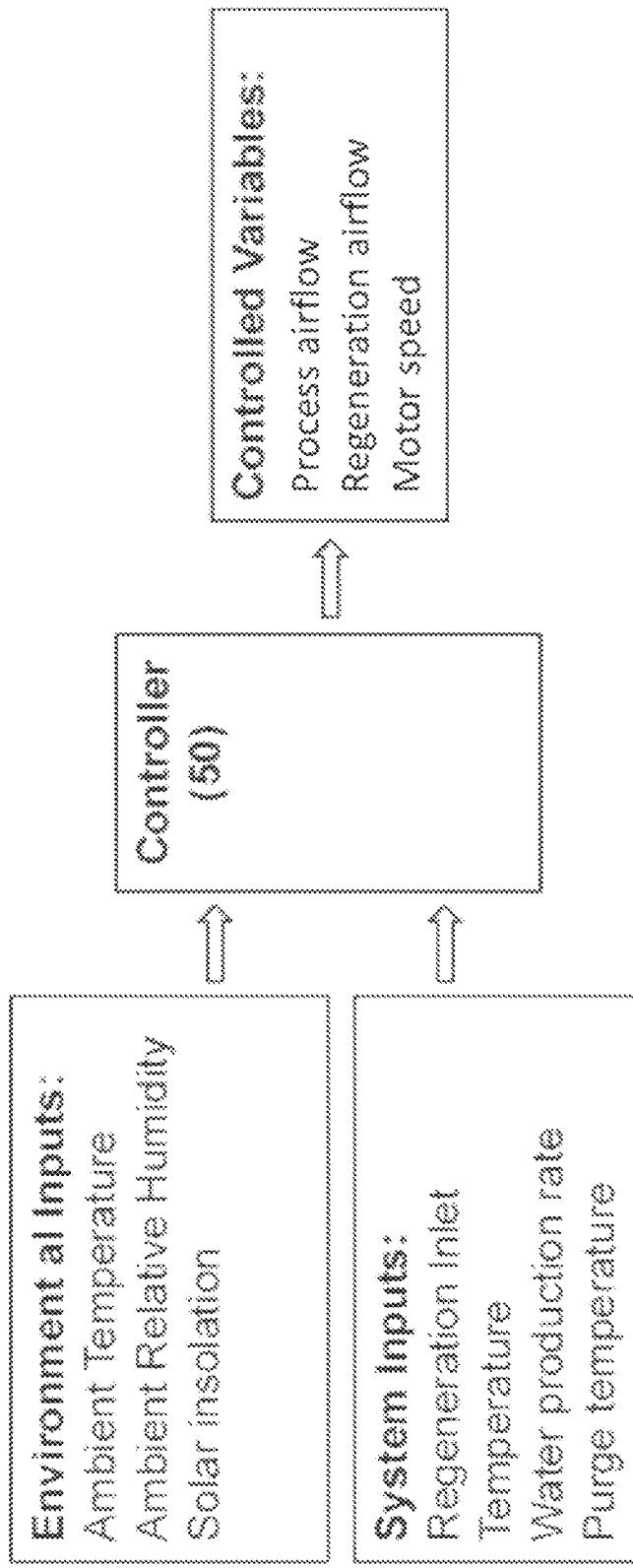
FIG. 5A is a diagram of a controller according to an embodiment of the invention.

As depicted in FIG. 5A, in some embodiments, a controller 50 may control the system operating parameters, based on one or more of the environmental conditions (e.g., which may be measured by and/or indicated in data captured by one or more sensors 122) in order to optimize, for example, liquid water production. By way of illustration, in some embodiments, for each combination of particular environmental conditions corresponding to a given point in the diurnal cycle (e.g., 0° C.<$T_{amb}$<45° C.; 20%<$RH_{amb}$<90%; 200 watts per square meter (W/m)<$Q_{solar}$<1000 W/m²), the controller may perform a simulation using a model of a system (e.g., 10, 98, and/or the like) to estimate the optimal system operating parameters (e.g., $(\omega_{disk})_{optimum}$, $(V_{process})_{optimum}$, and $(V_{regen})_{optimum}$), that maximize and/or optimize liquid water production (e.g., as defined in Eq. 1), where:

$$(\omega_{disk})_{optimum} = f(T_{amb}, RH_{amb}, Q_{solar}) \quad (5)$$

$$(V_{process})_{optimum} = f(T_{amb}, RH_{amb}, Q_{solar}) \quad (6)$$

$$(V_{regen})_{optimum} = f(T_{amb}, RH_{amb}, Q_{solar}) \quad (7)$$

In some embodiments, a controller 50 may employ a control algorithm that incorporates design variables (e.g. disk 102 geometry, such as, for example, thickness, radius, and/or the like, thermal unit 54 geometry, and/or the like), and, in some embodiments, these design variables may be incorporated in the control algorithm along with environmental conditions (e.g. ambient air temperature, ambient air relative humidity, solar insolation, and/or the like).

As described above, in some embodiments, ambient air temperature and ambient air relative humidity may be measured directly with one or more sensors 122. In some embodiments, solar insolation may be measured indirectly (e.g., and continuously) by measuring a temperature of fluid in the regeneration fluid pathway between a thermal unit 54 and a desiccant 18 (e.g., at a known and controlled flow rate of regeneration fluid through the regeneration fluid pathway). In some embodiments, data captured by various sensor(s) may be transmitted to a controller (e.g., which may be in communication with a memory that stores a look-up table containing data generated during simulation runs) which then determines the optimum system operating parameters (e.g., process air flow rate, regeneration fluid flow rate, disk rotation rate, and/or the like).

In some embodiments, a numerical simulator may be used to create a look-up table of optimized operational parameters for the system. For example, in these embodiments, each run of the numerical simulator may take a single set of design specifications (e.g. disk kinetics, disk size, desiccant configuration, solar collector size, condenser geometry and performance, and/or the like), instantaneous and/or forecast ambient conditions (e.g. ambient air temperature, ambient air relative humidity, a level of solar insolation), and system operation variables (e.g., process air flow rate, regeneration fluid flow rate, desiccant exposure time to process air and/or regeneration fluid, and/or the like) to determine and/or estimate an optimized efficiency and/or liquid water production rate for the system (e.g., which optimized values may vary over a diurnal cycle).

Figure 5B:
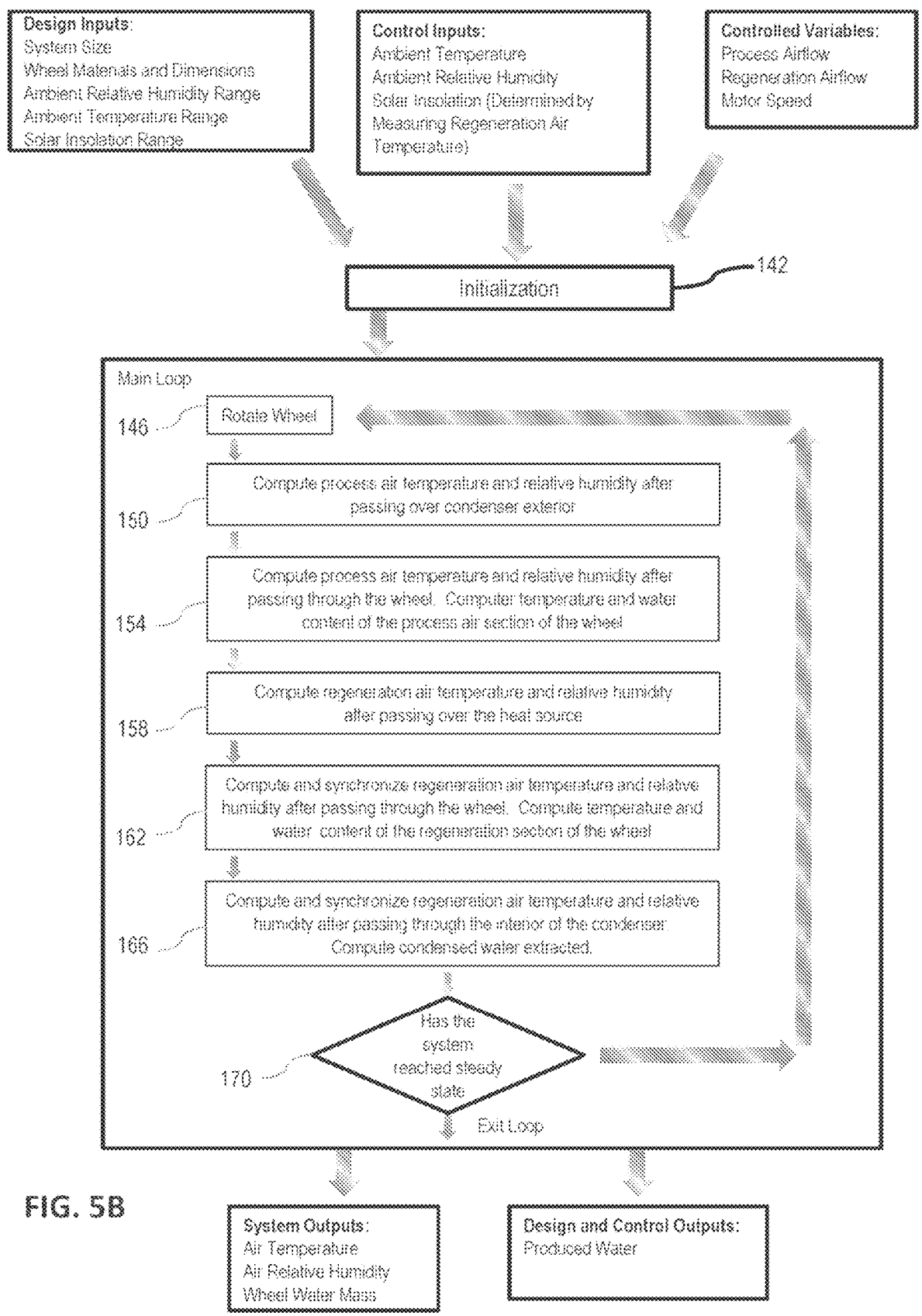
FIG. 5B is a diagram of a control process according to an embodiment of the invention.

FIG. 5B is a flow chart of a non-limiting example of simulation-based control suitable for use in some embodiments of the present systems. Note that while simulation-based control may be used in some cases, additional control schemes and methods are discussed in the "Control Systems and Methods" section below. As shown, the system may be initialized at step 142 with one or more design inputs, control inputs, and/or controller variables. In this embodiment, design inputs can include one or more of system size, disk materials and/or dimensions, desiccant materials and/or dimensions, control inputs can include ambient air relative humidity (e.g., or a range thereof), ambient air temperature (e.g., or a range thereof), and a level of solar insolation (e.g., or a range thereof), and controller variables may include process air flow rate, regeneration fluid flow rate, desiccant rate of movement, and/or the like. In some embodiments, one or more of the steps of this example may be performed by a controller 50. In some embodiments, certain steps depicted in FIG. 5I may be omitted.

At step 146, movement of a desiccant 18 may be simulated (e.g., by simulating rotation of disk 102 by a small amount, such as, for example, from 1-5°). In this embodiment, at step 150, simulated process air may be passed over a simulated condenser 80. In the depicted embodiment, also at step 150, process air temperature and process air relative humidity may be recalculated (e.g., using thermodynamic equations) after picking up thermal energy within the simulated condenser. At step 154, in this embodiment, process air fluid communication with the desiccant may be simulated, and process air temperature and process air relative humidity may be recalculated based on the simulated interaction with the desiccant.

At step 158, a simulation of regeneration fluid passing through a thermal unit (e.g., 54) may be performed, where regeneration fluid temperature and regeneration fluid relative humidity may be recalculated (e.g., again, using thermodynamic equations). In the depicted embodiment, at step 162, regeneration fluid communication with the desiccant may be simulated, and the system may determine the regeneration fluid temperature and regeneration fluid relative humidity after the simulated interaction with the desiccant. In this embodiment, also at step 162, the system may determine the temperature and water content of the desiccant (or a portion thereof). In some embodiments, temperature sensor may provide readings more quickly than humidity sensor. To compensate for this effect, controller 50 may synchronize the readings by passing temperature readings through a signal filter (e.g., a first-order low-pass digital filter implemented in controller 50 hardware or software or firmware executed by controller 50) to slow the temperature sensor reading response time to match the response time of the humidity sensor. At step 166, regeneration fluid passing through the condenser may be simulated, and the regeneration fluid temperature and the regeneration fluid relative humidity may be recalculated. As in step 162, in some embodiments controller 50 may synchronize the readings by passing temperature readings through a signal filter (e.g., a first-order low-pass digital filter implemented in controller 50 hardware or software or firmware executed by controller 50) to slow the temperature sensor reading response time to match the response time of the humidity sensor. In some embodiments, the amount of condensed water produced may also be calculated at step 166. At step 170, the systems of equations used to perform at least some of steps 146 through 166 may be evaluated to determine if a steady state solution has been reached. In this embodiment, if no steady state solution has been reached, the main loop may be repeated beginning at step 146.

Once a steady state solution is reached, in the embodiment shown, the controller 50 may set the process air flow rate, the regeneration fluid flow rate, and the rate of movement of the desiccant (e.g., in a real system, for example, corresponding to the simulated system used to perform the steps of FIG. 5B) to optimize liquid water production and/or efficiency. The above steps are provided only by way of example, as, in some embodiments, the sequence of these steps may be changed. For example, in another embodiment, two separate process air pathways may exist such that in one of the process air pathways, process air passes through a condenser 80, and in the other of the process air pathways, process air passes through a desiccant 18, and the above steps may be modified accordingly.

In some embodiments, each run of the simulation depicted in FIG. 6B may produce a single data point in the data look-up table (e.g., liquid water production rate and/or efficiency) as a function of the design inputs, control inputs, and/or control variables. Such a numerical simulation may be repeated many times (e.g. from 100 to 100,000 times or more) to produce a look-up table of liquid water production rates and/or efficiencies as a function of the relevant variables. Such a table may then be used by a controller 50 to operate a system (e.g. 10, 98, and/or the like), for example, by referencing optimal control variables (e.g., process air flow rate, regeneration fluid flow rate, desiccant movement rate, and/or the like) based upon known design inputs and/or measured control inputs (e.g., ambient air temperature, ambient air relative humidity, a level of solar insolation, and/or the like).

By way of example, Table 1, below, provides optimized operating conditions (e.g., control variables) versus design inputs and control inputs for an embodiment of the present systems that includes a disk 102 having a silica desiccant disposed thereon. TABLE 1: Illustrative Optimal Operating Conditions and Design Specifications for an Embodiment of the Present Systems for Generating Liquid Water from Air

TABLE 1

| Ambient Air % RH | Ambient Air Temp (C.) | Desiccant Rotation Rate (°/s) | Process Air Flow Rate (cfm) | Regeneration Fluid Flow Rate (cfm) | Heat (W) | Desiccant Thickness (m) | Disk Outer Radius (m) | Exhaust Process Air % RH | Liquid $H_2O$ Production Rate (L/hr) | Efficiency |
|---|---|---|---|---|---|---|---|---|---|---|
| 20% | 10 | 0.6 | 90 | 4 | 300 | 0.05 | 0.12 | 9% | 0.114789 | 24% |
| 20% | 10 | 1 | 90 | 4 | 400 | 0.05 | 0.12 | 7% | 0.128647 | 20% |
| 20% | 10 | 1.4 | 90 | 4 | 500 | 0.05 | 0.12 | 6% | 0.126455 | 16% |
| 20% | 10 | 1 | 90 | 4 | 600 | 0.05 | 0.12 | 6% | 0.117378 | 12% |
| 20% | 10 | 1 | 90 | 4 | 700 | 0.05 | 0.12 | 6% | 0.117324 | 11% |
| 20% | 10 | 1 | 90 | 4 | 800 | 0.05 | 0.12 | 6% | 0.117304 | 9% |
| 20% | 15 | 0.6 | 90 | 4 | 300 | 0.05 | 0.12 | 10% | 0.116898 | 24% |
| 20% | 15 | 1 | 90 | 4 | 400 | 0.05 | 0.12 | 8% | 0.135425 | 21% |

TABLE 1-continued

| Ambient Air % RH | Ambient Air Temp (C.) | Desiccant Rotation Rate (°/s) | Process Air Flow Rate (cfm) | Regeneration Fluid Flow Rate (cfm) | Heat (W) | Desiccant Thickness (m) | Disk Outer Radius (m) | Exhaust Process Air % RH | Liquid H₂O Production Rate (L/hr) | Efficiency |
|---|---|---|---|---|---|---|---|---|---|---|
| 20% | 15 | 1.4 | 90 | 5 | 500 | 0.05 | 0.12 | 7% | 0.13665 | 17% |
| 20% | 15 | 1.4 | 90 | 5 | 600 | 0.05 | 0.12 | 7% | 0.127931 | 13% |
| 20% | 15 | 1.4 | 90 | 4 | 700 | 0.05 | 0.12 | 7% | 0.123528 | 11% |
| 20% | 15 | 1.4 | 90 | 4 | 800 | 0.05 | 0.12 | 7% | 0.123402 | 10% |
| 20% | 20 | 0.6 | 90 | 4 | 300 | 0.05 | 0.12 | 11% | 0.114592 | 24% |
| 20% | 20 | 1 | 90 | 4 | 400 | 0.05 | 0.12 | 10% | 0.136252 | 21% |
| 20% | 20 | 1.4 | 90 | 4 | 500 | 0.05 | 0.12 | 9% | 0.140614 | 18% |
| 20% | 20 | 1.8 | 90 | 5 | 600 | 0.05 | 0.12 | 8% | 0.133403 | 14% |
| 20% | 20 | 1.4 | 90 | 4 | 700 | 0.05 | 0.12 | 8% | 0.125402 | 11% |
| 20% | 20 | 1.8 | 90 | 6 | 800 | 0.05 | 0.12 | 7% | 0.127496 | 10% |
| 20% | 25 | 1 | 90 | 4 | 300 | 0.05 | 0.12 | 12% | 0.117521 | 25% |
| 20% | 25 | 1 | 90 | 5 | 400 | 0.05 | 0.12 | 11% | 0.142599 | 22% |
| 20% | 25 | 1.4 | 90 | 4 | 500 | 0.05 | 0.12 | 9% | 0.155649 | 20% |
| 20% | 25 | 1.8 | 90 | 5 | 600 | 0.05 | 0.12 | 8% | 0.15298 | 16% |
| 20% | 25 | 1.4 | 90 | 5 | 700 | 0.05 | 0.12 | 9% | 0.151051 | 14% |
| 20% | 25 | 1.4 | 90 | 4 | 800 | 0.05 | 0.12 | 9% | 0.137663 | 11% |
| 20% | 30 | 1 | 90 | 4 | 300 | 0.05 | 0.12 | 13% | 0.120365 | 25% |
| 20% | 30 | 1.4 | 90 | 5 | 400 | 0.05 | 0.12 | 11% | 0.144586 | 23% |
| 20% | 30 | 1.4 | 90 | 4 | 500 | 0.05 | 0.12 | 10% | 0.158795 | 20% |
| 20% | 30 | 1.4 | 90 | 4 | 600 | 0.05 | 0.12 | 10% | 0.166699 | 17% |
| 20% | 30 | 1.8 | 90 | 5 | 700 | 0.05 | 0.12 | 9% | 0.164122 | 15% |
| 20% | 30 | 2.6 | 90 | 6 | 800 | 0.05 | 0.12 | 8% | 0.148756 | 12% |
| 20% | 35 | 1 | 90 | 4 | 300 | 0.05 | 0.12 | 13% | 0.117452 | 25% |
| 20% | 35 | 1.4 | 90 | 4 | 400 | 0.05 | 0.12 | 12% | 0.139812 | 22% |
| 20% | 35 | 1.4 | 90 | 4 | 500 | 0.05 | 0.12 | 11% | 0.147449 | 19% |
| 20% | 35 | 1.4 | 90 | 4 | 600 | 0.05 | 0.12 | 11% | 0.152162 | 16% |
| 20% | 35 | 1.4 | 90 | 4 | 700 | 0.05 | 0.12 | 11% | 0.155368 | 14% |
| 20% | 35 | 1.4 | 90 | 4 | 800 | 0.05 | 0.12 | 11% | 0.157911 | 12% |
| 30% | 10 | 0.6 | 90 | 4 | 300 | 0.05 | 0.12 | 14% | 0.129974 | 27% |
| 30% | 10 | 1 | 90 | 4 | 400 | 0.05 | 0.12 | 11% | 0.15635 | 25% |
| 30% | 10 | 1 | 90 | 5 | 500 | 0.05 | 0.12 | 9% | 0.169455 | 21% |
| 30% | 10 | 1.4 | 90 | 5 | 600 | 0.05 | 0.12 | 8% | 0.171671 | 18% |
| 30% | 10 | 1.4 | 90 | 5 | 700 | 0.05 | 0.12 | 8% | 0.169347 | 15% |
| 30% | 10 | 1.4 | 90 | 5 | 800 | 0.05 | 0.12 | 8% | 0.169209 | 13% |
| 30% | 15 | 0.6 | 90 | 4 | 300 | 0.05 | 0.12 | 16% | 0.135576 | 28% |
| 30% | 15 | 1 | 90 | 4 | 400 | 0.05 | 0.12 | 13% | 0.164791 | 26% |
| 30% | 15 | 1.4 | 90 | 5 | 500 | 0.05 | 0.12 | 11% | 0.177866 | 22% |
| 30% | 15 | 1.4 | 90 | 5 | 600 | 0.05 | 0.12 | 10% | 0.181001 | 19% |
| 30% | 15 | 1.4 | 90 | 5 | 700 | 0.05 | 0.12 | 10% | 0.178858 | 16% |
| 30% | 15 | 1.4 | 90 | 5 | 800 | 0.05 | 0.12 | 10% | 0.178663 | 14% |
| 30% | 20 | 0.6 | 90 | 4 | 300 | 0.05 | 0.12 | 17% | 0.138859 | 29% |
| 30% | 20 | 1 | 90 | 4 | 400 | 0.05 | 0.12 | 14% | 0.170558 | 27% |
| 30% | 20 | 1.4 | 90 | 5 | 500 | 0.05 | 0.12 | 13% | 0.186046 | 23% |
| 30% | 20 | 1.8 | 90 | 6 | 600 | 0.05 | 0.12 | 11% | 0.190955 | 20% |
| 30% | 20 | 1.8 | 90 | 6 | 700 | 0.05 | 0.12 | 10% | 0.190329 | 17% |
| 30% | 20 | 1.8 | 90 | 6 | 800 | 0.05 | 0.12 | 10% | 0.191953 | 15% |
| 30% | 25 | 0.6 | 90 | 4 | 300 | 0.05 | 0.12 | 18% | 0.142598 | 30% |
| 30% | 25 | 1 | 90 | 4 | 400 | 0.05 | 0.12 | 16% | 0.181979 | 29% |
| 30% | 25 | 1.4 | 90 | 5 | 500 | 0.05 | 0.12 | 14% | 0.205825 | 26% |
| 30% | 25 | 1.8 | 90 | 6 | 600 | 0.05 | 0.12 | 12% | 0.217698 | 23% |
| 30% | 25 | 1.8 | 90 | 6 | 700 | 0.05 | 0.12 | 11% | 0.217838 | 20% |
| 30% | 25 | 2.2 | 90 | 6 | 800 | 0.05 | 0.12 | 11% | 0.216324 | 17% |
| 30% | 30 | 0.6 | 90 | 4 | 300 | 0.05 | 0.12 | 19% | 0.143171 | 30% |
| 30% | 30 | 1 | 90 | 4 | 400 | 0.05 | 0.12 | 17% | 0.188855 | 30% |
| 30% | 30 | 1.4 | 90 | 5 | 500 | 0.05 | 0.12 | 15% | 0.215839 | 27% |
| 30% | 30 | 1.8 | 90 | 6 | 600 | 0.05 | 0.12 | 13% | 0.228551 | 24% |
| 30% | 30 | 2.2 | 90 | 6 | 700 | 0.05 | 0.12 | 12% | 0.229472 | 21% |
| 30% | 30 | 2.2 | 90 | 6 | 800 | 0.05 | 0.12 | 12% | 0.227413 | 18% |
| 30% | 35 | 0.6 | 90 | 5 | 300 | 0.05 | 0.12 | 21% | 0.157775 | 33% |
| 30% | 35 | 1 | 90 | 4 | 400 | 0.05 | 0.12 | 18% | 0.190279 | 30% |
| 30% | 35 | 1.4 | 90 | 5 | 500 | 0.05 | 0.12 | 16% | 0.216748 | 27% |
| 30% | 35 | 1.8 | 90 | 6 | 600 | 0.05 | 0.12 | 14% | 0.256955 | 27% |
| 30% | 35 | 2.2 | 90 | 6 | 700 | 0.05 | 0.12 | 13% | 0.259982 | 23% |
| 30% | 35 | 2.6 | 90 | 7 | 800 | 0.05 | 0.12 | 12% | 0.235721 | 18% |
| 40% | 10 | 0.6 | 90 | 4 | 300 | 0.05 | 0.12 | 19% | 0.147654 | 31% |
| 40% | 10 | 0.6 | 90 | 4 | 400 | 0.05 | 0.12 | 16% | 0.182417 | 29% |
| 40% | 10 | 1 | 90 | 4 | 500 | 0.05 | 0.12 | 13% | 0.209919 | 26% |
| 40% | 10 | 1.4 | 90 | 5 | 600 | 0.05 | 0.12 | 11% | 0.218139 | 23% |
| 40% | 10 | 1.4 | 90 | 5 | 700 | 0.05 | 0.12 | 11% | 0.218186 | 20% |
| 40% | 10 | 1.4 | 90 | 5 | 800 | 0.05 | 0.12 | 11% | 0.217967 | 17% |
| 40% | 15 | 0.6 | 90 | 4 | 300 | 0.05 | 0.12 | 21% | 0.154558 | 32% |
| 40% | 15 | 1 | 90 | 4 | 400 | 0.05 | 0.12 | 18% | 0.189338 | 30% |
| 40% | 15 | 1 | 90 | 4 | 500 | 0.05 | 0.12 | 15% | 0.219899 | 28% |
| 40% | 15 | 1.4 | 90 | 5 | 600 | 0.05 | 0.12 | 13% | 0.230924 | 24% |
| 40% | 15 | 1.4 | 90 | 5 | 700 | 0.05 | 0.12 | 13% | 0.230829 | 21% |

TABLE 1-continued

| Ambient Air % RH | Ambient Air Temp (C.) | Desiccant Rotation Rate (°/s) | Process Air Flow Rate (cfm) | Regeneration Fluid Flow Rate (cfm) | Heat (W) | Desiccant Thickness (m) | Disk Outer Radius (m) | Exhaust Process Air % RH | Liquid H₂O Production Rate (L/hr) | Efficiency |
|---|---|---|---|---|---|---|---|---|---|---|
| 40% | 15 | 1.4 | 90 | 5 | 800 | 0.05 | 0.12 | 13% | 0.230595 | 18% |
| 40% | 20 | 0.6 | 90 | 4 | 300 | 0.05 | 0.12 | 23% | 0.159779 | 33% |
| 40% | 20 | 1 | 90 | 4 | 400 | 0.05 | 0.12 | 20% | 0.197003 | 31% |
| 40% | 20 | 1 | 90 | 5 | 500 | 0.05 | 0.12 | 17% | 0.228599 | 29% |
| 40% | 20 | 1.4 | 90 | 6 | 600 | 0.05 | 0.12 | 15% | 0.247023 | 26% |
| 40% | 20 | 1.8 | 90 | 7 | 700 | 0.05 | 0.12 | 13% | 0.254703 | 23% |
| 40% | 20 | 1.8 | 90 | 6 | 800 | 0.05 | 0.12 | 13% | 0.254027 | 20% |
| 40% | 25 | 0.6 | 90 | 4 | 300 | 0.05 | 0.12 | 25% | 0.165997 | 35% |
| 40% | 25 | 1 | 90 | 4 | 400 | 0.05 | 0.12 | 21% | 0.209369 | 33% |
| 40% | 25 | 1 | 90 | 5 | 500 | 0.05 | 0.12 | 18% | 0.247311 | 31% |
| 40% | 25 | 1.4 | 90 | 6 | 600 | 0.05 | 0.12 | 16% | 0.275485 | 29% |
| 40% | 25 | 1.8 | 90 | 6 | 700 | 0.05 | 0.12 | 14% | 0.289535 | 26% |
| 40% | 25 | 2.2 | 90 | 7 | 800 | 0.05 | 0.12 | 13% | 0.290837 | 23% |
| 40% | 30 | 0.6 | 90 | 4 | 300 | 0.05 | 0.12 | 26% | 0.170385 | 36% |
| 40% | 30 | 1 | 90 | 4 | 400 | 0.05 | 0.12 | 22% | 0.218117 | 34% |
| 40% | 30 | 1.4 | 90 | 5 | 500 | 0.05 | 0.12 | 20% | 0.255419 | 32% |
| 40% | 30 | 1.4 | 90 | 6 | 600 | 0.05 | 0.12 | 18% | 0.288 | 30% |
| 40% | 30 | 1.8 | 90 | 6 | 700 | 0.05 | 0.12 | 16% | 0.305618 | 27% |
| 40% | 30 | 2.2 | 90 | 7 | 800 | 0.05 | 0.12 | 14% | 0.306437 | 24% |
| 40% | 35 | 0.6 | 90 | 4 | 300 | 0.05 | 0.12 | 27% | 0.170405 | 36% |
| 40% | 35 | 1 | 90 | 4 | 400 | 0.05 | 0.12 | 24% | 0.221043 | 35% |
| 40% | 35 | 1.4 | 90 | 5 | 500 | 0.05 | 0.12 | 21% | 0.260556 | 33% |
| 40% | 35 | 1.8 | 90 | 6 | 600 | 0.05 | 0.12 | 19% | 0.289696 | 30% |
| 40% | 35 | 1.8 | 90 | 6 | 700 | 0.05 | 0.12 | 17% | 0.307534 | 28% |
| 40% | 35 | 2.6 | 90 | 7 | 800 | 0.05 | 0.12 | 15% | 0.30755 | 24% |
| 50% | 10 | 0.6 | 90 | 4 | 300 | 0.05 | 0.12 | 25% | 0.161131 | 34% |
| 50% | 10 | 0.6 | 90 | 4 | 400 | 0.05 | 0.12 | 20% | 0.209095 | 33% |
| 50% | 10 | 1 | 90 | 4 | 500 | 0.05 | 0.12 | 16% | 0.238543 | 30% |
| 50% | 10 | 1.4 | 90 | 5 | 600 | 0.05 | 0.12 | 14% | 0.253661 | 27% |
| 50% | 10 | 1.4 | 90 | 6 | 700 | 0.05 | 0.12 | 12% | 0.260525 | 23% |
| 50% | 10 | 1.8 | 90 | 6 | 800 | 0.05 | 0.12 | 12% | 0.258666 | 20% |
| 50% | 15 | 0.6 | 90 | 4 | 300 | 0.05 | 0.12 | 28% | 0.168604 | 35% |
| 50% | 15 | 0.6 | 90 | 4 | 400 | 0.05 | 0.12 | 23% | 0.215671 | 34% |
| 50% | 15 | 1 | 90 | 4 | 500 | 0.05 | 0.12 | 19% | 0.249856 | 31% |
| 50% | 15 | 1.4 | 90 | 5 | 600 | 0.05 | 0.12 | 17% | 0.268291 | 28% |
| 50% | 15 | 1.4 | 90 | 6 | 700 | 0.05 | 0.12 | 15% | 0.276009 | 25% |
| 50% | 15 | 1.8 | 90 | 6 | 800 | 0.05 | 0.12 | 14% | 0.276355 | 22% |
| 50% | 20 | 0.6 | 90 | 4 | 300 | 0.05 | 0.12 | 30% | 0.174707 | 37% |
| 50% | 20 | 0.6 | 90 | 4 | 400 | 0.05 | 0.12 | 25% | 0.219977 | 35% |
| 50% | 20 | 1 | 90 | 5 | 500 | 0.05 | 0.12 | 22% | 0.261604 | 33% |
| 50% | 20 | 1.4 | 90 | 6 | 600 | 0.05 | 0.12 | 19% | 0.287784 | 30% |
| 50% | 20 | 1.8 | 90 | 7 | 700 | 0.05 | 0.12 | 17% | 0.305206 | 27% |
| 50% | 20 | 1.8 | 90 | 7 | 800 | 0.05 | 0.12 | 15% | 0.314038 | 25% |
| 50% | 25 | 0.6 | 90 | 4 | 300 | 0.05 | 0.12 | 31% | 0.182108 | 38% |
| 50% | 25 | 1 | 90 | 4 | 400 | 0.05 | 0.12 | 27% | 0.229061 | 36% |
| 50% | 25 | 1 | 90 | 5 | 500 | 0.05 | 0.12 | 23% | 0.280957 | 35% |
| 50% | 25 | 1.4 | 90 | 6 | 600 | 0.05 | 0.12 | 20% | 0.31591 | 33% |
| 50% | 25 | 1.8 | 90 | 7 | 700 | 0.05 | 0.12 | 18% | 0.340444 | 31% |
| 50% | 25 | 1.8 | 90 | 7 | 800 | 0.05 | 0.12 | 16% | 0.355011 | 28% |
| 50% | 30 | 0.6 | 90 | 4 | 300 | 0.05 | 0.12 | 33% | 0.188614 | 39% |
| 50% | 30 | 1 | 90 | 5 | 400 | 0.05 | 0.12 | 29% | 0.23885 | 37% |
| 50% | 30 | 1 | 90 | 5 | 500 | 0.05 | 0.12 | 25% | 0.292067 | 37% |
| 50% | 30 | 1.4 | 90 | 6 | 600 | 0.05 | 0.12 | 22% | 0.331455 | 35% |
| 50% | 30 | 1.8 | 90 | 7 | 700 | 0.05 | 0.12 | 20% | 0.359095 | 32% |
| 50% | 30 | 2.2 | 90 | 7 | 800 | 0.05 | 0.12 | 18% | 0.375297 | 29% |
| 50% | 35 | 0.6 | 90 | 4 | 300 | 0.05 | 0.12 | 34% | 0.192377 | 40% |
| 50% | 35 | 1 | 90 | 5 | 400 | 0.05 | 0.12 | 30% | 0.244036 | 38% |
| 50% | 35 | 1 | 90 | 5 | 500 | 0.05 | 0.12 | 27% | 0.295248 | 37% |
| 50% | 35 | 1.4 | 90 | 6 | 600 | 0.05 | 0.12 | 24% | 0.338213 | 35% |
| 50% | 35 | 1.8 | 90 | 7 | 700 | 0.05 | 0.12 | 21% | 0.367278 | 33% |
| 50% | 35 | 2.2 | 90 | 7 | 800 | 0.05 | 0.12 | 19% | 0.384249 | 30% |
| 60% | 10 | 0.6 | 90 | 5 | 300 | 0.05 | 0.12 | 31% | 0.167431 | 35% |
| 60% | 10 | 0.6 | 90 | 4 | 400 | 0.05 | 0.12 | 25% | 0.227607 | 36% |
| 60% | 10 | 1 | 90 | 4 | 500 | 0.05 | 0.12 | 21% | 0.259032 | 33% |
| 60% | 10 | 1 | 90 | 5 | 600 | 0.05 | 0.12 | 17% | 0.286405 | 30% |
| 60% | 10 | 1.4 | 90 | 6 | 700 | 0.05 | 0.12 | 15% | 0.298812 | 27% |
| 60% | 10 | 1.8 | 90 | 7 | 800 | 0.05 | 0.12 | 14% | 0.298656 | 23% |
| 60% | 15 | 0.6 | 90 | 5 | 300 | 0.05 | 0.12 | 34% | 0.17599 | 37% |
| 60% | 15 | 0.6 | 90 | 4 | 400 | 0.05 | 0.12 | 28% | 0.235977 | 37% |
| 60% | 15 | 1 | 90 | 5 | 500 | 0.05 | 0.12 | 24% | 0.271262 | 34% |
| 60% | 15 | 1 | 90 | 5 | 600 | 0.05 | 0.12 | 20% | 0.300276 | 31% |
| 60% | 15 | 1.4 | 90 | 6 | 700 | 0.05 | 0.12 | 18% | 0.317478 | 28% |
| 60% | 15 | 1.8 | 90 | 7 | 800 | 0.05 | 0.12 | 16% | 0.321377 | 25% |
| 60% | 20 | 0.6 | 90 | 4 | 300 | 0.05 | 0.12 | 36% | 0.186651 | 39% |
| 60% | 20 | 0.6 | 90 | 4 | 400 | 0.05 | 0.12 | 30% | 0.243141 | 38% |

TABLE 1-continued

| Ambient Air % RH | Ambient Air Temp (C.) | Desiccant Rotation Rate (°/s) | Process Air Flow Rate (cfm) | Regeneration Fluid Flow Rate (cfm) | Heat (W) | Desiccant Thickness (m) | Disk Outer Radius (m) | Exhaust Process Air % RH | Liquid H₂0 Production Rate (L/hr) | Efficiency |
|---|---|---|---|---|---|---|---|---|---|---|
| 60% | 20 | 1 | 90 | 5 | 500 | 0.05 | 0.12 | 26% | 0.284712 | 36% |
| 60% | 20 | 1 | 90 | 5 | 600 | 0.05 | 0.12 | 23% | 0.317663 | 33% |
| 60% | 20 | 1.4 | 90 | 7 | 700 | 0.05 | 0.12 | 20% | 0.347911 | 31% |
| 60% | 20 | 1.8 | 90 | 8 | 800 | 0.05 | 0.12 | 18% | 0.365139 | 29% |
| 60% | 25 | 0.6 | 90 | 4 | 300 | 0.05 | 0.12 | 38% | 0.194972 | 41% |
| 60% | 25 | 0.6 | 90 | 4 | 400 | 0.05 | 0.12 | 33% | 0.252843 | 40% |
| 60% | 25 | 1 | 90 | 5 | 500 | 0.05 | 0.12 | 28% | 0.304025 | 38% |
| 60% | 25 | 1 | 90 | 5 | 600 | 0.05 | 0.12 | 25% | 0.344425 | 36% |
| 60% | 25 | 1.4 | 90 | 6 | 700 | 0.05 | 0.12 | 22% | 0.383939 | 34% |
| 60% | 25 | 1.8 | 90 | 7 | 800 | 0.05 | 0.12 | 19% | 0.408065 | 32% |
| 60% | 30 | 0.6 | 90 | 4 | 300 | 0.05 | 0.12 | 39% | 0.203487 | 43% |
| 60% | 30 | 0.6 | 90 | 4 | 400 | 0.05 | 0.12 | 34% | 0.259767 | 41% |
| 60% | 30 | 1 | 90 | 5 | 500 | 0.05 | 0.12 | 30% | 0.31643 | 40% |
| 60% | 30 | 1.4 | 90 | 6 | 600 | 0.05 | 0.12 | 27% | 0.361017 | 38% |
| 60% | 30 | 1.4 | 90 | 6 | 700 | 0.05 | 0.12 | 24% | 0.402837 | 36% |
| 60% | 30 | 1.8 | 90 | 7 | 800 | 0.05 | 0.12 | 21% | 0.430806 | 34% |
| 60% | 35 | 0.6 | 90 | 4 | 300 | 0.05 | 0.12 | 41% | 0.210929 | 44% |
| 60% | 35 | 1 | 90 | 5 | 400 | 0.05 | 0.12 | 36% | 0.26243 | 41% |
| 60% | 35 | 1 | 90 | 6 | 500 | 0.05 | 0.12 | 32% | 0.322488 | 40% |
| 60% | 35 | 1.4 | 90 | 6 | 600 | 0.05 | 0.12 | 29% | 0.370266 | 39% |
| 60% | 35 | 1.4 | 90 | 6 | 700 | 0.05 | 0.12 | 26% | 0.410392 | 37% |
| 60% | 35 | 1.8 | 90 | 7 | 800 | 0.05 | 0.12 | 23% | 0.44132 | 35% |
| 70% | 10 | 0.6 | 90 | 5 | 300 | 0.05 | 0.12 | 37% | 0.17757 | 37% |
| 70% | 10 | 0.6 | 90 | 5 | 400 | 0.05 | 0.12 | 30% | 0.237589 | 37% |
| 70% | 10 | 1 | 90 | 4 | 500 | 0.05 | 0.12 | 25% | 0.275147 | 35% |
| 70% | 10 | 1 | 90 | 5 | 600 | 0.05 | 0.12 | 21% | 0.313577 | 33% |
| 70% | 10 | 1.4 | 90 | 6 | 700 | 0.05 | 0.12 | 18% | 0.330161 | 30% |
| 70% | 10 | 1.8 | 90 | 7 | 800 | 0.05 | 0.12 | 16% | 0.335088 | 26% |
| 70% | 15 | 0.6 | 90 | 5 | 300 | 0.05 | 0.12 | 40% | 0.186547 | 39% |
| 70% | 15 | 0.6 | 90 | 6 | 400 | 0.05 | 0.12 | 34% | 0.243351 | 38% |
| 70% | 15 | 1 | 90 | 5 | 500 | 0.05 | 0.12 | 28% | 0.28831 | 36% |
| 70% | 15 | 1 | 90 | 5 | 600 | 0.05 | 0.12 | 24% | 0.328954 | 34% |
| 70% | 15 | 1.4 | 90 | 6 | 700 | 0.05 | 0.12 | 21% | 0.350796 | 31% |
| 70% | 15 | 1.8 | 90 | 7 | 800 | 0.05 | 0.12 | 19% | 0.361302 | 28% |
| 70% | 20 | 0.6 | 90 | 4 | 400 | 0.05 | 0.12 | 36% | 0.259806 | 41% |
| 70% | 20 | 1 | 90 | 5 | 500 | 0.05 | 0.12 | 31% | 0.302529 | 38% |
| 70% | 20 | 1 | 90 | 6 | 600 | 0.05 | 0.12 | 27% | 0.347849 | 36% |
| 70% | 20 | 1.4 | 90 | 7 | 700 | 0.05 | 0.12 | 24% | 0.382106 | 34% |
| 70% | 20 | 1.8 | 90 | 8 | 800 | 0.05 | 0.12 | 21% | 0.405931 | 32% |
| 70% | 25 | 0.6 | 90 | 5 | 300 | 0.05 | 0.12 | 45% | 0.203098 | 43% |
| 70% | 25 | 0.6 | 90 | 4 | 400 | 0.05 | 0.12 | 38% | 0.272149 | 43% |
| 70% | 25 | 1 | 90 | 6 | 500 | 0.05 | 0.12 | 34% | 0.322165 | 40% |
| 70% | 25 | 1 | 90 | 6 | 600 | 0.05 | 0.12 | 29% | 0.374567 | 39% |
| 70% | 25 | 1.4 | 90 | 7 | 700 | 0.05 | 0.12 | 26% | 0.416746 | 37% |
| 70% | 25 | 1.8 | 90 | 8 | 800 | 0.05 | 0.12 | 23% | 0.447221 | 35% |
| 70% | 30 | 0.6 | 90 | 5 | 300 | 0.05 | 0.12 | 46% | 0.210718 | 44% |
| 70% | 30 | 0.6 | 90 | 4 | 400 | 0.05 | 0.12 | 40% | 0.283104 | 44% |
| 70% | 30 | 1 | 90 | 6 | 500 | 0.05 | 0.12 | 36% | 0.335956 | 42% |
| 70% | 30 | 1 | 90 | 6 | 600 | 0.05 | 0.12 | 32% | 0.389423 | 41% |
| 70% | 30 | 1.4 | 90 | 7 | 700 | 0.05 | 0.12 | 28% | 0.436659 | 39% |
| 70% | 30 | 1.8 | 90 | 8 | 800 | 0.05 | 0.12 | 25% | 0.470857 | 37% |
| 70% | 35 | 0.6 | 90 | 5 | 300 | 0.05 | 0.12 | 48% | 0.214885 | 45% |
| 70% | 35 | 0.6 | 90 | 4 | 400 | 0.05 | 0.12 | 42% | 0.28812 | 45% |
| 70% | 35 | 1 | 90 | 6 | 500 | 0.05 | 0.12 | 38% | 0.343864 | 43% |
| 70% | 35 | 1 | 90 | 6 | 600 | 0.05 | 0.12 | 34% | 0.395523 | 41% |
| 70% | 35 | 1.4 | 90 | 7 | 700 | 0.05 | 0.12 | 30% | 0.447679 | 40% |
| 70% | 35 | 1.8 | 90 | 8 | 800 | 0.05 | 0.12 | 27% | 0.484405 | 38% |

To illustrate how a controller 50 may rely on a look-up table to operate a system (e.g., 10, 98, and/or the like) a series of graphs is provided with environmental conditions as independent variables, and efficiency or liquid water production rate and system operating parameters as the dependent variables (e.g., and values illustrated in the below graphs may be contained in a look-up table for reference by a controller).

Figure 6:
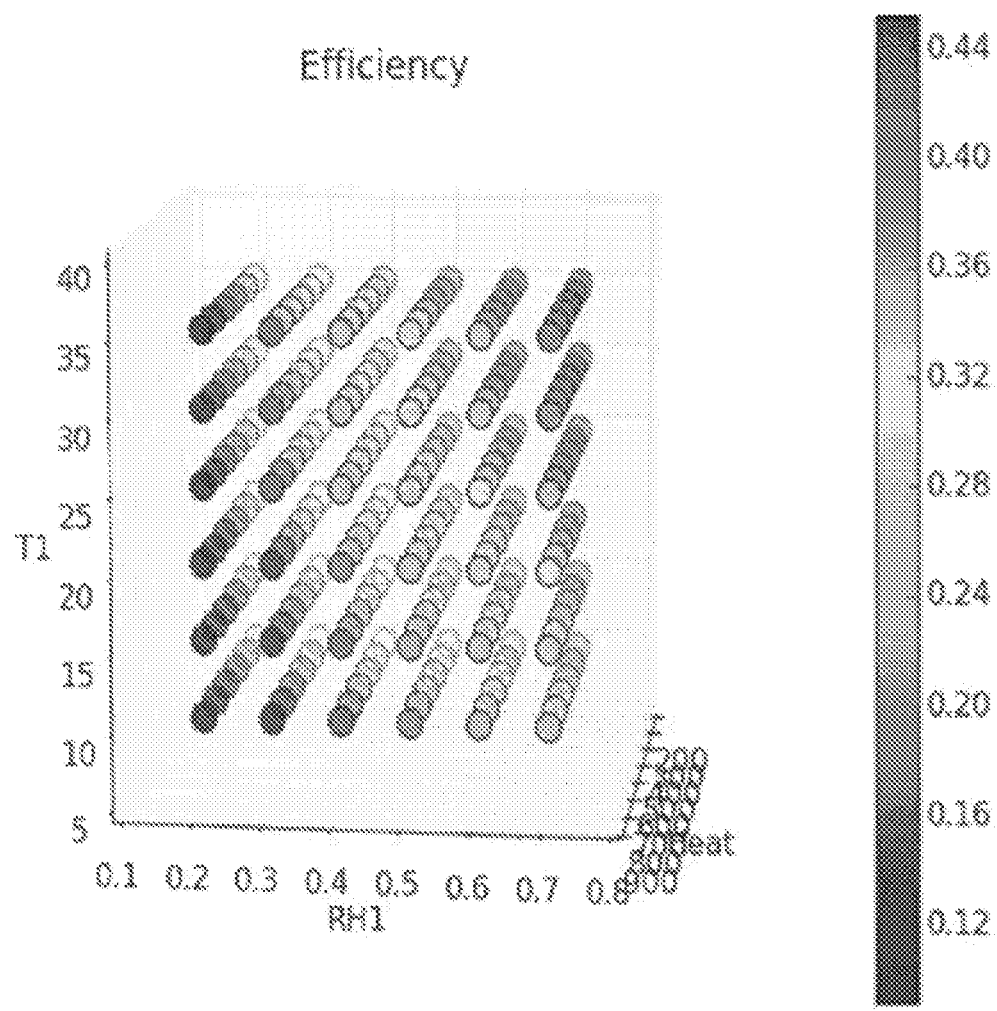
FIG. 6 is an efficiency graph according to an embodiment of the invention.
Figure 7A:
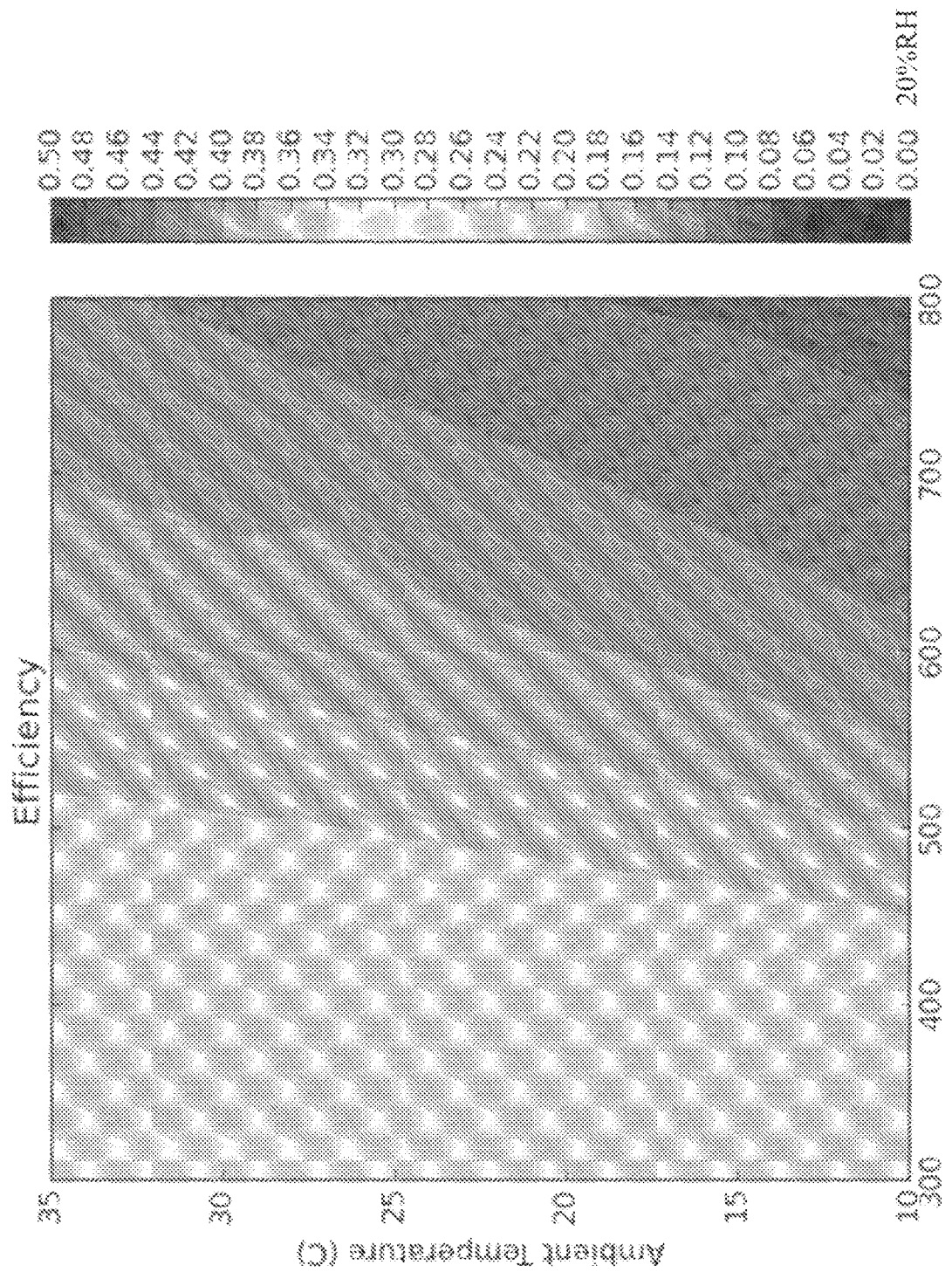
FIGS. 7A-7F show a series of efficiency graphs according to an embodiment of the invention.
Figure 7B:
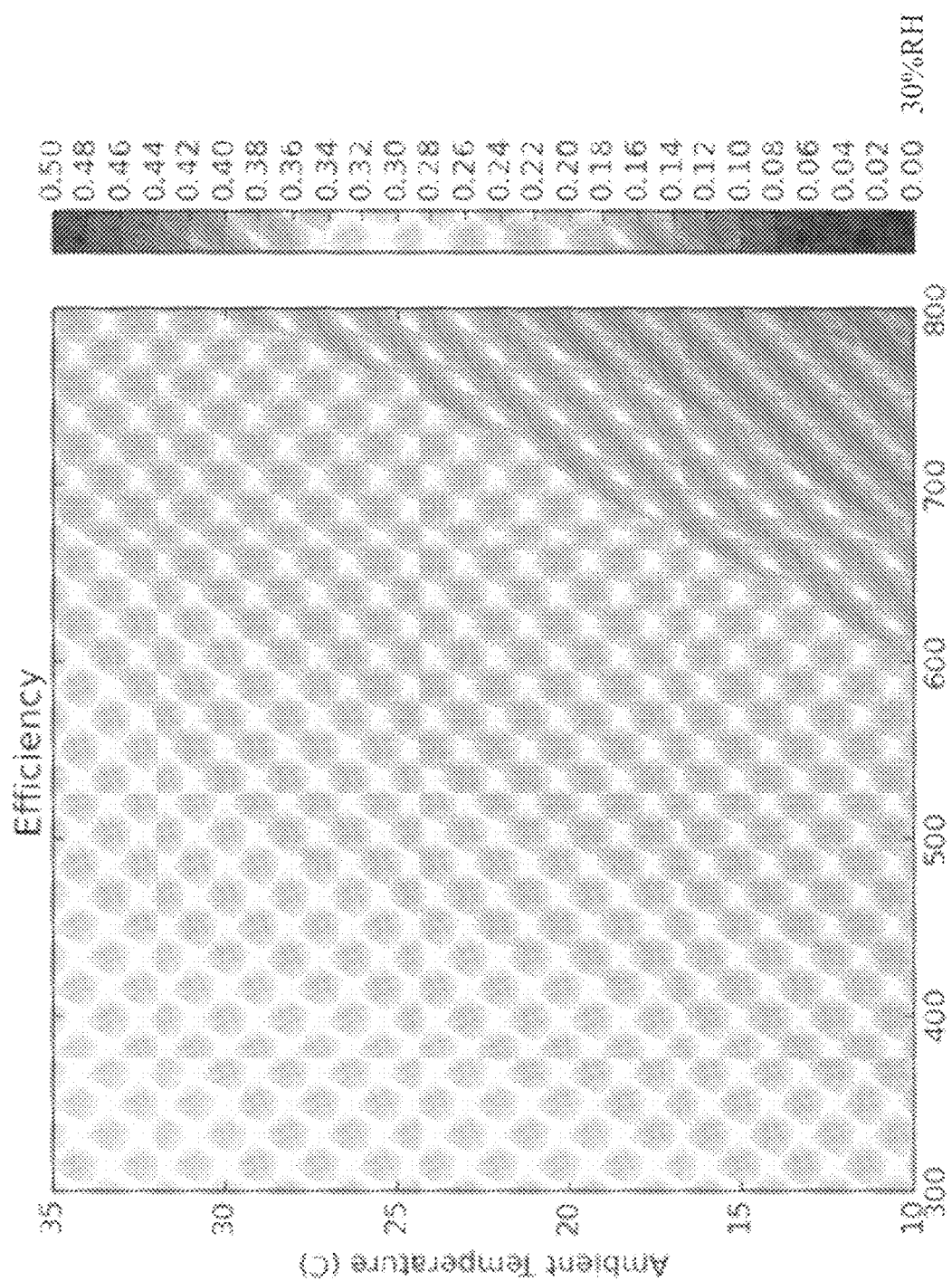
Figure 7C:
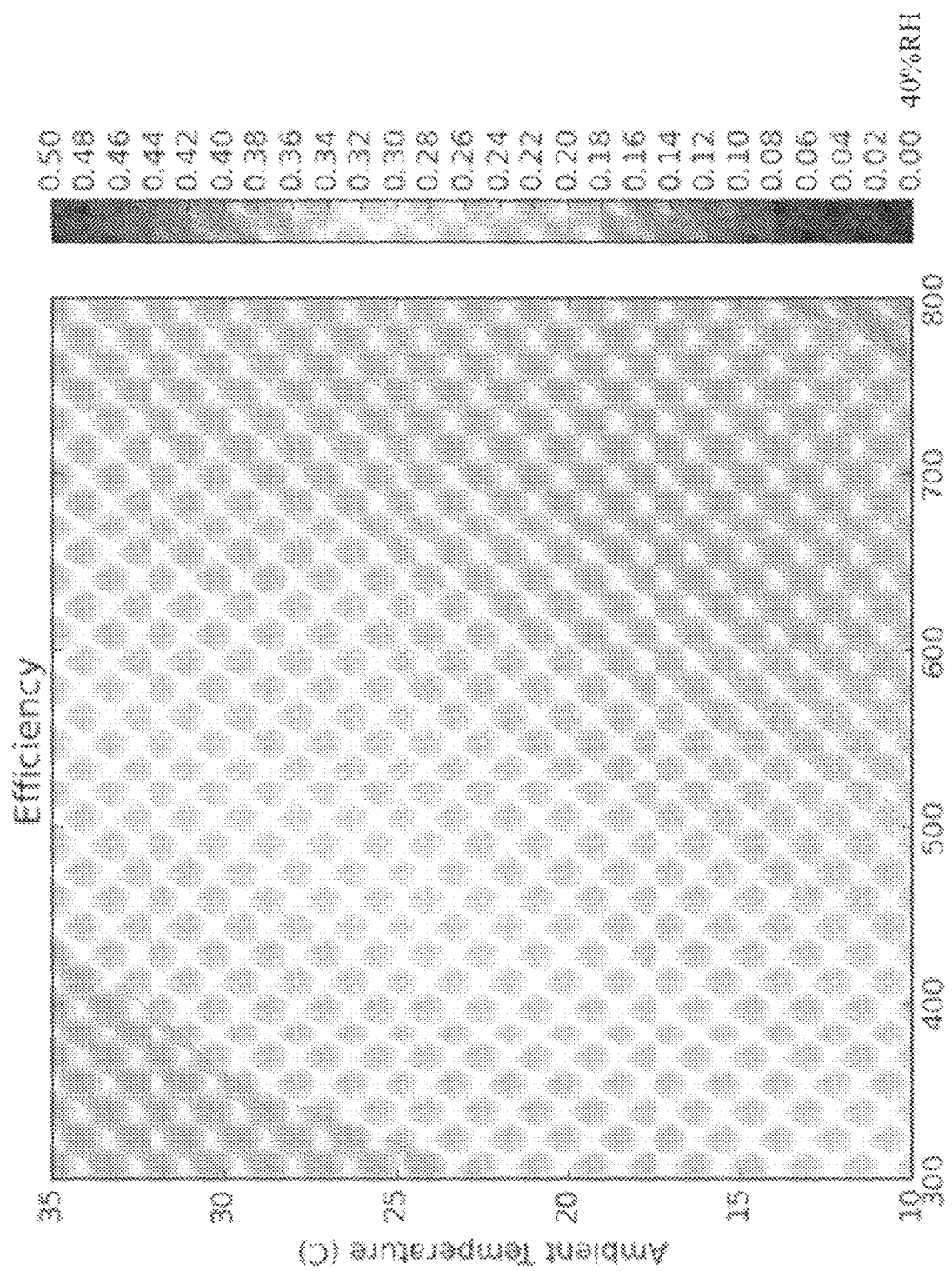
Figure 7D:
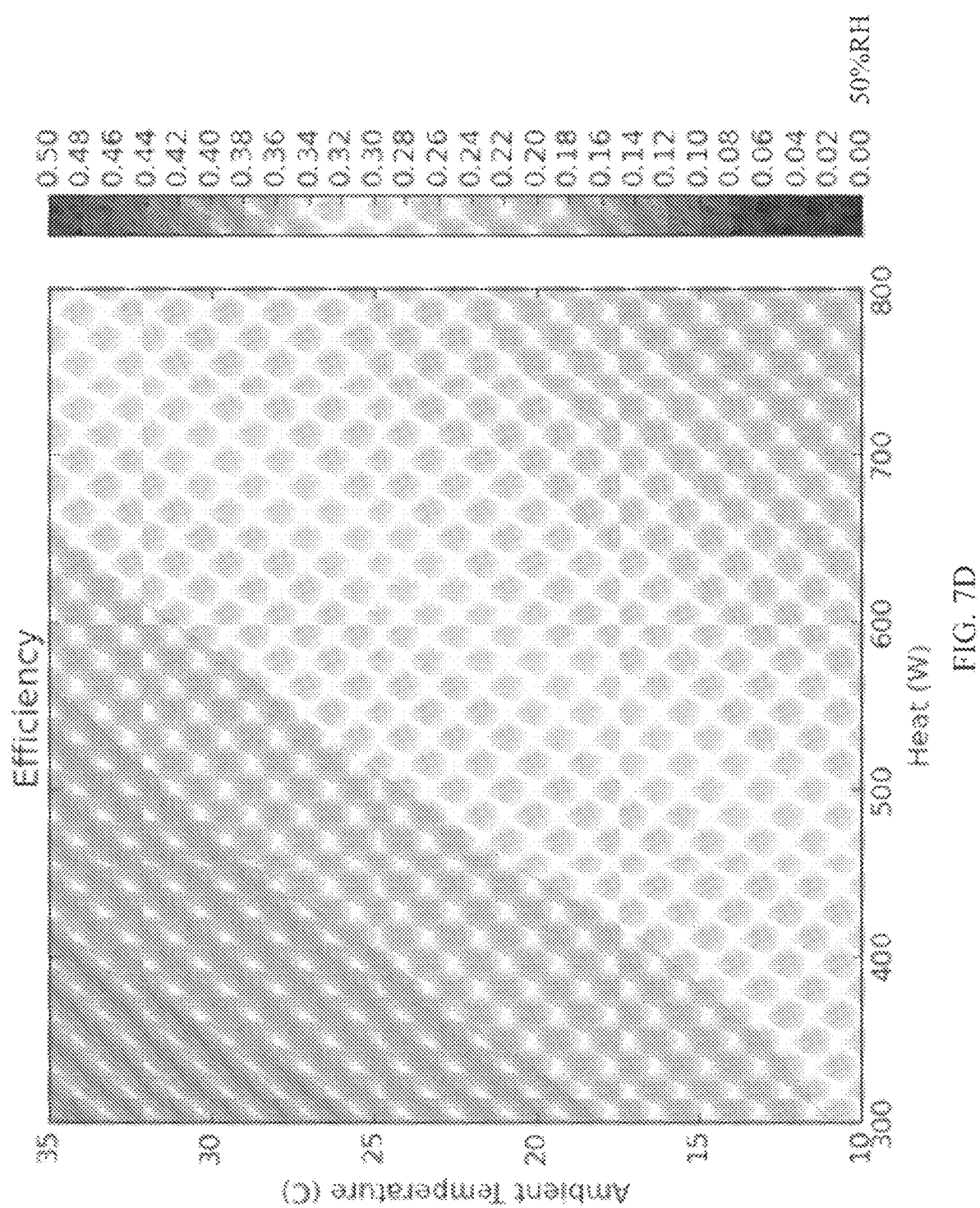
Figure 7E:
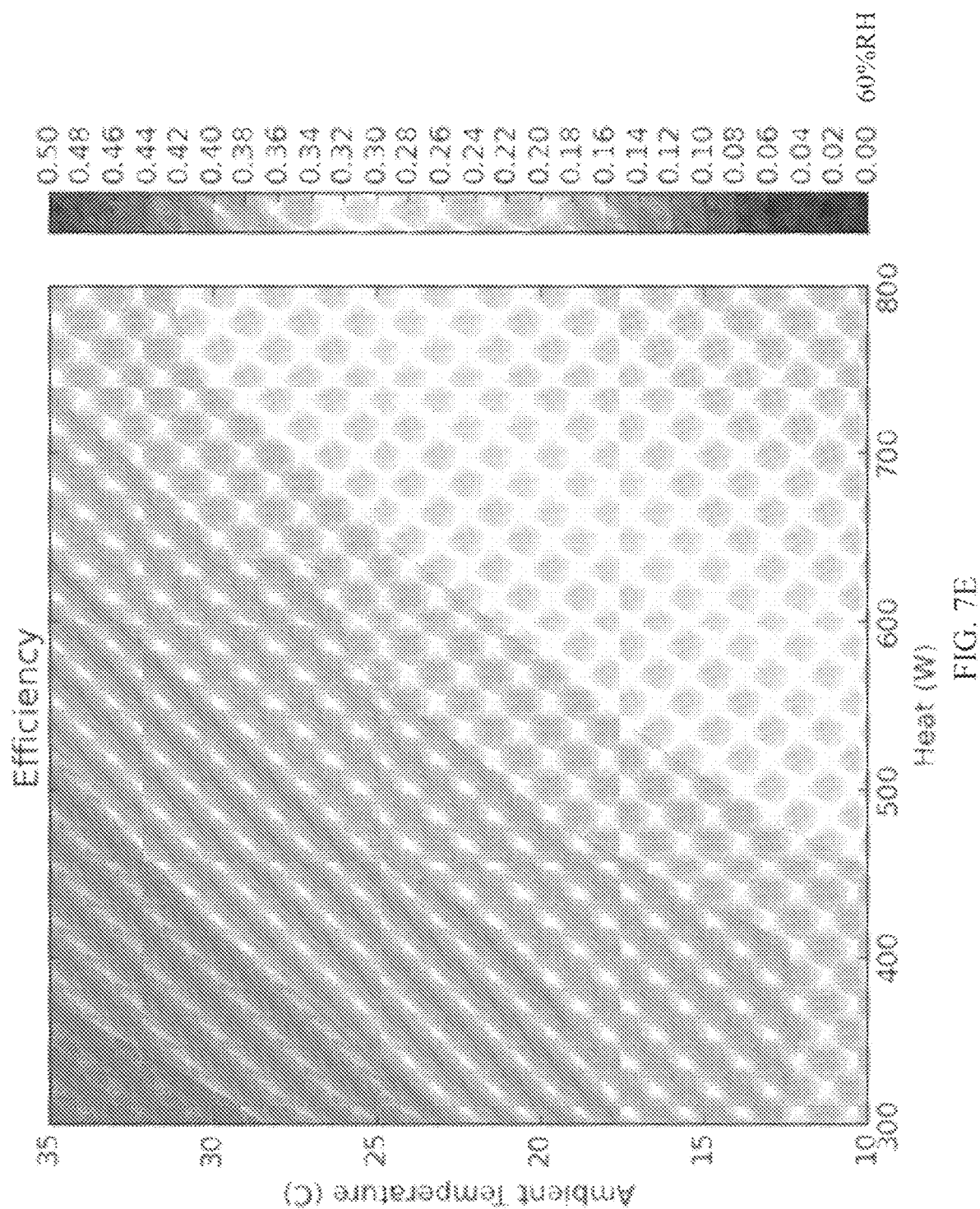
Figure 7F:
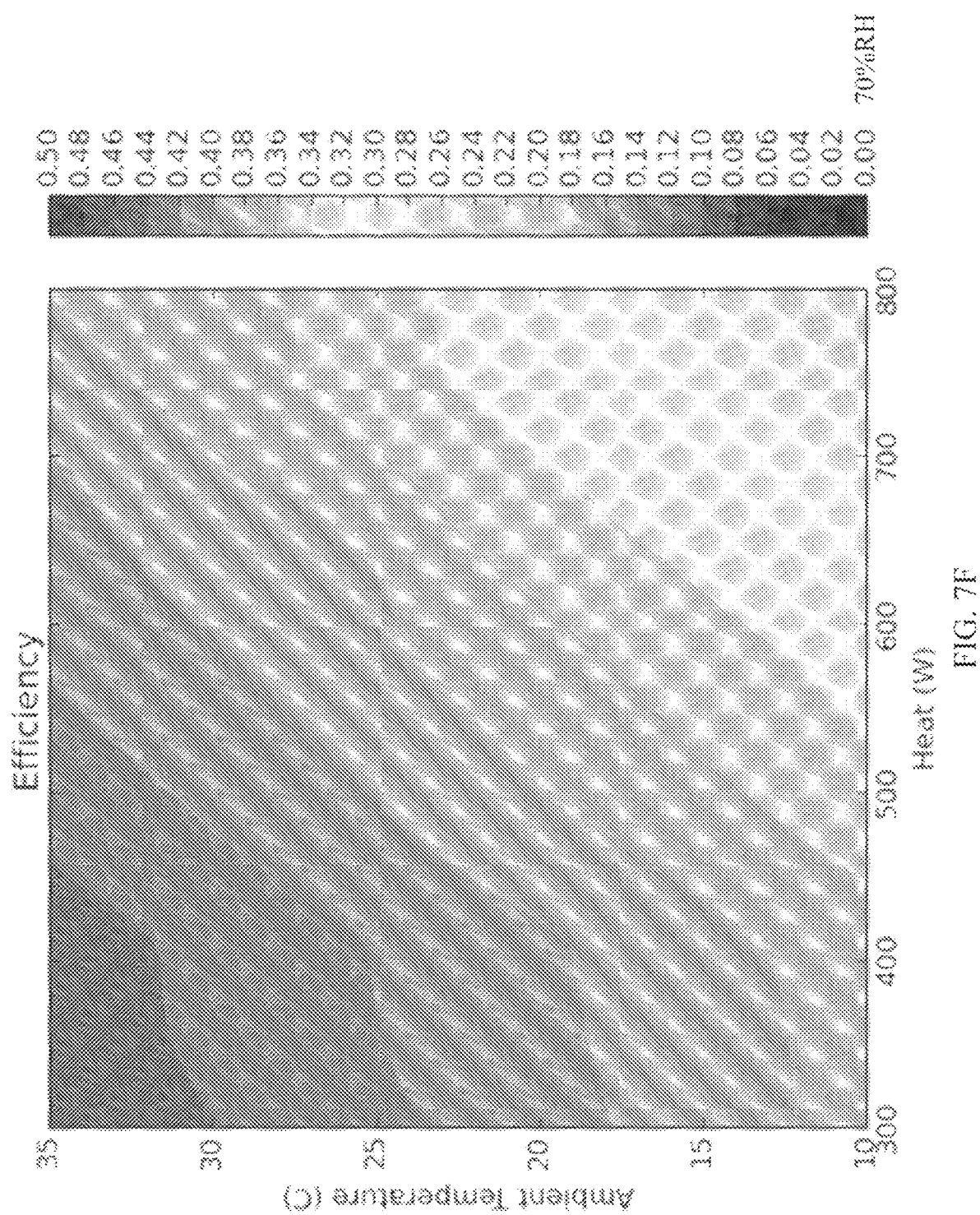
Figure 8B:
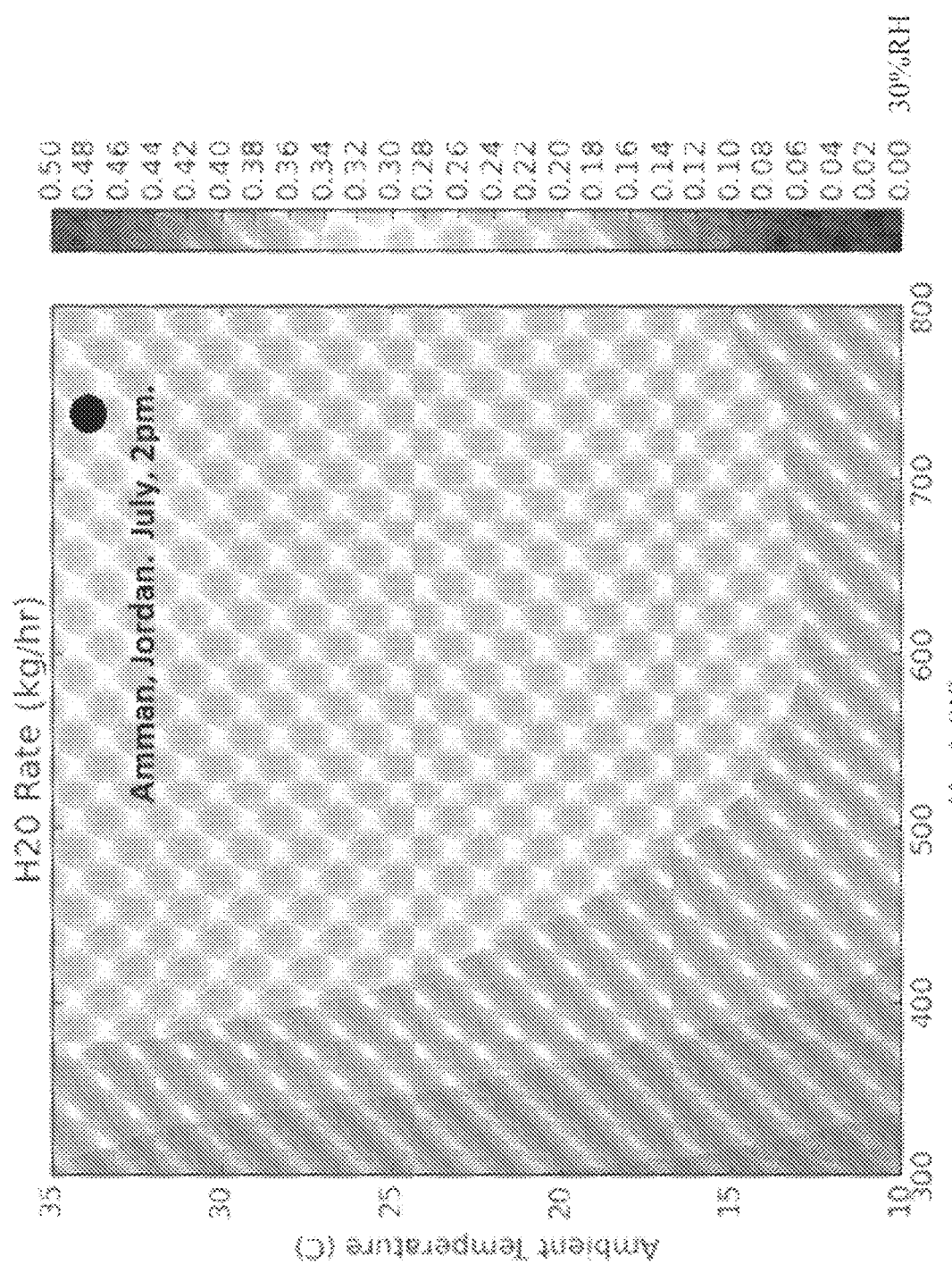
Figure 8C:
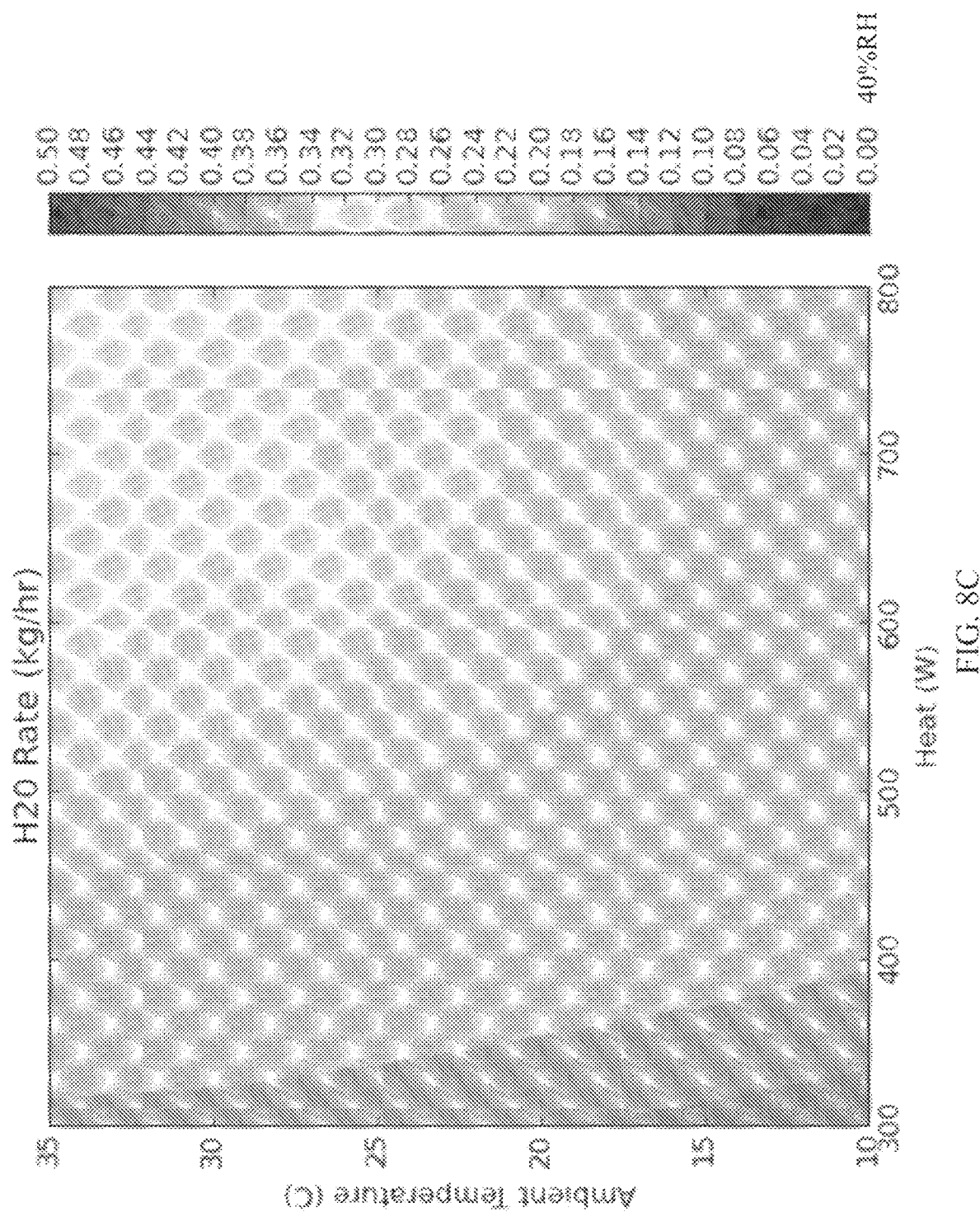
Figure 8D:
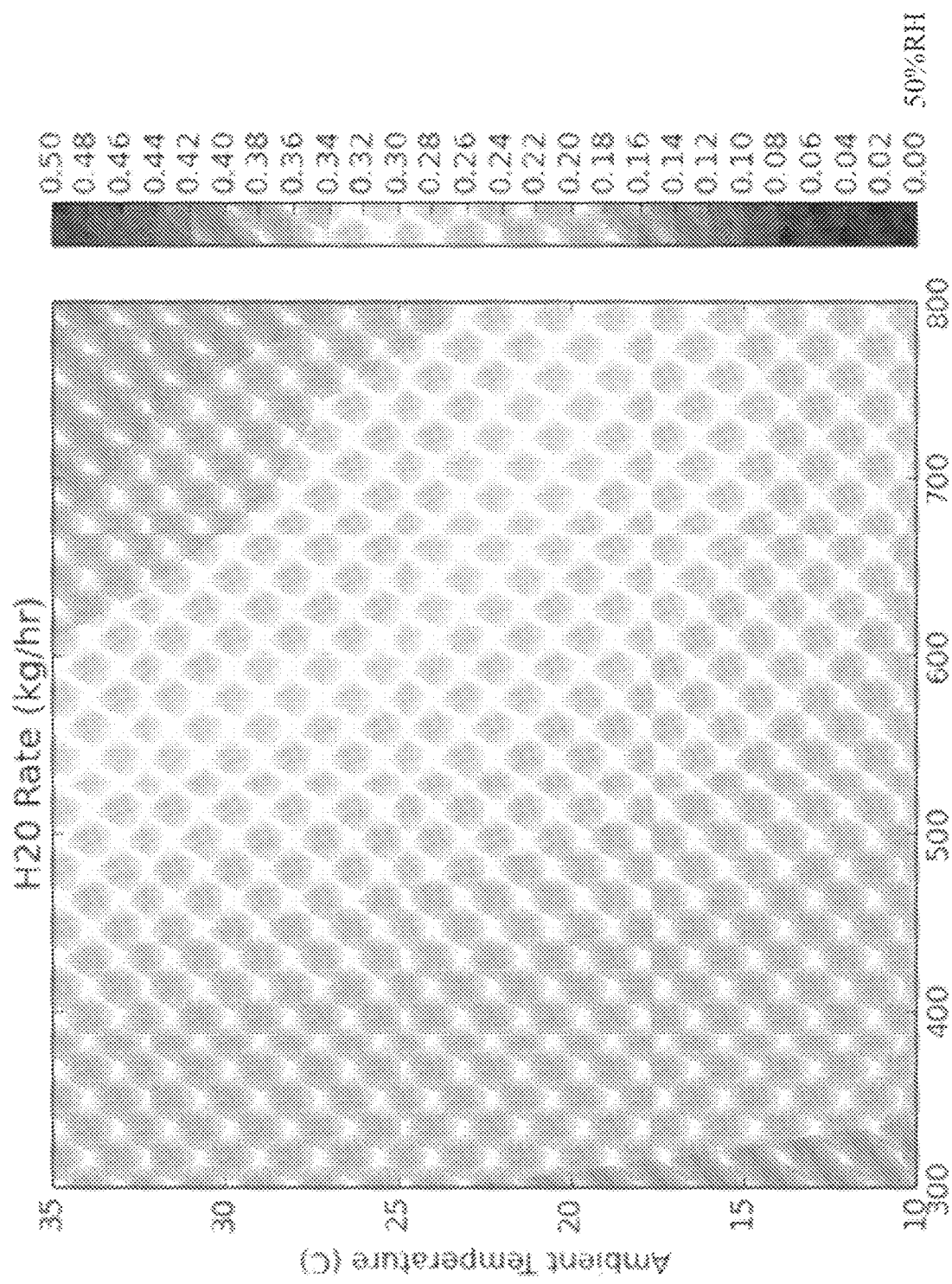
Figure 8E:
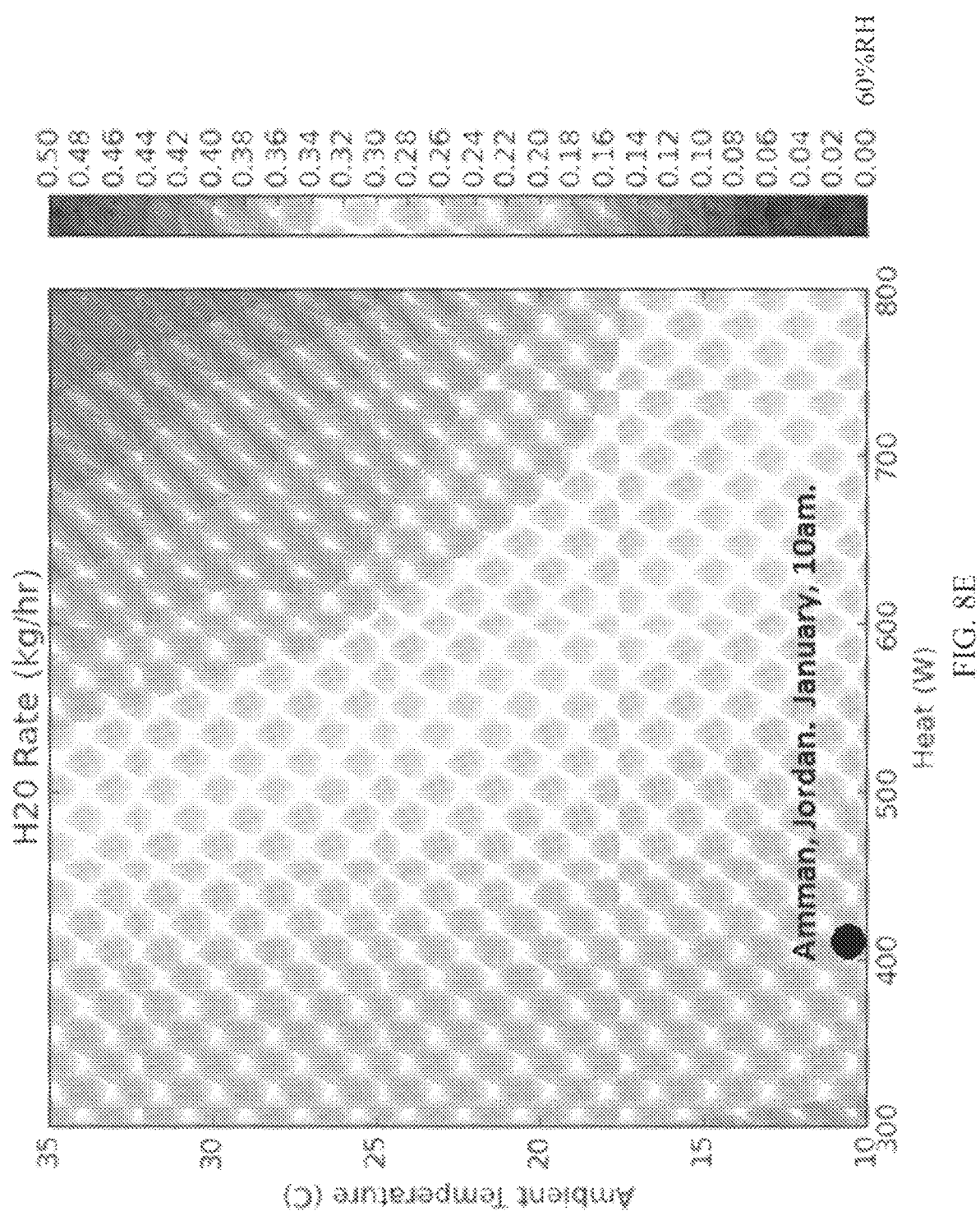
Figure 8F:
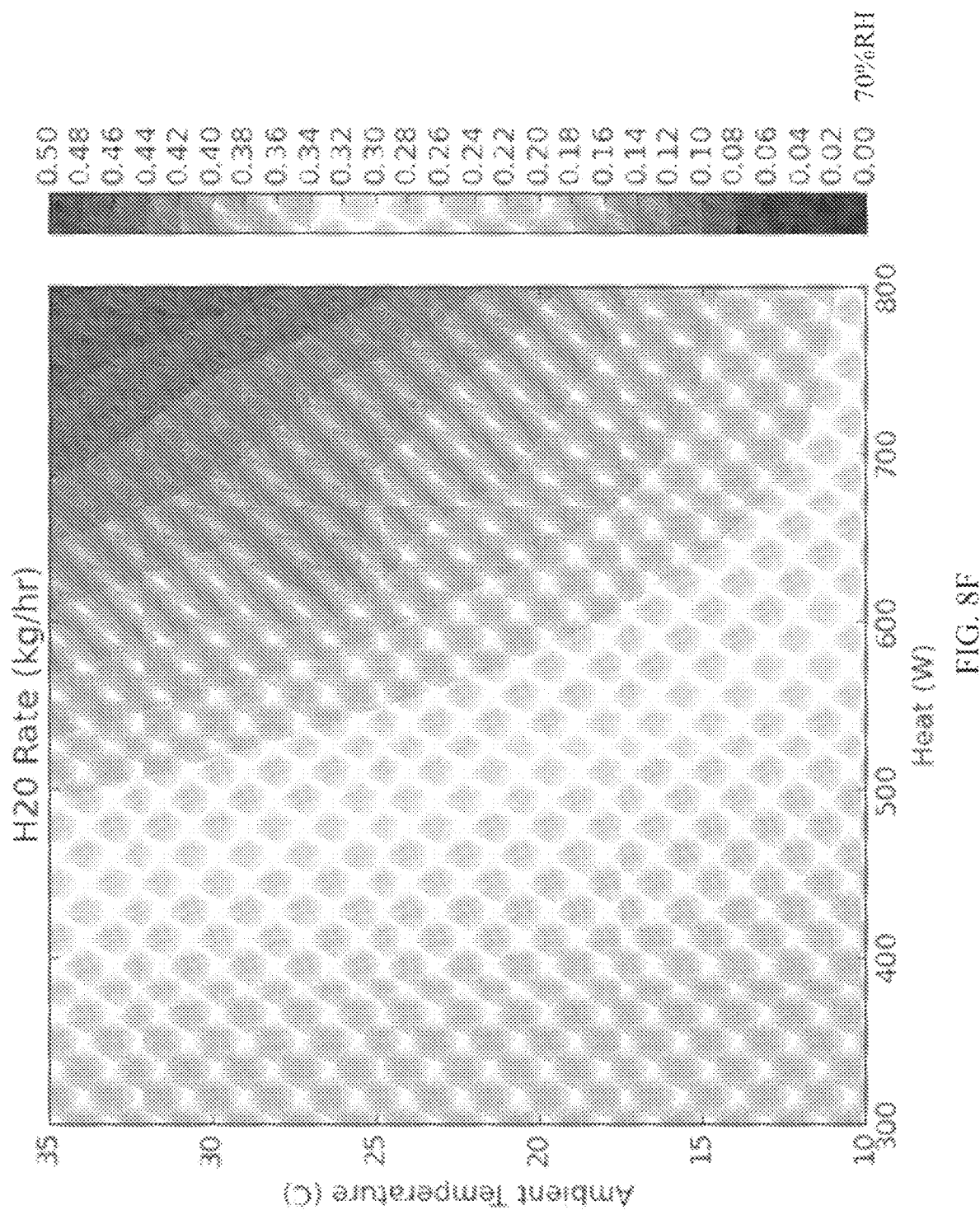
Figure 9A:
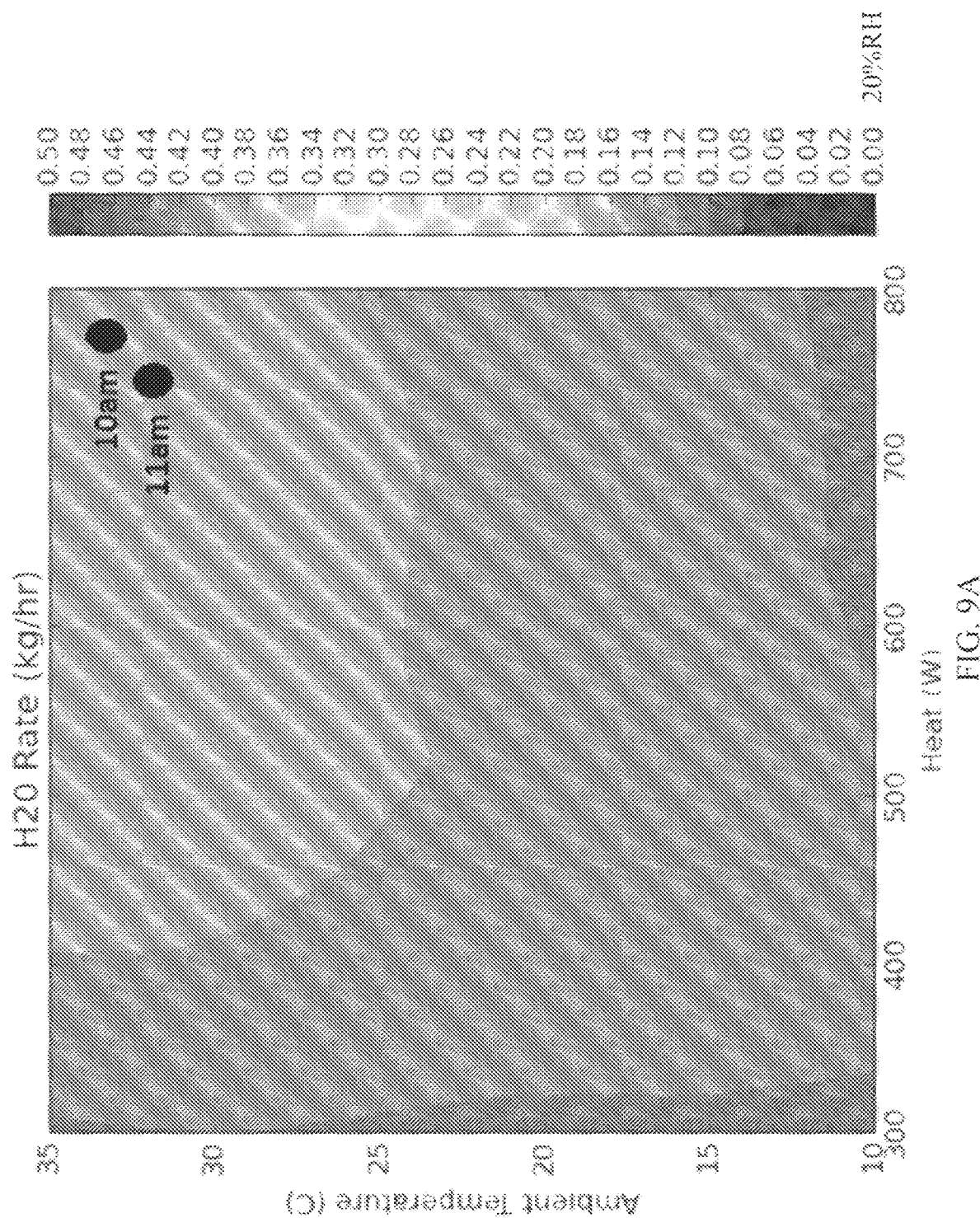
FIGS. 9A-9F show a series of water production rate graphs according to an embodiment of the invention.
Figure 9B:
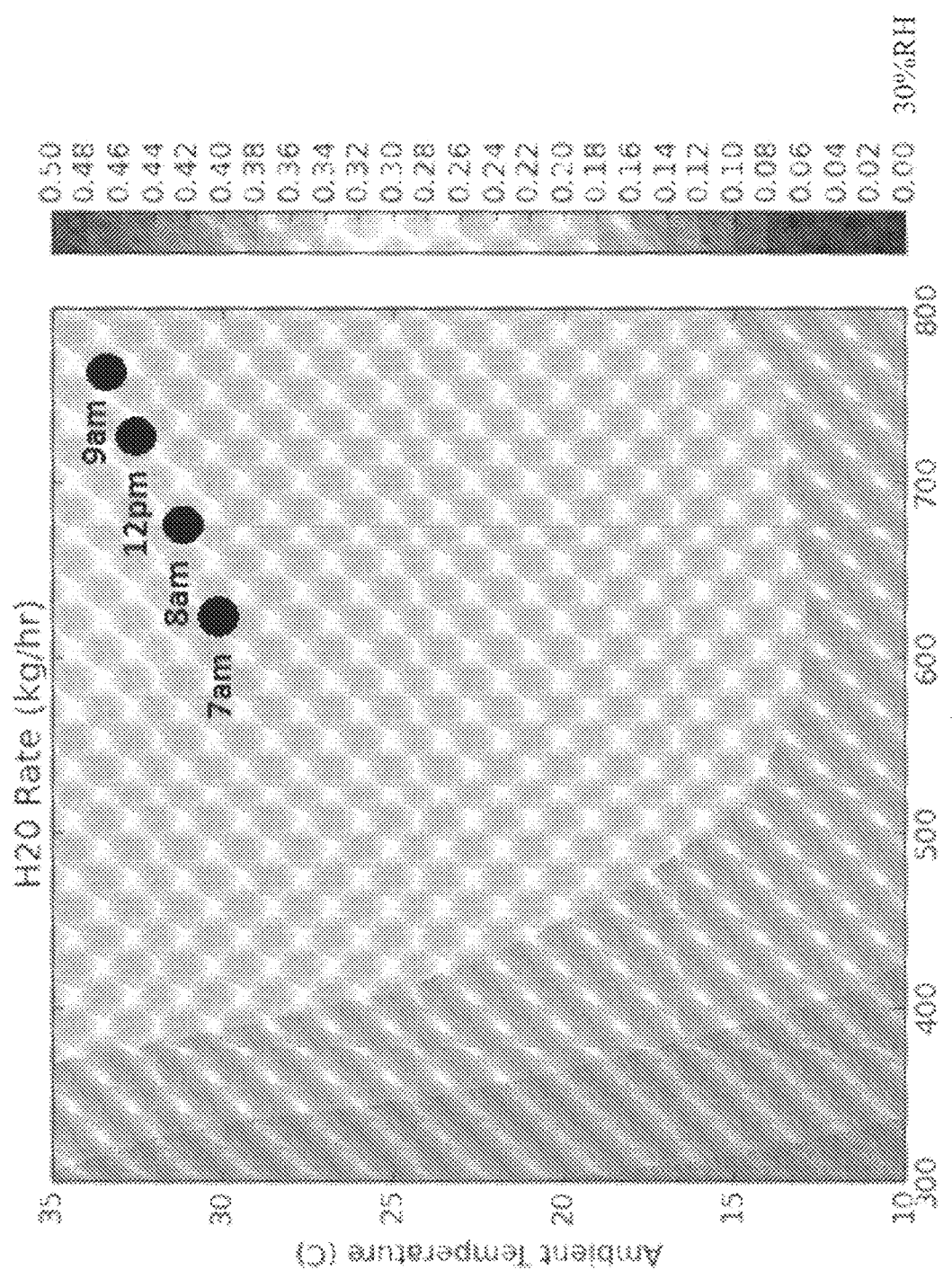
Figure 9C:
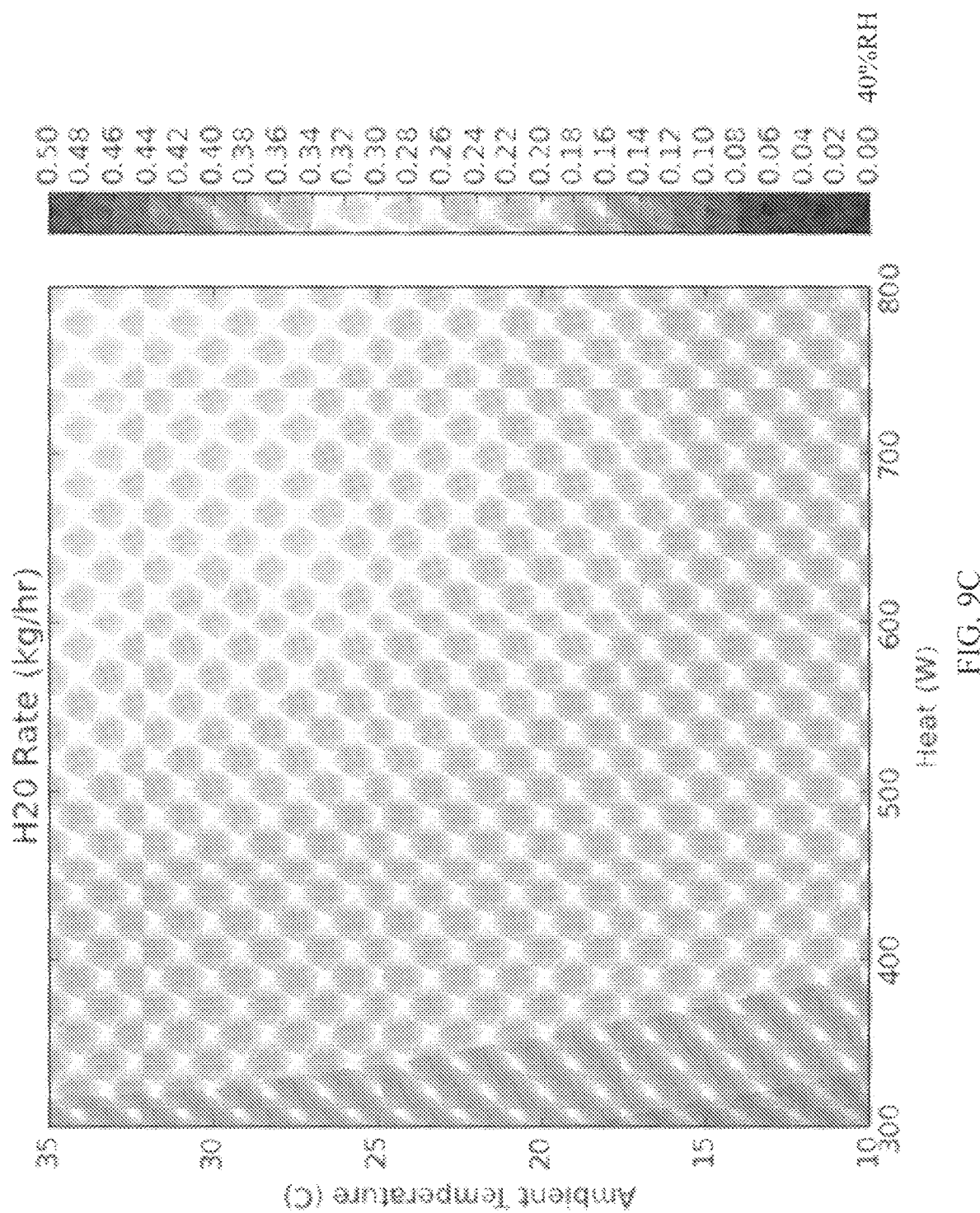
Figure 9D:
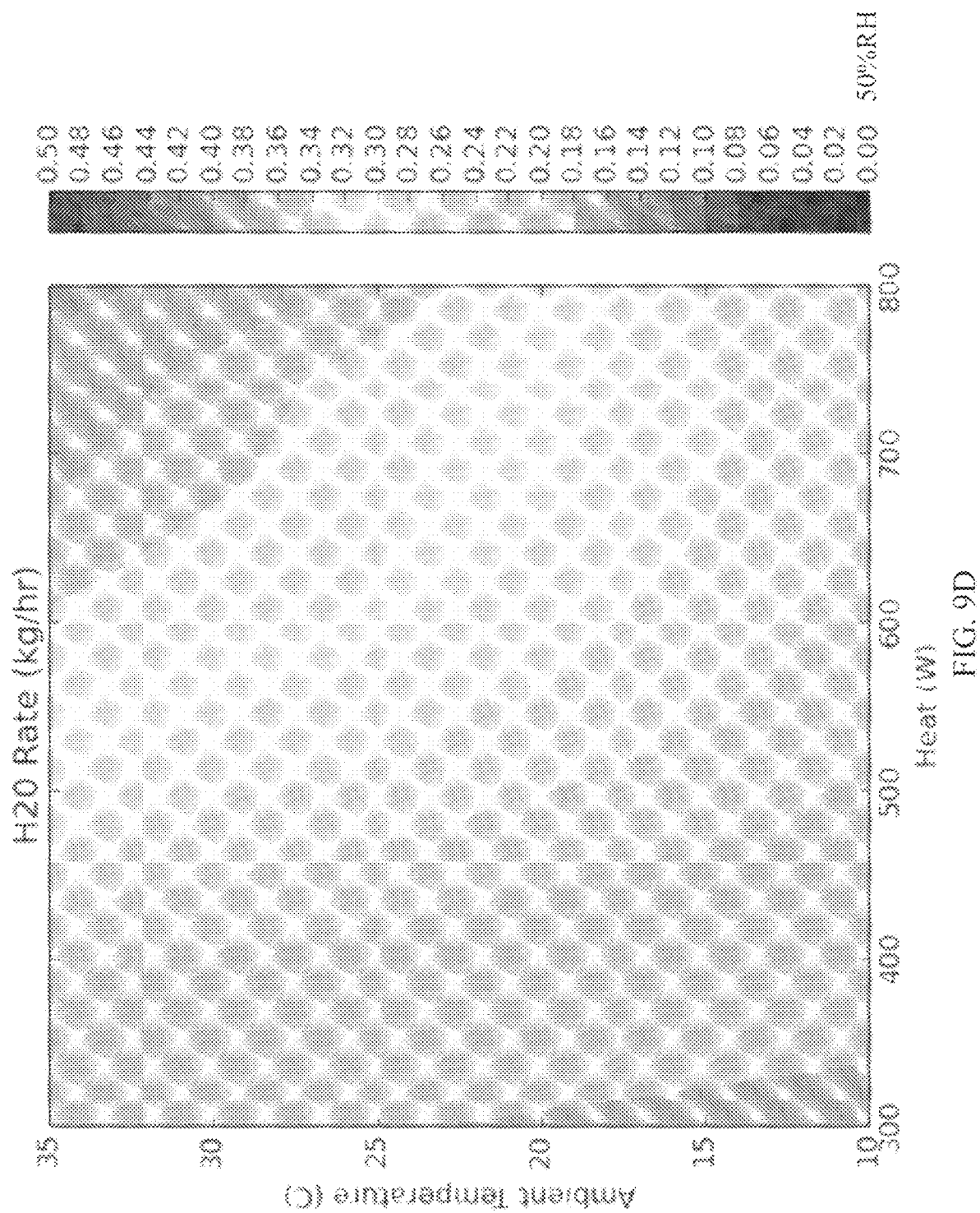
Figure 9E:
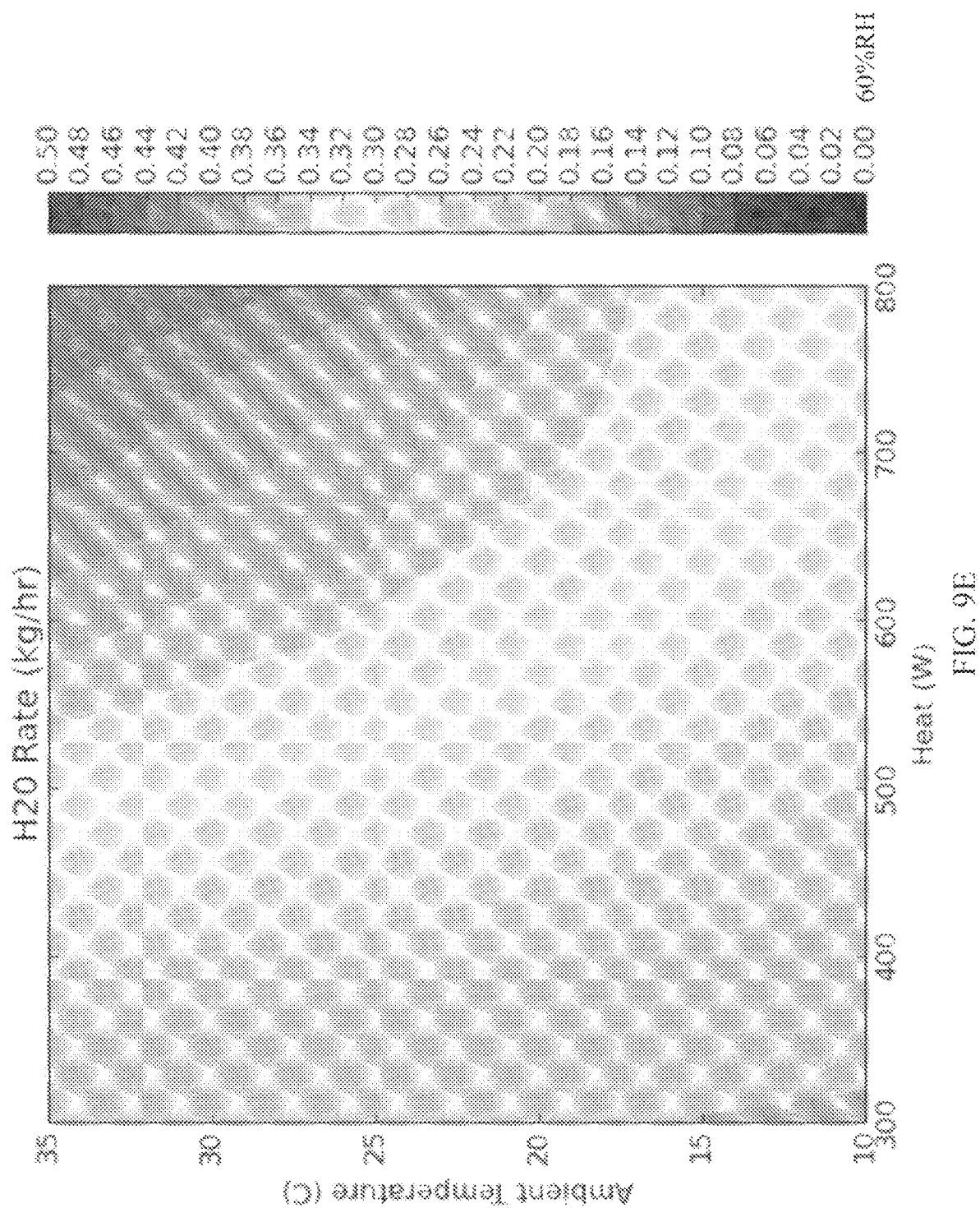
Figure 9F:
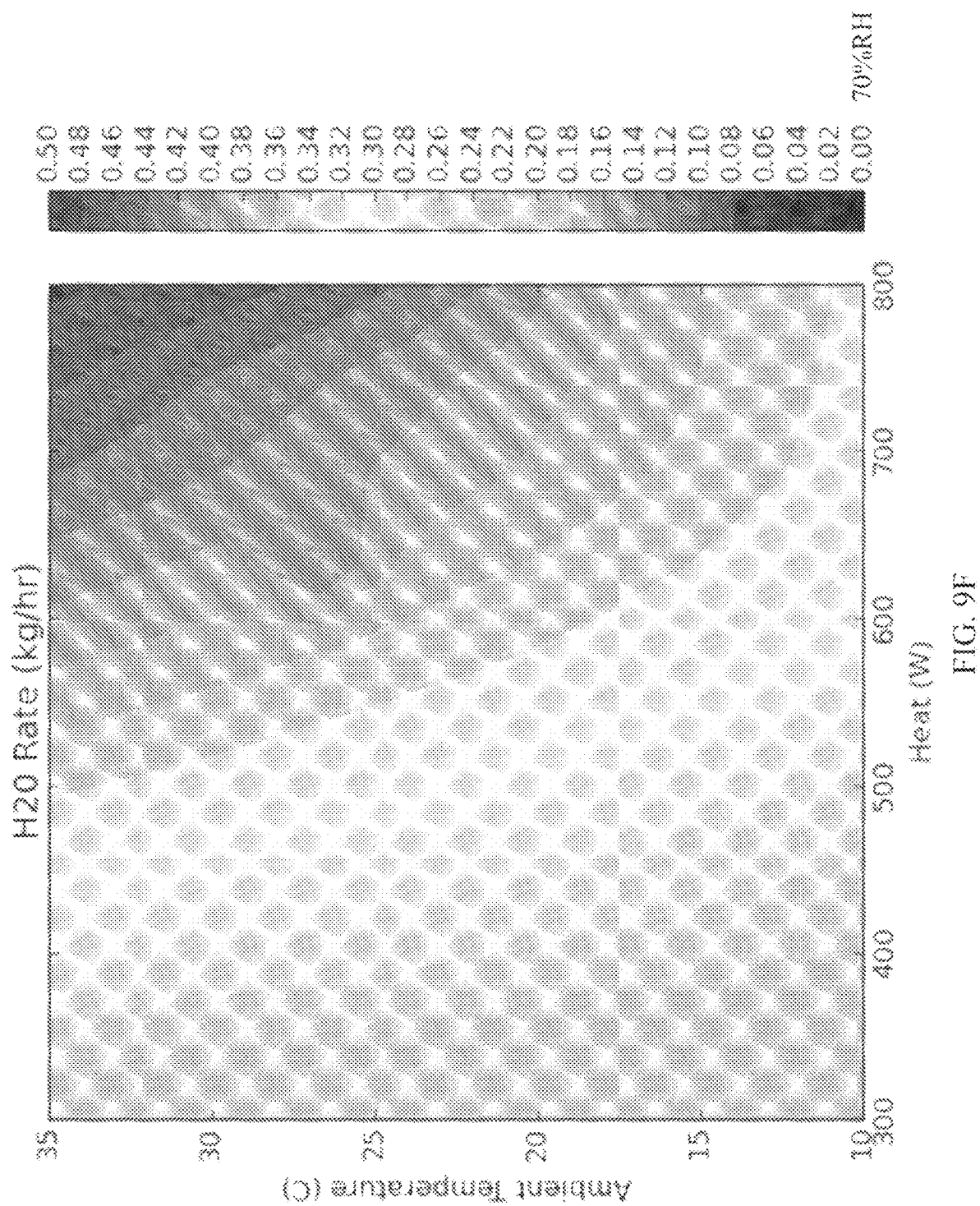

For example, FIG. 6 is a graph illustrating an efficiency of some embodiments of the present systems for generating liquid water from air, at a constant process airflow rate of 90 (cfm), versus ambient air temperature (° C.) ("T1"), ambient air relative humidity ("RH1"), and solar insolation as indicated by heat (W) provided by a thermal unit, such that each point on the graph may represent a system efficiency at a point in a diurnal cycle.

FIGS. 7A-7F show a series of graphs illustrating an efficiency of some embodiments of the present systems for generating liquid water from air (e.g., highest efficiency represented as darkest gray), at constant ambient air relative humidities ("RH"), at a constant process airflow rate of 90 cfm, versus environmental diurnal variations, including ambient air temperature (° C.) and solar insolation as indicated by heat (W) provided by a thermal unit, such that each point on each graph may represent a system efficiency at a point in a diurnal cycle.

FIGS. 8A-8F show a series of graphs illustrating a liquid water production rate in kilograms per hour (kg/hr) of some embodiments of the present systems for generating liquid water from air (e.g., highest liquid water production rate represented as darkest gray), at constant ambient air relative humidities ("RH"), at a constant process airflow rate of 90 cfm, versus environmental diurnal variations, including ambient air temperature (° C.) and solar insolation as indicated by heat (W) provided by a thermal unit, such that each point on each graph may represent a system liquid water production rate at a point in a diurnal cycle (e.g., in Amman, Jordan, on a day in July, at 2:00 PM, RH was 26% (approximately 30%), and heat was 700 W (generated by a solar thermal unit having an area of 1.5 square meters (m2) at an efficiency of 50%), which resulted in a liquid water production rate of approximately 0.30 kg/hr).

FIGS. 9A-9F show the series of graphs of FIG. 8, including points representing various times on a given day. A total amount of liquid water produced during the day may be approximated by integrating across the series of graphs (e.g., in this example, approximately 2.5 liters (L) in the morning hours of the day, and approximately 5 L over a 24 hour period).

In some embodiments, a controller 50 may reference a parametric function and/or a table generated thereby to operate according to optimal (e.g., in terms of liquid water production rate and/or efficiency) operational variables for the system. For example, for each system operational variable (e.g., process air flow rate, regeneration fluid flow rate, desiccant exposure time to process air and/or regeneration fluid, and/or the like), a parametric function may be created that provides the value of the system operational variable which optimizes efficiency and/or liquid water production rate of the system, and the parametric function may be dependent on design specifications (e.g., disk kinetics, disk size, desiccant configuration, solar collector size, condenser geometry and performance, and/or the like) and/or variable ambient conditions (e.g., ambient air temperature, ambient air relative humidity, a level of solar insolation).

By way of illustration, an example derivation of a two variable parametric function is provided below. In this example, a simulation (e.g., as described above with respect to FIG. 5B) may be performed holding all variables constant except for a system operational variable (e.g., in the following example, ambient air temperature is held constant, and regeneration fluid flow rate may be varied). In subsequent steps, the simulation may be repeated, changing the value of the constant (e.g., ambient air temperature, in this example) between simulations in order to develop multiple data sets. Table 2 provides example efficiency data obtained from such simulations (e.g., seven data sets are represented in Table 2, representing simulations performed at seven values of constant ambient air temperature).

TABLE 2

Exemplary Efficiency versus Regeneration Fluid
Flow Rate Data for an Embodiment of the Present
Systems for Generating Liquid Water from Air

| Temperature (° C.) | MFRi (cfm) | Efficiency |
| --- | --- | --- |
| 16 | 16 | 0.497785 |
| 16 | 18 | 0.491958 |
| 16 | 20 | 0.486554 |
| 16 | 22 | 0.480552 |
| 16 | 24 | 0.473718 |
| 16 | 26 | 0.465896 |

TABLE 2-continued

Exemplary Efficiency versus Regeneration Fluid
Flow Rate Data for an Embodiment of the Present
Systems for Generating Liquid Water from Air

| Temperature (° C.) | MFRi (cfm) | Efficiency |
| --- | --- | --- |
| 16 | 28 | 0.457135 |
| 16 | 30 | 0.44745 |
| 16 | 32 | 0.436656 |
| 18 | 16 | 0.483841 |
| 18 | 18 | 0.476546 |
| 18 | 20 | 0.47014 |
| 18 | 22 | 0.463751 |
| 18 | 24 | 0.457388 |
| 18 | 26 | 0.4503 |
| 18 | 28 | 0.442473 |
| 18 | 30 | 0.433895 |
| 18 | 32 | 0.42459 |
| 20 | 16 | 0.472329 |
| 20 | 18 | 0.465762 |
| 20 | 20 | 0.459357 |
| 20 | 22 | 0.453557 |
| 20 | 24 | 0.447222 |
| 20 | 26 | 0.440308 |
| 20 | 28 | 0.43278 |
| 20 | 30 | 0.424646 |
| 20 | 32 | 0.415998 |
| 22 | 16 | 0.463092 |
| 22 | 18 | 0.458915 |
| 22 | 20 | 0.45105 |
| 22 | 22 | 0.446573 |
| 22 | 24 | 0.439184 |
| 22 | 26 | 0.432482 |
| 22 | 28 | 0.425249 |
| 22 | 30 | 0.417523 |
| 22 | 32 | 0.409271 |
| 24 | 16 | 0.45443 |
| 24 | 18 | 0.448595 |
| 24 | 20 | 0.443568 |
| 24 | 22 | 0.438111 |
| 24 | 24 | 0.432175 |
| 24 | 26 | 0.425737 |
| 24 | 28 | 0.418852 |
| 24 | 30 | 0.412195 |
| 24 | 32 | 0.403517 |
| 26 | 16 | 0.446432 |
| 26 | 18 | 0.441048 |
| 26 | 20 | 0.436394 |
| 26 | 22 | 0.431265 |
| 26 | 24 | 0.42722 |
| 26 | 26 | 0.419593 |
| 26 | 28 | 0.413006 |
| 26 | 30 | 0.405906 |
| 26 | 32 | 0.398322 |
| 28 | 16 | 0.437145 |
| 28 | 18 | 0.433456 |
| 28 | 20 | 0.432251 |
| 28 | 22 | 0.424547 |
| 28 | 24 | 0.419341 |
| 28 | 26 | 0.413667 |
| 28 | 28 | 0.407432 |
| 28 | 30 | 0.400671 |
| 28 | 32 | 0.393431 |
| 22 | 26 | 0.432482 |

Figure 10:
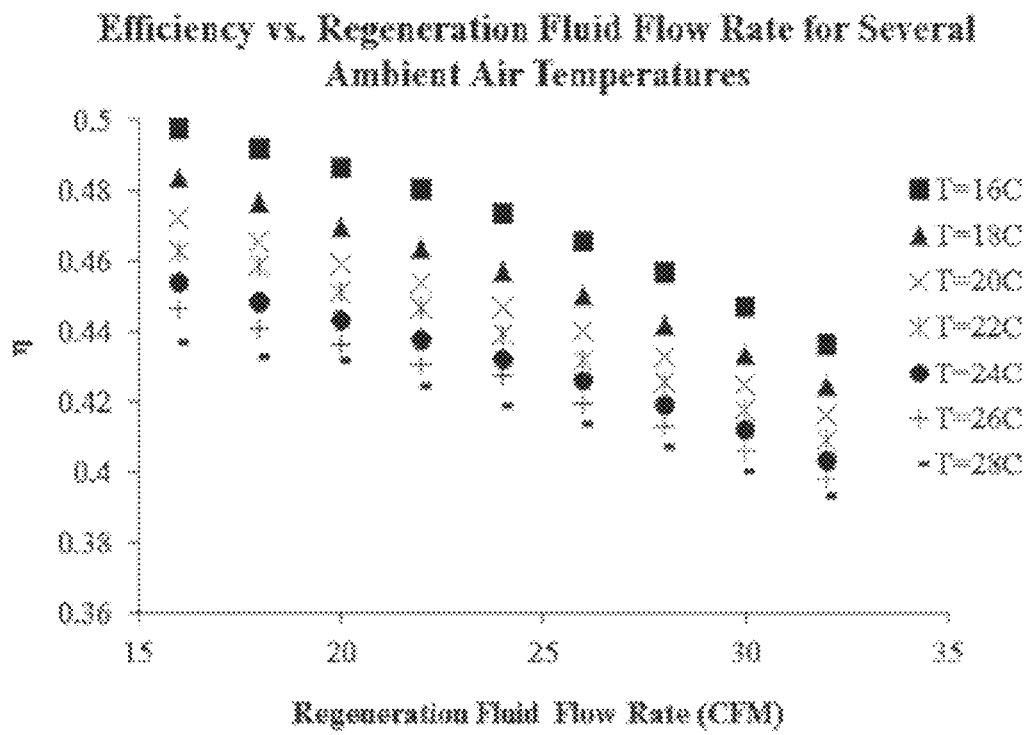
FIG. 10 is an efficiency graph according to an embodiment of the invention.

Data from Table 2, above, is illustrated in FIG. 10. In this example, a mathematical regression may be used to model each data set. To illustrate, a polynomial (e.g., quadratic) regression may be fitted to each data set using the following equations:

$$\eta = a_1 V_{regan}^2 + b_1 V_{regen} + c_1 \text{ at } T_{amb,1} \quad (8)$$

$$\eta = a_2 V_{regan}^2 + b_2 V_{regen} + c_2 \text{ at } T_{amb,2} \quad (9)$$

$$\eta = a_n V_{regan}^2 + b_n V_{regen} + c_n \text{ at } T_{amb,n} \quad (10)$$

where a, b, and, c, are coefficients of the quadratic regression for each n data set. These coefficients may then modeled with a (e.g., further) mathematical regression. To illustrate, in this example, a quadratic regression may be fitted to each set of coefficients, a, b, and c, using the following equations:

$$a = d_1 T_{amb}^2 + e_1 T_{amb} + f_1 \quad (11)$$

$$b = d_2 T_{amb}^2 + e_2 T_{amb} + f_2 \quad (12)$$

$$c = d_3 T_{amb}^2 + e_3 T_{amb} + f_3 \quad (13)$$

Figure 11A:
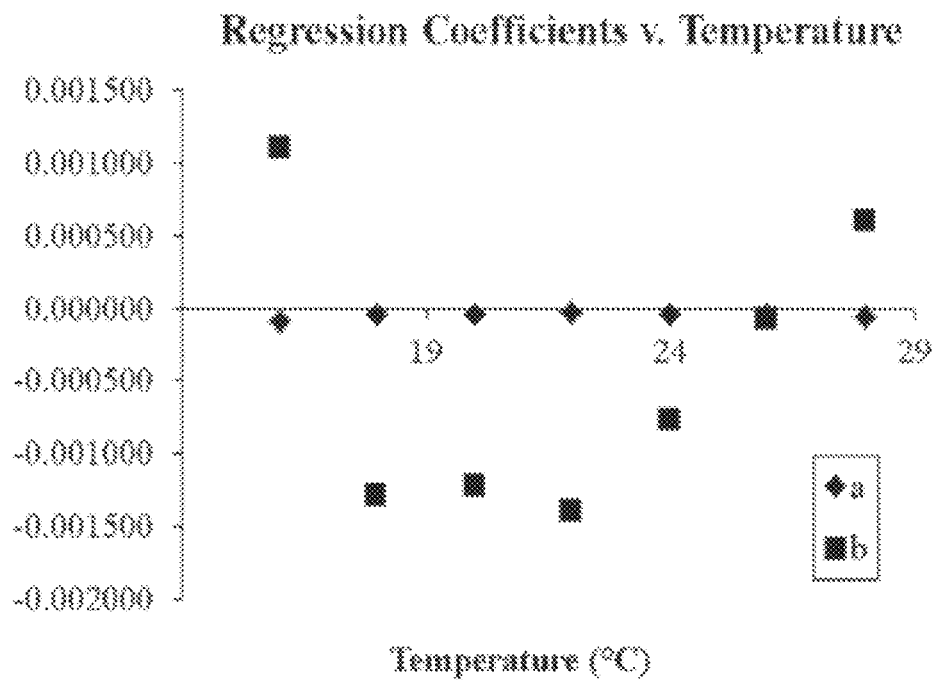
FIGS. 11A and 11B are graphs illustrating coefficients of quadratic regression models fit to the data sets illustrated in FIG. 10 according to an embodiment of the invention.
Figure 11B:
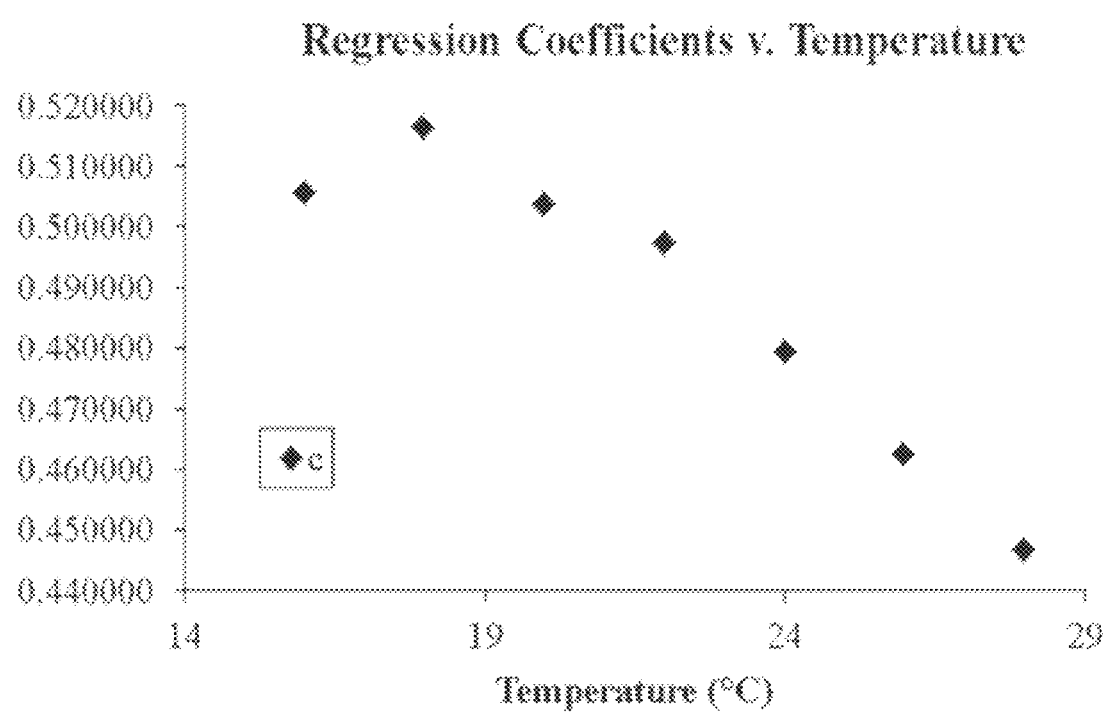

FIGS. 11A and 11B provide graphs of these coefficients versus $T_{amb}$. Through substitution, it may be seen that the efficiency of the system as a function of $T_{amb}$ and $V_{regen}$ may then be expressed as:

$$\eta = (d_1 T_{amb}^2 + e_1 T_{amb} + f_1) V_{regen}^2 + (d_2 T_{amb}^2 + e_2 T_{amb} + f_2) V_{regen} + (d_3 T_{amb}^2 + e_3 T_{amb} + f_3) \quad (14)$$

While Eq. 14 is expressed in terms of two variables (e.g., $V_{regen}$, and $T_{amb}$), the same or a substantially similar process as described above can be performed to express efficiency (e.g., and/or liquid water production rate, and/or the like) as a function of any suitable number of variables (e.g., by performing an additional regression for each added variable).

The maximum efficiency and/or maximum liquid water production rate (e.g., which may be the desired operational state for a system) may be determined by maximizing Eq. 14 (or a similar equation) with respect to each operational variable (e.g., $V_{regen}$, in this example). By way of illustration, in the depicted example, the desired operational state that maximizes efficiency may be the value of $V_{regen}$ at which the partial derivative of Eq. 14 with respect to $V_{regen}$ at a given (e.g., or measured) $T_{amb}$ is equal to zero, or:

$$\left. \frac{\partial \eta}{\partial V_{regen}} \right|_{T_{amb}} = 0 \quad (15)$$

Eq. 15 (or similar equation(s)) may be evaluated over a range of ambient conditions, which may be used to produce a table of optimal operational variables (e.g., in this example, optimal $V_{regen}$ for a range of $T_{amb}$). Such tables may then be further modeled by a mathematical regression (e.g., a quadratic regression). In this example, this may be shown as:

$$V_{regen,optimual} = g T_{amb}^2 + h T_{amb} + i \quad (16)$$

where $V_{regen,optimal}$ represents the optimal regeneration fluid flow rate at a given temperature. A controller 50 may then reference any of: the table of optimal operational variables, a parametric equation based on the table of optimal operational variables (e.g., Eq. 16), and/or the like. In some embodiments, a controller 50 may perform any and/or all of the above steps to develop such parametric equation(s) and/or tables. In some embodiments, a controller 50 may be programmed with such parametric equations, for example, in some embodiments, the controller may be programmed with the following equations:

$$\omega_{disk,optimal} = f(T_{amb}, RH_{amb}, T_{regen}) \quad (17)$$

$$V_{process,optimal} = f(T_{amb}, RH_{amb}, T_{regen}) \quad (18)$$

$$V_{regen,optimal} = f(T_{amb}, RH_{amb}, T_{regen}) \quad (19)$$

where $\omega_{disk,optimal}$, $V_{process,optimal}$, and $V_{regen,optimal}$ represent optimal disk rotation rate, process air flow rate, and regeneration fluid flow rate operational variables at given values of ambient air temperature, ambient air relative humidity, and regeneration fluid temperature (e.g., indicative of a level of solar insolation).

Control Systems and Methods

Figure 12:
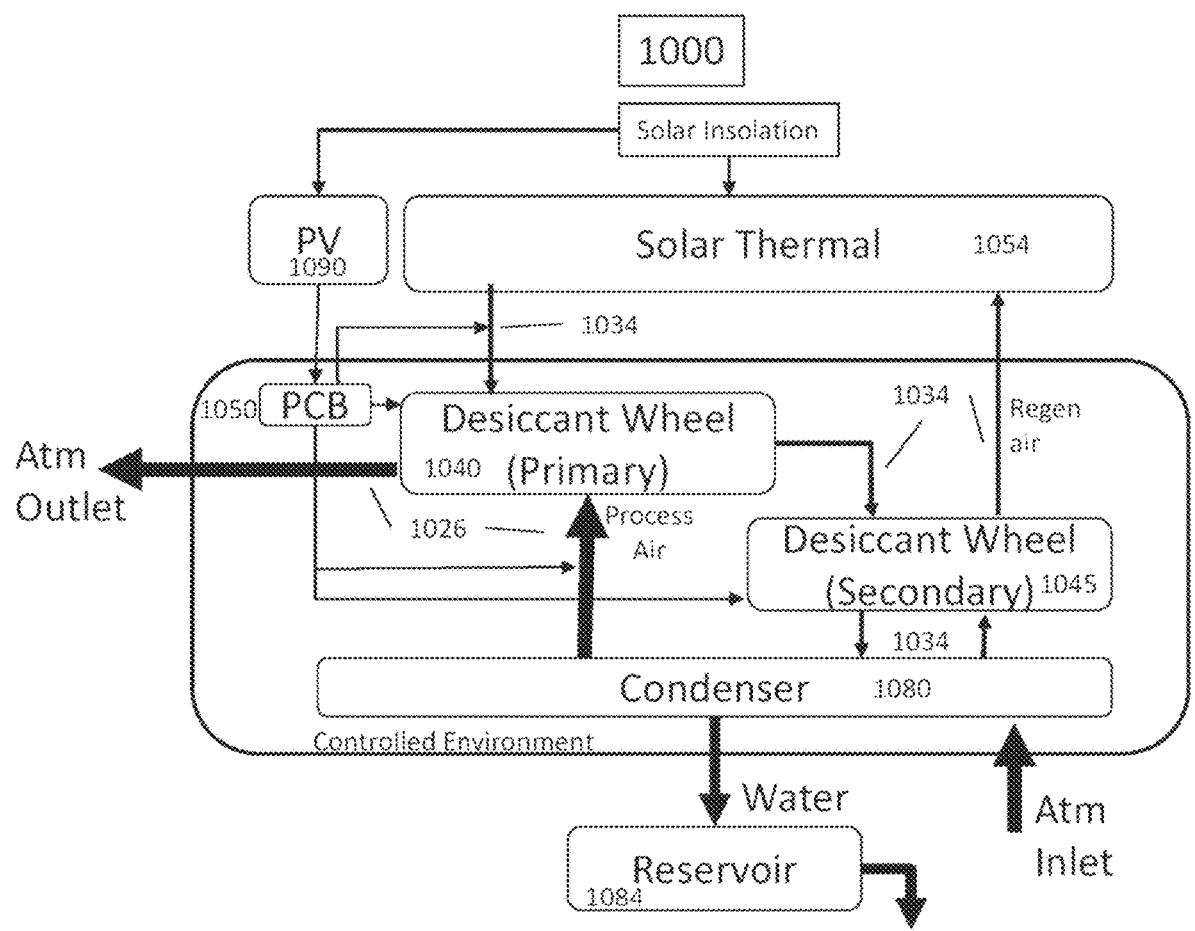
FIG. 12 is a diagram of a system for generating liquid water from air according to an embodiment of the invention.

FIG. 12 is a diagram of a system 1000 for generating liquid water from air according to an embodiment of the invention. Similarly to system 10 described above, system 1000 may be configured to function responsive to diurnal variations. For example, as described in more detail below, system 1000 may be configured to control one or more operational parameters (e.g., control and/or controlled variables) based on one or more diurnal variations (e.g., variations in ambient air temperature, ambient air relative humidity, solar insolation, and/or the like).

System 1000 may comprise a primary desiccant unit 1040 and secondary desiccant unit 1045. Each desiccant unit 1040/1045 may comprise a desiccant (e.g., sorption medium), where the desiccant (e.g., or a portion thereof) may be selectively (e.g., and/or alternatively) movable between zones. The desiccant in the primary desiccant unit 1040 may be movable between an adsorption zone, in which the desiccant is in fluid communication with a process air pathway (e.g., a process airflow path) 1026 and a desorption zone, in which the desiccant is in fluid communication with a (e.g., closed-loop) regeneration fluid pathway (e.g., a regeneration fluid path) 1034. The desiccant in the secondary desiccant unit 1045 may be movable between different sections of the regeneration fluid pathway 1034. In some embodiments, the adsorption and desorption zones may be defined by housings of each desiccant unit 1040/1045. Each desiccant unit 1040/1045 may be configured similarly to those of system 10 above (e.g., the materials, desiccants used, arrangements, and/or operations may be as described above).

Similarly to system 10, system 1000 may include one or more blowers and/or one or more circulators. For example, a blower may be disposed in process air pathway 1026 and may be configured to adjust a flow rate of air through the process air pathway. A circulator may be disposed in regeneration fluid pathway 1034 and may be configured to adjust a flow rate of fluid through the regeneration fluid pathway. In some embodiments, blowers and/or circulators may be controlled by controller 1050 (e.g., controlling speeds of blowers and/or circulators to optimize liquid water production). In some embodiments, blowers and/or circulators may be configured to substantially maintain a pre-determined flow rate through process air pathway 1026 and/or regeneration fluid pathway 1034.

System 1000 may comprise a thermal unit 1054 configured to provide thermal energy to fluid in regeneration fluid pathway 1034 (e.g., such that desiccant may be regenerated). In some embodiments, thermal unit 1054 may be a solar thermal unit (e.g., is configured to convert solar insolation to thermal energy). While the present systems may comprise any suitable thermal unit, whether solar or otherwise, thermal unit 1054 may be similar to thermal unit 54 described above, for example.

System 1000 may comprise a condenser 1080 configured to receive fluid from the desorption zone via the regeneration fluid pathway and produce liquid water from the received fluid (e.g., by condensing water vapor in fluid in the regeneration fluid pathway). Condenser 1080 may comprise any suitable material and may be of any suitable configuration. For example, condenser 1080 may be similar to condenser 80 described above.

System 1000 may comprise a water collection unit 1084 configured to receive liquid water produced by condenser 1080. Water collection unit 1084 may be similar to water collection unit 84 described above, for example. In some embodiments, a filter may be positioned between condenser 1080 and water collection unit 1084 (e.g., to reduce an amount of impurities, such as, for example, sand, bacteria, fibrous, carbonaceous species, and/or the like, which may be present in liquid water produced by condenser 1080). Water collection unit 1084 (e.g., or filter thereof) may comprise an ultraviolet (UV) light source, one or more water level sensors, and/or a receptacle configured to receive one or more additives for introduction to the produced liquid water, such as those described in the context of system 10 above.

System 1000 may comprise indicators (e.g., lights, such as, for example, LEDs), which may be configured to provide information regarding system operation. For example, indicators may be configured similarly to those in system 10, as described above.

A controller (e.g., processor) 1050 may control exposure of desiccant (or a portion thereof) to air in process air pathway 1026 and regeneration fluid in regeneration fluid pathway 1034 (e.g., to increase and/or optimize the liquid water ultimately produced by condenser 1080), and such control may vary over a diurnal cycle (e.g., in response to diurnal variations). Such variations in environmental conditions (e.g., inputs into controller 1050) may include, for example, ambient air temperature, ambient air relative humidity, and solar insolation. Other inputs to controller 1050 may include, for example, an amount of thermal energy generated by thermal unit 1054, a relative humidity of air in process air pathway 1026, a relative humidity of fluid in regeneration fluid pathway 1034, a temperature of fluid in the regeneration fluid pathway between desiccant and thermal unit 1054, a rate of water production, and/or the like. Controller 1050 may be configured to optimize liquid water production by controlling a rate of desiccant movement between the adsorption zone and the desorption zone, controlling a speed of blower and/or circulator, and/or the like, based, on measurements of one or more of such inputs (e.g., such that controller 1050 may optimize liquid water production based on current environmental and system conditions). Controller may be powered by photovoltaic power source (PV) 1090. Generally, controller 1050 may perform functions similar to those detailed in the "Water Extraction" section.

Figure 13:
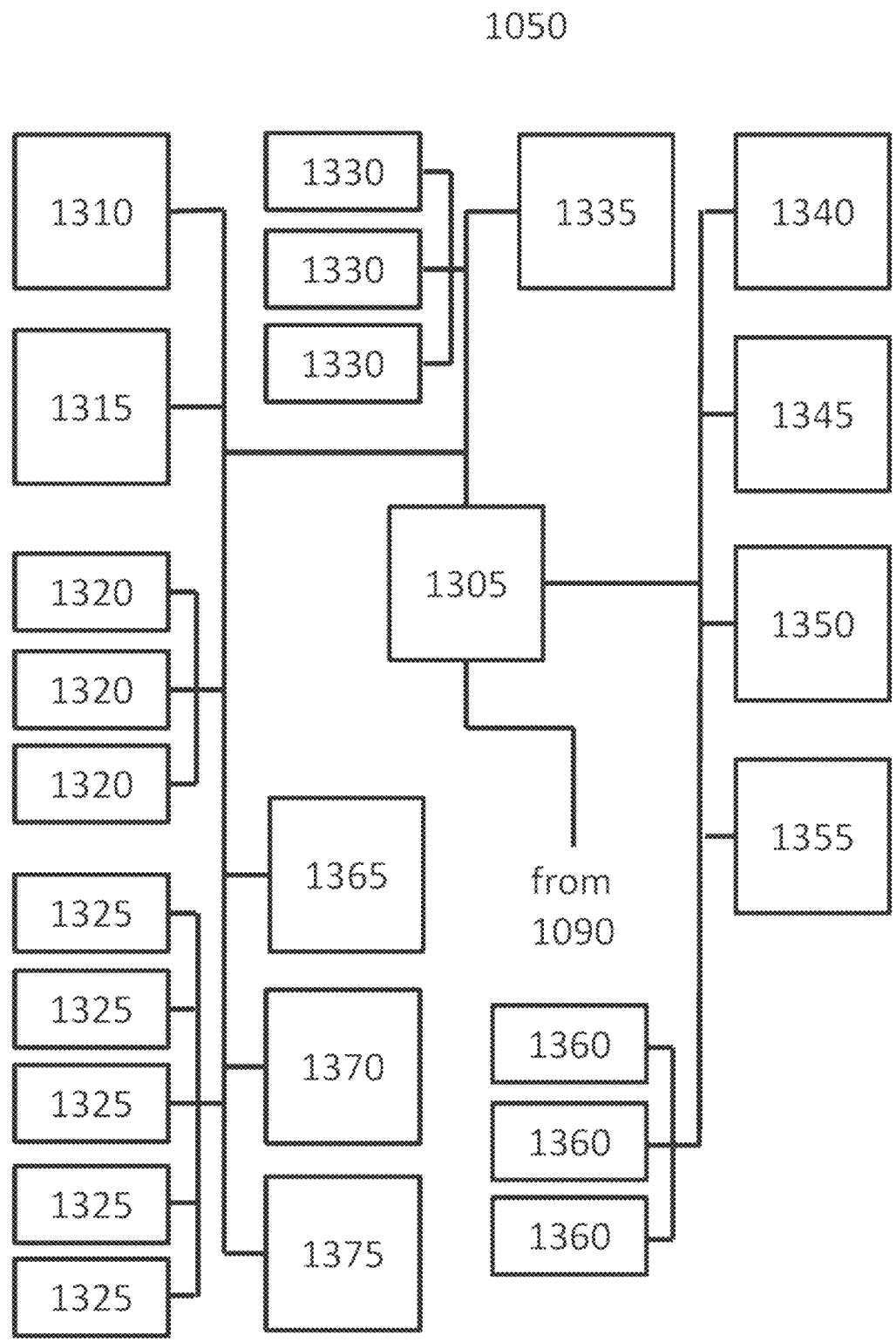
FIG. 13 is a diagram of a controller according to an embodiment of the invention.

FIG. 13 is a diagram of a controller 1050 according to an embodiment of the invention. Controller 1050 of FIG. 13 is one example embodiment which may be configured to perform the functions described herein, although those of ordinary skill in the art will appreciate that other configurations may be possible. Controller 1050 may be powered by PV 1090. Controller 1050 may include a microcontroller 1305, for example a microcontroller based on the STM32F401—ARM Cortex-M4 with FPU. Controller 1050 may include a motor power supply 1310 (e.g., based on a synchronous buck topology) for powering motors such as those used to drive the desiccant wheels and/or fans. Controller 1050 may include a desiccant wheel motor controller power supply 1315 (e.g., based on a buck topology) for powering motor controllers. Controller 1050 may include three motor/fan pulse width modulation (PWM) outputs 1320 and five motor/fan tachometer inputs 1325 for controlling and monitoring motors and fans. Controller 1050 may include three external NTC thermistor temperature inputs 1330, one on-board temperature and humidity sensor 1335, one interface to an off-board temperature and humidity sensor 1340, one water level input 1345, and one digital flow meter input 1350 for receiving sensor data. Controller 1050 may include a LED driver for 3 ultraviolet LEDs 1355 and three drivers for status LEDs 1360 for controlling the LEDs. Controller 1050 may include a UART interface to GSM or other radio transceiver 1365 for network communications and a USB or other hardware interface 1370 (e.g., to enable communication with a PC-based service tool). Controller 1050 may include serial EEPROM or other memory 1375.

Controller 1050 may be configured to control operations of system 1000 through execution of instructions stored in memory 1375 by microcontroller 1305, for example. Controller 1050 may control system 1000 operation through control of wheel motor operation and speed, regen fan operation and speed, and process fan operation and speed. In embodiments wherein one or more of the sensors output analog signals, microcontroller 1305 may use an analog to digital converter to receive sensor outputs. For example, PV voltage, PV current, 12V voltage (e.g., from one or more power supplies), wheel motor currents, fan currents, and/or LED currents may be sensed with sensors outputting analog signals. Other sensors may output digital signals, and microcontroller 1305 may read such signals directly. For example, humidity, temperature, water level, and water flow may be sensed with sensors outputting digital signals. Controller 1050 may control system 1000 to optimize water production as described below Additionally, controller 1050 may be used with systems 10 and 98, for example, or other water collection systems, to control such systems to optimize water production in those systems in like fashion.

In some embodiments, sensors may not deliver outputs at similar speeds. For example, temperature sensor may provide readings more quickly than humidity sensor. In some embodiments, humidity sensor readings may lag behind temperature sensor readings by 18 seconds. To compensate for this effect, controller 1050 may include a signal filter (e.g., a first-order low-pass digital filter implemented in controller 1050 hardware or software or firmware executed by controller 1050). For example, for a filter having a time constant of 6 seconds (i.e., the time it takes the filtered content to reach 63.2% of its step value), the filter may have a cut off frequency of 0.026526 Hz. Temperature sensor readings may pass through the signal filter to slow the temperature sensor reading response time to match the response time of the humidity sensor. Accordingly, temperature sensor readings and humidity sensor readings may be synchronized when relative humidity is not at steady state.

Controller 1050 may determine motor and/or fan speed by measuring a period from rising edge to rising edge of each tachometer feedback signal and converting the measured period to RPM, given that there may be two tachometer pulses per revolution. Controller 1050 may output a PWM signal for each motor/fan with a nominal frequency of 100 kHz, for example. Speed control error may be reduced by performing PID closed-loop feedback speed control.

Water flow may be determined by controller 1050 through sensing of rising and falling edges in the output of a digital water flow meter (e.g., where each edge represents 5 mL of water production).

Status LEDs 1360 may include a system on (e.g. green) LED, a maintenance required (e.g., yellow) LED, and/or a general failure (e.g., red) LED. Controller 1050 may communicate specific data through control of the status LEDs 1360. For example, controller 1050 may blink system on LED at a rate of 1 Hz with 25% duty cycle whenever the system is powered on, thereby indicating normal operation. Controller 1050 may activate the maintenance required LED whenever the water filter life remaining falls below 5.%. Controller 1050 may operate the general failure LED in a variety of patterns to indicate different failures. For example, the following patterns may be used in some embodiments:

1 regen fan failure—1 blink followed by 5 seconds of off time 2 wheel motor failure—2 blinks followed by 5 seconds of off time 3. process fan failure—3 blinks followed by 5 seconds of off time wherein a blink may be defined as 0.25 seconds on followed by 0.25 seconds off, for example. If multiple failure conditions are active, controller 1050 may control the general failure LED to blink through the active patterns consecutively.

Controller 1050 may operate in a variety of modes. For example, by default in some embodiments, controller 1050 may operate in a run mode, wherein the microcontroller 1305 may execute autonomous tasks such as obtaining measurements from sensors, controlling motors and fans, controlling LEDs, optimizing water flow, optimizing water production, enabling a service interface (e.g., interface 1370), and/or gathering and/or reporting telematics information (e.g., via transceiver 1365).

Controller 1050 may be operable in a full mode, for example when controller 1050 determines through sensor data that the water level in reservoir 1084 has reached a threshold level (e.g., reached a depth at which a maximum water level sensor is mounted). In full mode, controller 1050 may turn off motors and fans (e.g., to halt accumulation of moisture in desiccants and flow of fluids) while continuing to operate the service interface and telematics features.

Controller 1050 may be operable in a stop mode, for example when controller 1050 receives a stop command through interface 1370 or transceiver 1365. In stop mode, controller 1050 may turn off motors and fans while continuing to operate the service interface and telematics features. When controller 1050 receives a start command through interface 1370 or transceiver 1365, controller 1050 may transition to run mode.

Controller 1050 may be operable in a test mode, for example when controller 1050 receives a test command through interface 1370 (e.g., from a service tool or other computer coupled to interface 1370). In test mode, controller 1050 may communicate input values from sensors to the service tool and/or accept commands for controlling outputs from the service tool. When controller 1050 receives a run command through interface 1370 or after a period of receiving no commands through interface 1370 (e.g., 5 seconds or some other period of time), controller 1050 may transition to run mode.

Controller 1050 may control the components of system 1000 to optimize water production. For example, controller 1050 may control system 1000 to refrain from producing water when environmental conditions are such that water cannot be produced (or cannot be produced at a desired efficiency level), such as at night when solar thermal unit 1054 cannot operate. At such times, controller 1050 may control system 1000 to operate in a "no-go" mode. When water may be produced efficiently, controller 1050 may control system 1000 to produce the water (i.e., to operate in a "go" mode).

Figure 14:
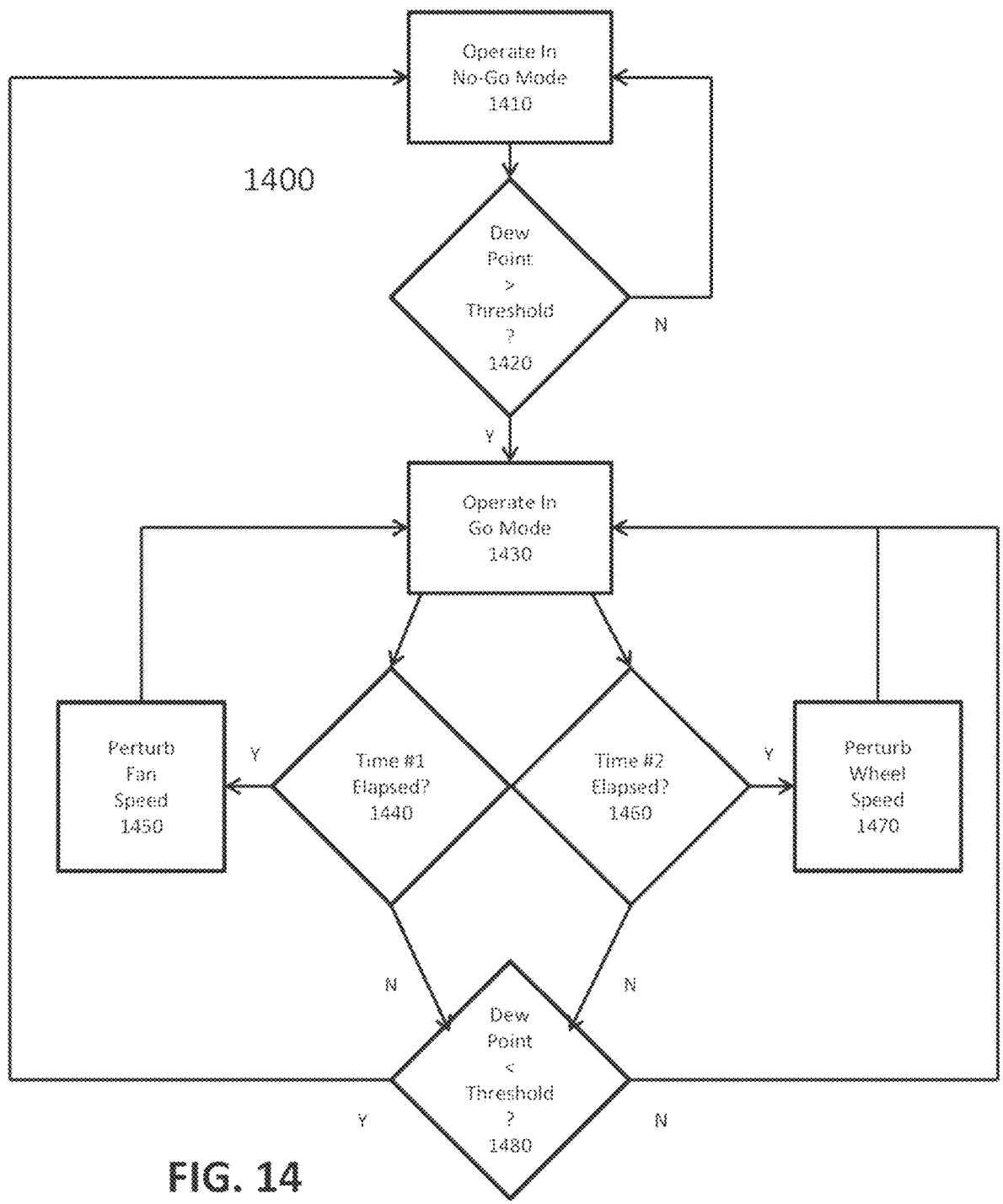
FIG. 14 is a go/no-go mode determination process according to an embodiment of the invention.

FIG. 14 is a go/no-go mode determination process 1400 according to an embodiment of the invention. After a power-on reset, controller 1050 may operate in the no-go mode 1410. While in this mode, controller 1050 may set the wheel motor speeds and regen fan speeds to speeds at or near minimum operating levels (e.g., supplying minimum operating voltage so that they may be quickly sped up when transitioning to go mode). For example, controller 1050 may set the wheel motor speeds to 125 RPM (assuming gear ratio of 3000:1, this may result in a wheel speed of 0.25 degrees per second), and controller 1050 may set the set the regen fan to a speed of 2000 RPM, for example, which may result in an air flow rate of less than 10 CFM.

In some embodiments, controller 1050 may completely power off the wheel motors and fans in no-go mode. In such cases, controller 1050 may monitor PV power to formulate an estimate of the solar energy taken in by solar thermal unit 1054, for example. If PV 1090 is receiving solar energy and using it to generate electricity, solar energy taken in by solar thermal unit 1054 may be estimated based on how much electricity is being generated by PV 1090. When PV power reaches a specified threshold, wheel motors and fans may be turned on in anticipation of entering go mode shortly thereafter.

While in no-go mode, controller 1050 may calculate the dew point as a function of ambient relative humidity and the hot-side temperature according to Eq. 20 (or similar equation) 1420. Ambient relative humidity and hot-side temperature may be obtained from a humidity sensor placed on the outside of system 1000 and a temperature sensor placed between thermal unit 1054 and primary desiccant wheel 1040 or within thermal unit 1054, respectively. As noted above, in some embodiments, temperature sensor output may pass through a filter to synchronize the temperature sensor and humidity sensor outputs.

$$DP = \frac{243.04 \times \left[\ln RH + \frac{17.625T}{243.04 + T}\right]}{17.625 - \ln RH - \frac{17.625T}{243.04 + T}} \qquad (20)$$

Controller 1050 may transition to go mode if the calculated dew point is greater than the ambient temperature plus some additional temperature (e.g., 10° C.). While in go mode, controller 1050 may maximize water collection efficiency by maximizing VAP, which may be defined as absolute humidity of the air between the primary and secondary desiccant wheels (estimated via Eq. 21 or similar or observed directly via a sensor disposed in regeneration fluid pathway 1034 between the primary desiccant wheel 1040 and secondary desiccant wheel 1045) multiplied by regeneration fluid flow (Eq. 22 or similar).

$$AH = \frac{6.112 \times e^{\left[\frac{17.67 \times T}{T + 243.5}\right]} \times RH \times 2.1674}{273.15 + T} \qquad (21)$$

$$VAP = Flow_{Regen} \times AH \qquad (22)$$

When go mode is entered, fan and wheel speeds may be adjusted to starting values and subsequently modified to maximize VAP. In some embodiments, starting values may be defaults (e.g., fan speed set such that regeneration fluid flow is approximately 30 CFM, desiccant wheel speed set to 0.25° of rotation per second). In some embodiments, starting values may be established dynamically. For example, starting values may be based upon previously established optimal values for similar conditions obtained at system 1000 or from another system in communication with system 1000. Starting values may be prescribed by a user (e.g., via network or service tool). Starting values may be based on a prediction made according to the efficiency models described above in the "Water Extraction" section. Starting values may be based on a previous day's values at time start+X (e.g., where X=1 hour or some other time that may allow VAP to be maximized), which may be stored in memory 1375.

Periodically (e.g., after a certain amount of time, such as 30 seconds in one example, elapses) 1440, controller 1050 may perturb regen fan speed 1450 to maximize VAP. For example, controller 1050 may make an initial VAP determination and adjust regen fan speed upward (faster) or downward (slower). If adjusting the fan speed upward causes VAP to increase, controller 1050 may adjust fan speed upward again in the next period. If adjusting the fan speed upward causes VAP to decrease, controller 1050 may adjust fan speed downward in the next period. Likewise, if adjusting the fan speed downward causes VAP to increase, controller 1050 may adjust fan speed downward again in the next period. If adjusting the fan speed downward causes VAP to decrease, controller 1050 may adjust fan speed upward in the next period.

Similarly, controller 1050 may periodically (e.g., after a certain amount of time, such as 300 seconds in one example, elapses) 1460 perturb desiccant wheel speed 1470 to maximize VAP. Controller 1050 may perturb desiccant wheel speed less frequently than regen fan speed in some embodiments (e.g., once for every ten perturbations of regen fan speed). For example, controller 1050 may make an initial VAP determination and adjust desiccant wheel speed upward (faster) or downward (slower). If adjusting the desiccant wheel speed upward causes VAP to increase, controller 1050 may adjust desiccant wheel speed upward again in the next period. If adjusting the desiccant wheel speed upward causes VAP to decrease, controller 1050 may adjust desiccant wheel speed downward in the next period. Likewise, if adjusting the desiccant wheel speed downward causes VAP to increase, controller 1050 may adjust desiccant wheel speed downward again in the next period. If adjusting the desiccant wheel speed downward causes VAP to decrease, controller 1050 may adjust desiccant wheel speed upward in the next period.

While operating in go mode, controller 1050 may continue to calculate Eq. 20 periodically to track the relationship between dew point and ambient temperature 1480. If the calculated dew point falls below the ambient temperature plus some additional temperature (e.g., 5° C.), controller 1050 may switch back to no-go mode, as it may no longer be efficient or possible to produce water in such conditions.

When VAP is maximized, perturbations of fan speed and wheel speed may tend to cause fan speed and wheel speed to oscillate closely about the optimal settings for maximizing VAP. Such settings may be observed by controller 1050 and stored in memory 1375 along with observed operating conditions (e.g., Eq. 20, ambient humidity, etc.). Accordingly, the stored observations may be used to define starting settings on future go mode startups as noted above. When transitioning to go mode, controller 1050 may compare current conditions with previously observed settings at similar conditions and set initial fan speed and wheel speed values according to the stored settings.

Controller 1050 may control primary wheel 1040 and secondary wheel 1045 to operate at the same speed and at the same time. For example, in some embodiments secondary wheel 1045 may be controlled with the same control signal as primary wheel 1040. However, in other embodiments, controller 1050 may perform active control of secondary wheel 1045. Active control of secondary wheel 1045 may be undertaken to further optimize water vapor exchange from condenser 1080 outlet to condenser 1080 inlet and further optimize the transfer of heat from the inlet side to the outlet side of condenser 1080.

Active control of secondary wheel 1045 may be managed in a variety of ways. For example, one or more sensors may be installed at the inlet to condenser 1080 (i.e., the outlet of secondary wheel 1045) to monitor relative humidity and temperature. Under the assumption that relative humidity at the outlet to condenser 1080 may be 100%, and given that the expected condenser efficiency, flow characteristics, and other design variables may be known, the temperature at the outlet to condenser 1080 may be implicitly known. To optimize this temperature, controller 1050 may modulate secondary wheel 1045 speed to maximize absolute humidity at the inlet to condenser 1080. Similar to 1460-1480 of FIG. 14, controller 1050 may wait for a period of time to elapse and perturb the speed of secondary wheel 1405. After changing the speed, controller 1050 may monitor sensors at the inlet to condenser 1080 to see if absolute humidity has increased or decreased. If absolute humidity has increased, on the next cycle controller 1050 may perturb speed of secondary wheel 1405 in the same direction as last time. If absolute humidity has decreased, on the next cycle controller 1050 may perturb speed of secondary wheel 1405 in the opposite direction as last time. In another example, relative humidity alone may be monitored at the inlet to condenser 1080 and maximized through the same perturbation technique.

Note that in embodiments wherein a relative humidity and temperature sensor are disposed at an inlet of condenser 1080, VAP may be calculated differently. Assuming 100% relative humidity at condenser 1080 output, and measuring temperature at condenser 1080 output via a temperature sensor, may yield the following:

$$VAP= \tag{23}$$

In some embodiments, relative humidity may also be monitored at the outlet of condenser 1080. It may be possible to meet the go condition and see less than 100% relative humidity on the outlet of condenser 1080. This may indicate that system 100 has not crossed through the dew point in the condenser 1080, suggesting a potential problem at some point in the system 100 (e.g., a control error or leak).

Controller 1050 may also perform maximum power point tracking (MPPT) of PV 1090. For example, controller 1050 may track MPPT by perturbing process fans according to Table 2: MPPT Truth Table. Changes in PV voltage and power may be observed as a result of fan speed adjustment, and fans may be perturbed periodically to maximize PV output (with the understanding that PV output may necessarily be affected by regen fan and motor speed, which may be assumed as givens for the purposes of MPPT).

TABLE 2

MPPT Truth Table

| PV Power | PV Voltage | Action |
| --- | --- | --- |
| Decrease | Decrease | Decrease process fan speed |
| Decrease | Increase | Increase process fan speed |
| Yes | No | Increase process fan speed |
| Yes | Yes | Decrease process fan speed |

Figure 16:
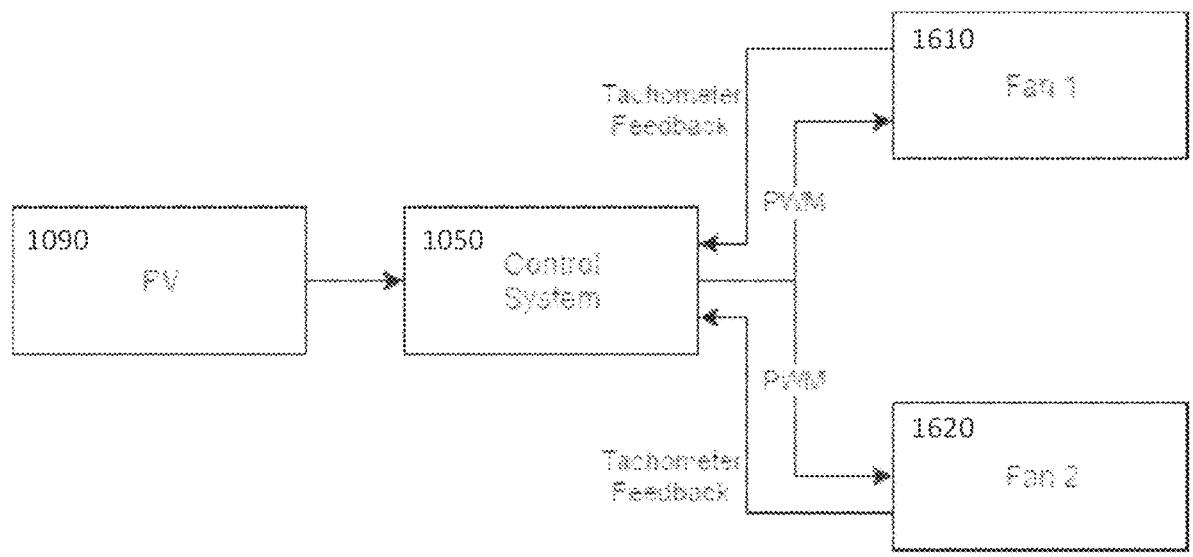
FIG. 16 is a diagram of a maximum power point tracking approach according to an embodiment of the invention.

FIG. 16 is a diagram of an MPPT approach 1600 according to an embodiment of the invention. The primary electrical loads during the day may include a set of high-powered fans 1610 and 1620 (e.g., regen fan and process fan). Controller 1050 may include closed-loop speed controllers for fans 1610 and 1620. Controller 1050 may use respective tachometer feedback signals from each fan 1610 and 1620 to measure fan speed. Controller 1050 may use respective PWM signals to set fan speeds for each fan 1610 and 1620. Controller 1050 may perturb the fan speeds by changing the PWM duty cycle and observe the power delivered by PV 1090 using a voltage measurement and a current sensor, thus resulting in MPPT.

Figure 15:
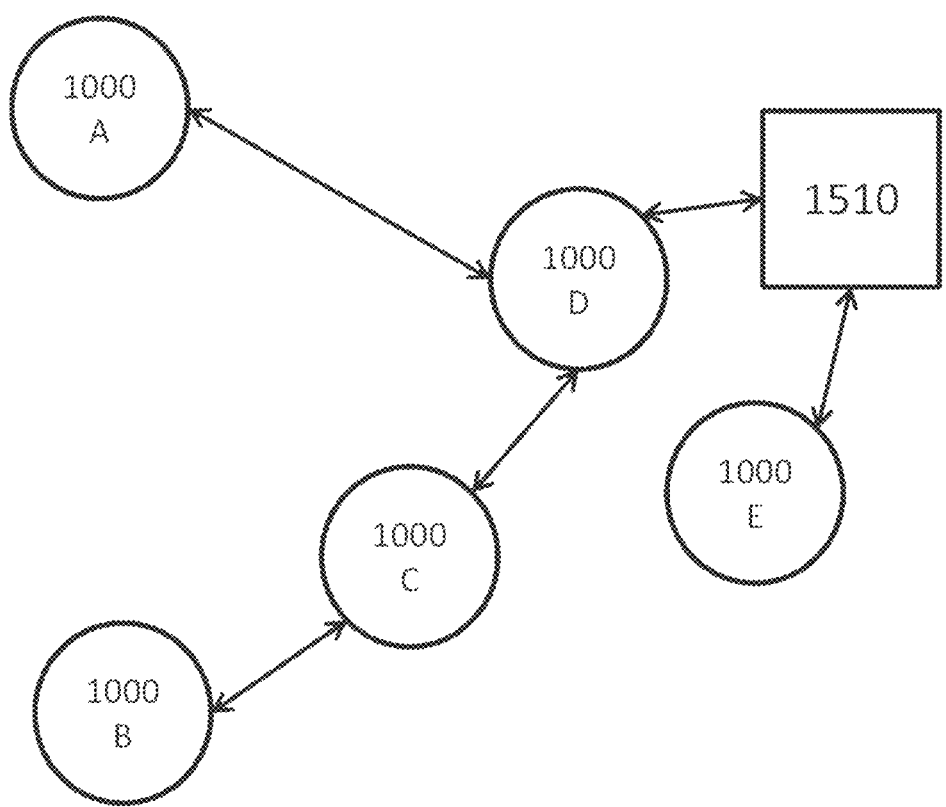
FIG. 15 is a network of water generating systems according to an embodiment of the invention.

Using transceiver 1365, system 1000 may join a network of similar systems and other devices. FIG. 15 is a network 1500 of water generating systems 1000 according to an embodiment of the invention. Individual systems 1000A-E may be able to communicate with one another using transceiver 1365, which may be, for example, a GSM radio or an 802.15.4 radio. Each controller 1305 may include a network protocol stack (e.g., MiWi, 6LoWPAN, etc.) for creating a wireless mesh network 1500 connecting one or more systems 1000A-D to a remote gateway 1510. Five systems 1000A-E and one gateway 1510 are shown in this example, although any number of systems and/or gateways may be possible. In some cases, gateway 1510 may be integrated into one or more of systems 1000.

In some embodiments, systems 1000 may communicate with one another, such that one system 1000 may forward communications for another system 1000 to and from gateway 1510 (e.g., as shown in FIG. 15, where systems A and C communicate with system D, and system B communicates with system C) and/or may communicate directly with gateway 1510 (e.g., systems D and E). Gateway 1510 may be connected to another network (e.g., the Internet) via any suitable networking hardware (e.g., cellular data modem, wired or wireless Internet connection, etc.). Accordingly, systems 1000 may communicate, via the Internet through gateway 1510, with remote servers.

Each system 1000 may gather telemetry data and report it to a server via network 1500. For example, controller 1050 may periodically (e.g., every two minutes) assemble and send a data stream including some or all of the following data elements to a configured e-mail address using SMS or some other suitable protocol if a GSM radio is connected, or to a remote gateway 1510: ambient temperature, hot-side temperature, ambient relative humidity, external relative humidity, PV voltage, PV current, PV power, wheel motor target speed, wheel motor measured speed, regen fan target speed, regen fan measured speed, process fan target speed, process fan measured speed, VAP, and/or accumulated water count. Controller 1050 may also receive commands via network 1500, for example, but not limited to start water production, stop water production, read configuration, write configuration, and/or reboot. Controller 1050 may also accept memory programming commands for upgrades. Controller 1050 may make use of AES-128 encryption or other suitable security measures to transfer memory programming data and CRC algorithms to ensure memory programming data integrity in some embodiments.

While various embodiments have been described above, it should be understood that they have been presented by way of example and not limitation. It will be apparent to persons skilled in the relevant arts that various changes in form and detail can be made therein without departing from the spirit and scope. In fact, after reading the above description, it will be apparent to one skilled in the relevant arts how to implement alternative embodiments.

In addition, it should be understood that any figures that highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims, and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A system for extracting liquid water from air, the system comprising a thermal unit, a regeneration fluid path, at least one sensor, at least one motor, and a controller coupled to the at least one motor, the controller being configured to: receive at least one signal from the at least one sensor, determine a water extraction efficiency, and adjust a speed of the motor in response to the water extraction efficiency; wherein the water extraction efficiency is obtained by multiplying a regeneration fluid flow rate within the regeneration fluid path by an absolute humidity of the regeneration fluid within the regeneration fluid path.

2. The controller of claim 1, wherein the at least one sensor comprises at least one of a flow sensor or a humidity sensor,
   wherein the at least one sensor is disposed in the regeneration fluid path on the side of the primary desiccant wheel opposite the side in communication with the thermal unit; and
   wherein the at least one signal comprises at least one of a regeneration fluid flow rate signal from the flow sensor, or a humidity signal from the humidity sensor.

3. The controller of claim 1, wherein the at least one sensor comprises a humidity sensor disposed outside the system, and a temperature sensor disposed in or near the thermal unit;
   wherein the at least one signal comprises a humidity signal from the humidity sensor and a temperature signal from the temperature sensor; and
   wherein the microcontroller is further configured to at least one of:
   estimate the absolute humidity of air disposed outside the system using the humidity signal and the temperature signal; or
   determine a dew point using the humidity signal and the temperature signal.

4. The controller of claim 1, wherein the at least one sensor comprises a humidity sensor disposed outside the system, and a temperature sensor disposed in or near the thermal unit;
   wherein the at least one signal comprises a humidity signal from the humidity sensor and a temperature signal from the temperature sensor; and
   wherein the controller further comprises a filter configured to synchronize the temperature signal with the humidity signal.

5. The controller of claim 1, wherein the system further comprises:
   a secondary desiccant wheel disposed between the primary desiccant wheel and a condenser,
   wherein the at least one sensor comprises a humidity sensor disposed at an inlet of the condenser; and
   wherein the microcontroller is configured to optimize a humidity at the inlet of the condenser by adjusting a speed of the secondary desiccant wheel.

6. The controller of claim 1, wherein the microcontroller is further configured to at least one of:
transition from a no-go mode to a go mode in response to determining that a dew point is above a threshold value; or
transition from the go mode to the no-go mode in response to determining that the dew point is below a threshold value,
wherein, in the go mode, the microcontroller controls the at least one motor to cause the system to extract the liquid water, and
wherein, in the no-go mode, the microcontroller controls the at least one motor to prevent the system from extracting the liquid water.

7. The controller of claim 6, wherein the microcontroller is further configured to set a motor speed when the microcontroller transitions from the no-go mode to the go mode,
wherein the motor speed drives at least one of a rotation speed of the primary desiccant wheel or a flow rate of the regeneration fluid in the regeneration fluid path, and
wherein the motor speed corresponds to at least one motor speed known to maximize the water extraction efficiency for a condition detected by the at least one sensor.

8. The controller of claim 1, further comprising a transceiver coupled to the microcontroller, wherein the microcontroller is configured to at least one of:
send data comprising at least one of the at least one signal or the water extraction efficiency via the transceiver;
receive at least one of command data or update data via the transceiver.

9. The controller of claim 1, wherein the at least one signal comprises a signal indicative of at least one of ambient temperature, hot-side temperature, ambient relative humidity, external relative humidity, PV voltage, PV current, PV power, motor target speed, motor measured speed, regen fan target speed, regen fan measured speed, process fan target speed, process fan measured speed, water extraction efficiency, and/or accumulated liquid water count.

10. The controller of claim 1, wherein:
the at least one sensor comprises a PV output sensor;
the at least one motor comprises a process fan motor; and
the microcontroller is configured to optimize PV output by adjusting a speed of the process fan motor.

11. A controller for controlling a system for extracting liquid water from air, the controller comprising:
at least one motor; and
a microcontroller coupled to the at least one motor, the microcontroller being configured to:
receive at least one signal from at least one sensor;
determine a water extraction efficiency; and
adjust a speed of the at least one motor in response to the water extraction efficiency,
wherein the water extraction efficiency is obtained by multiplying a regeneration fluid flow rate within a regeneration fluid path by an absolute humidity of a regeneration fluid.

12. The controller of claim 11, wherein the at least one sensor comprises at least one of a flow sensor or a humidity sensor,
wherein the at least one sensor is disposed in the regeneration fluid path on the side of a primary desiccant wheel opposite the side in communication with a thermal unit; and
wherein the at least one signal comprises a regeneration fluid flow rate signal from the flow sensor, or a humidity signal from the humidity sensor.

13. The controller of claim 11, wherein the at least one sensor comprises a humidity sensor disposed outside the system, and a temperature sensor disposed in or near a thermal unit;
wherein the at least one signal comprises a humidity signal from the humidity sensor and a temperature signal from the temperature sensor; and
wherein the microcontroller is further configured to at least one of:
estimate the absolute humidity using the humidity signal and the temperature signal; or
determine a dew point using the humidity signal and the temperature signal.

14. The controller of claim 11, wherein the at least one sensor comprises a humidity sensor disposed outside the system, and a temperature sensor disposed in or near a thermal unit;
wherein the at least one signal comprises a humidity signal from the humidity sensor and a temperature signal from the temperature sensor; and
wherein the controller further comprises a filter configured to synchronize the temperature signal with the humidity signal.

15. The controller of claim 11, wherein the system further comprises:
a secondary desiccant wheel disposed between a primary desiccant wheel and a condenser,
wherein the at least one sensor comprises a humidity sensor disposed at an inlet of the condenser; and
wherein the microcontroller is configured to optimize a humidity at the inlet of the condenser by adjusting a speed of the secondary desiccant wheel.

16. The controller of claim 11, wherein the microcontroller is further configured to at least one of:
transition from a no-go mode to a go mode in response to determining that a dew point is above a threshold value; or
transition from the go mode to the no-go mode in response to determining that the dew point is below a threshold value,
wherein, in the go mode, the microcontroller controls the at least one motor to cause the system to extract the liquid water, and
wherein, in the no-go mode, the microcontroller controls the at least one motor to prevent the system from extracting the liquid water.

17. The controller of claim 16, wherein the microcontroller is further configured to set a motor speed when the microcontroller transitions from the no-go mode to the go mode,
wherein the motor speed drives at least one of a rotation speed of a primary desiccant wheel or a flow rate of a regeneration fluid in the regeneration fluid path, and
wherein the motor speed corresponds to at least one motor speed known to maximize the water extraction efficiency for a condition detected by the at least one sensor.

18. The controller of claim 11, further comprising a transceiver coupled to the microcontroller, wherein the microcontroller is configured to at least one of:
send data comprising at least one of the speed, the at least one signal, or the water extraction efficiency via the transceiver;
receive at least one of command data or update data via the transceiver.

19. The controller of claim 11, wherein the at least one signal comprises a signal indicative of at least one of ambient temperature, hot-side temperature, ambient relative humidity, external relative humidity, PV voltage, PV current, PV power, motor target speed, motor measured speed, regen fan target speed, regen fan measured speed, process fan target speed, process fan measured speed, water extraction efficiency, and/or accumulated liquid water count.

20. The controller of claim 11, wherein:
the at least one sensor comprises a PV output sensor;
the at least one motor comprises a process fan motor; and
the microcontroller is configured to optimize PV output by adjusting a speed of the process fan motor.

21. The controller of claim 11, wherein the adjusting the speed comprises:
increasing the speed in response to detecting an increase in the water extraction efficiency; or
decreasing the speed in response to detecting a decrease in the water extraction efficiency.

22. The controller of claim 21, wherein the at least one motor comprises a motor for driving a primary desiccant wheel or a motor for driving a fan in the regeneration fluid path.

23. A method of controlling a system for extracting liquid water from air, the method comprising: multiplying, by a microcontroller, a regeneration fluid flow rate by an absolute humidity of a regeneration fluid to determine a water extraction efficiency; and adjusting, by the microcontroller, a speed of a motor in response to the water extraction efficiency.

24. The method of claim 23, wherein the motor drives at least one of a rotation speed of a desiccant wheel or a flow rate of the regeneration fluid.

25. The method of claim 23, wherein the microcontroller receives at least one signal from at least one sensor.

26. The method of claim 25, wherein the at least one signal comprises a humidity signal, a temperature signal, or a flow rate signal, and wherein the at least one sensor comprises a humidity sensor, a flow rate sensor, or a temperature sensor.

27. The method of claim 26, further comprising:
determining, by the microcontroller, a dew point using the temperature signal and the humidity signal.

28. The method of claim 27, further comprising:
transitioning, by the microcontroller, from a no-go mode to a go mode in response to determining that the dew point is above a threshold value,
wherein, in response to the go mode, the microcontroller controls the motor to cause the system to extract the liquid water, and
wherein, in response to the no-go mode, the microcontroller controls the motor to prevent the system from extracting the liquid water.

29. The method of claim 28, further comprising:
transitioning, by the microcontroller, from the go mode to the no-go mode in response to determining that the dew point is below a threshold value.

30. A controller, comprising:
a microcontroller coupled to a motor, the microcontroller being configured to perform the method of claim 23, wherein the motor comprises the motor of claim 23; and wherein the microcontroller comprises the microcontroller of claim 23.

* * * * *